/

US010528079B2

(12) United States Patent
Akimoto

(10) Patent No.: US 10,528,079 B2
(45) Date of Patent: Jan. 7, 2020

(54) DATA PROCESSING DEVICE, DISPLAY METHOD, INPUT/OUTPUT METHOD, SERVER SYSTEM, AND COMPUTER PROGRAM

(71) Applicant: Semiconductor Energy Laboratory Co., Ltd., Atsugi-shi, Kanagawa-ken (JP)

(72) Inventor: Kengo Akimoto, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/685,045

(22) Filed: Aug. 24, 2017

(65) Prior Publication Data

US 2018/0059721 A1     Mar. 1, 2018

(30) Foreign Application Priority Data

Aug. 26, 2016   (JP) .................................. 2016-165364

(51) Int. Cl.
*G06F 1/16*     (2006.01)
*G06F 3/01*     (2006.01)
(Continued)

(52) U.S. Cl.
CPC ............ *G06F 1/1618* (2013.01); *G06F 1/163* (2013.01); *G06F 1/1626* (2013.01); *G06F 1/1641* (2013.01); *G06F 1/1643* (2013.01); *G06F 1/1652* (2013.01); *G06F 1/1677* (2013.01); *G06F 1/1694* (2013.01); *G06F 3/011* (2013.01); *G06F 3/0412* (2013.01); *G06F 3/04845* (2013.01); *G06F 21/10* (2013.01); *G07F 9/023* (2013.01); *G07G 1/01* (2013.01); *G09G 3/2074* (2013.01); *G09G 5/38* (2013.01);
(Continued)

(58) Field of Classification Search
None
See application file for complete search history.

(56) References Cited

U.S. PATENT DOCUMENTS 6,251,012 B1   6/2001  Horigami et al.
6,375,571 B1   4/2002  Ohnuma et al.
(Continued)

FOREIGN PATENT DOCUMENTS

JP     2011-191750 A     9/2011

*Primary Examiner* — Ke Xiao
*Assistant Examiner* — Jed-Justin Imperial
(74) *Attorney, Agent, or Firm* — Fish & Richardson P.C.

(57) ABSTRACT

A novel display device and the like are provided. The data processing device includes a display panel, a means to obtain locational data, an arithmetic device, an angular sensor, a first housing, a second housing, and a hinge connected the first and second housings. The display panel is flexible, and is held in the inside of the first and second housings. The arithmetic device has a function of generating first image data based on locational data. The angular sensor supplies data of the folding angle between the housings to the arithmetic device. The arithmetic device has a function of generating second image data based on the locational data and the angular data. The second image data includes a second image and display coordinates of the second image. The display panel has a function of displaying an image based on the first image data and the second image data.

10 Claims, 26 Drawing Sheets

(51) Int. Cl.
  *G06F 3/041* (2006.01)
  *G06F 3/0484* (2013.01)
  *G09G 3/20* (2006.01)
  *G09G 5/38* (2006.01)
  *G06F 21/10* (2013.01)
  *G07F 9/02* (2006.01)
  *G07G 1/01* (2006.01)
  *G06F 3/044* (2006.01)
  *G06F 21/60* (2013.01)
  *G06Q 20/40* (2012.01)

(52) U.S. Cl.
  CPC ............ *G06F 3/044* (2013.01); *G06F 21/604* (2013.01); *G06F 2203/04102* (2013.01); *G06Q 20/405* (2013.01); *G09G 2300/02* (2013.01); *G09G 2300/0408* (2013.01); *G09G 2300/0426* (2013.01); *G09G 2310/0218* (2013.01); *G09G 2340/14* (2013.01); *G09G 2356/00* (2013.01); *G09G 2380/02* (2013.01)

(56) References Cited

U.S. PATENT DOCUMENTS

| | | |
|---|---|---|
| 7,869,204 B2 | 1/2011 | Bair et al. |
| 8,654,095 B1 | 2/2014 | Cho et al. |
| 9,294,602 B2 | 3/2016 | Yamazaki et al. |
| 9,395,070 B2 | 7/2016 | Endo |
| 9,578,151 B2 | 2/2017 | Yamazaki et al. |
| 2006/0034042 A1 | 2/2006 | Hisano et al. |
| 2010/0182265 A1 | 7/2010 | Kim et al. |
| 2012/0011256 A1 | 1/2012 | Masuda et al. |
| 2013/0178257 A1* | 7/2013 | Langseth ................ G06T 17/05 463/4 |
| 2013/0300732 A1 | 11/2013 | Hosoya |
| 2014/0375660 A1 | 12/2014 | Tamaki |
| 2015/0023030 A1 | 1/2015 | Tsukamoto |
| 2015/0146069 A1 | 5/2015 | Yamazaki et al. |
| 2015/0221065 A1* | 8/2015 | Kim .......................... G06T 3/40 345/660 |
| 2015/0233557 A1 | 8/2015 | Aoyama et al. |
| 2016/0034047 A1* | 2/2016 | Lee ........................ G09G 5/373 345/156 |
| 2017/0017313 A1* | 1/2017 | Rakshit ................ G06F 3/0488 |
| 2017/0023979 A1 | 1/2017 | Yamazaki et al. |
| 2017/0061863 A1 | 3/2017 | Eguchi |
| 2017/0092224 A1 | 3/2017 | Senda et al. |
| 2017/0213872 A1 | 7/2017 | Jinbo et al. |
| 2017/0249908 A1* | 8/2017 | Berdinis .................. G09G 3/36 |
| 2017/0315589 A1 | 11/2017 | Isa et al. |
| 2017/0315644 A1 | 11/2017 | Hayakawa |

\* cited by examiner

FIG. 1A
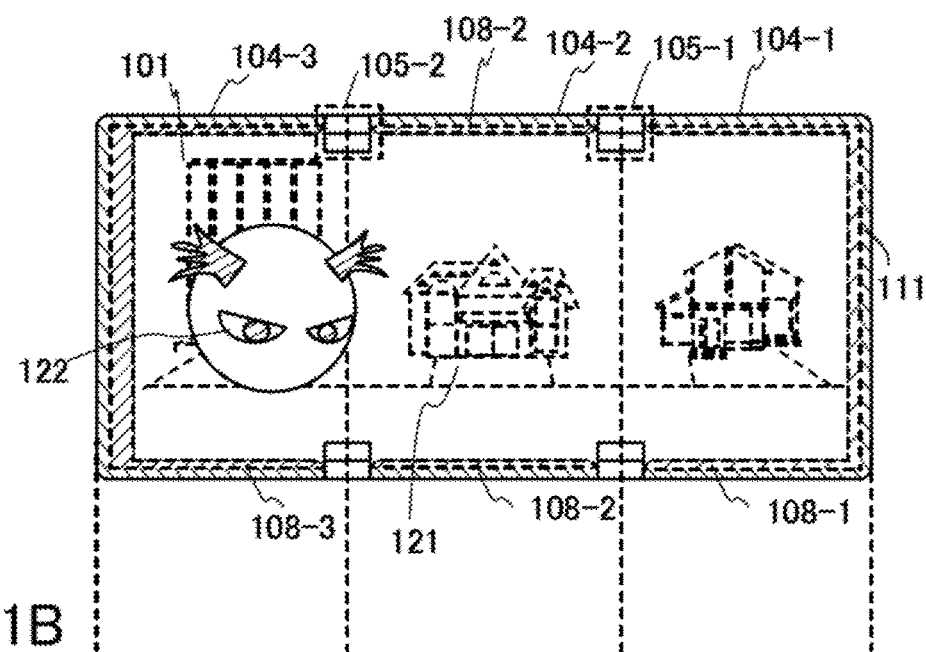
FIG. 1B
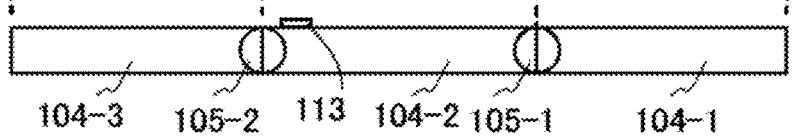
FIG. 1C
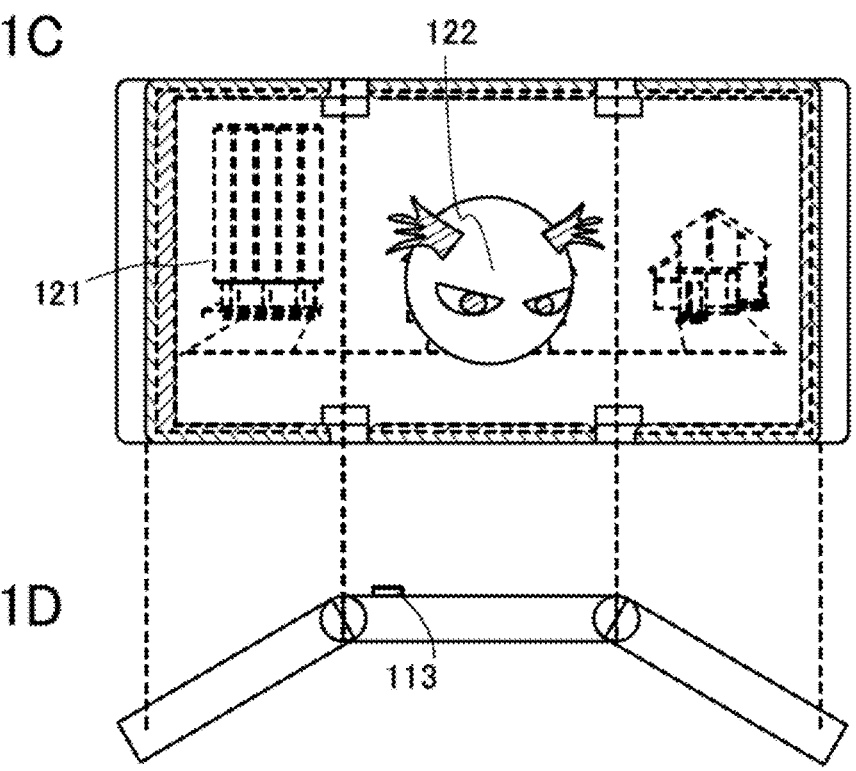
FIG. 1D

DATA PROCESSING DEVICE, DISPLAY METHOD, INPUT/OUTPUT METHOD, SERVER SYSTEM, AND COMPUTER PROGRAM

BACKGROUND OF THE INVENTION

1. Field of the Invention

One embodiment of the present invention relates to a display device, an input/output device, a data processing device, display method, an input/output method, a server system, a computer program, or a semiconductor device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

A liquid crystal display device in which a light-condensing means and a pixel electrode are provided on the same surface side of a substrate and a region transmitting visible light in the pixel electrode is provided to overlap with an optical axis of the light-condensing means, and a liquid crystal display device which includes an anisotropic light-condensing means having a condensing direction X and a non-condensing direction Y that is along a longitudinal direction of a region transmitting visible light in the pixel electrode are known (Patent Document 1).

REFERENCE

Japanese Published Patent Application No. 2011-191750

SUMMARY OF THE INVENTION

One object of the present invention is to provide a data processing device having a novel input/output method. Another object of the present invention is to provide a data processing device having a highly convenient input/output method. Another object of the present invention is to provide a novel data processing device, a novel display method, a novel input/output device, a novel input/output method or a novel semiconductor device. Another object of the present invention is to provide a novel server system. Another object of the present invention is to provide a novel computer program.

Note that the descriptions of these objects do not disturb the existence of other objects. In one embodiment of the present invention, there is no need to achieve all the objects. Other objects will be apparent from and can be derived from the description of the specification, the drawings, the claims, and the like.

A data processing device of one embodiment of the present invention includes a display portion, a means for imaging, a means to obtain locational data, an arithmetic device, an angular sensor, a first housing, a second housing, and a hinge. The first housing and the second housing are connected to each other through the hinge in a manner that enables the first housing and the second housing to rotate around the hinge, the display portion has flexibility and is held in the insides of the first housing and the second housing. The means to obtain locational data supplies locational data to the arithmetic device, and the arithmetic device is configured to generate first image data on the basis of the locational data. The angular sensor supplies angular data that includes a folding angle determined by the first housing and the second housing. The arithmetic device has a function of generating second image data on the basis of the locational data and the angular data. The second image data includes a second image and display coordinates of the second image. The display panel has a function of displaying an image on the basis of the first image data and the second image data.

In the configuration above, the arithmetic device is preferably configured to store a threshold value and predetermined display coordinates. The arithmetic device is preferably configured to determine display coordinates on the basis of the locational data when the folding angle is smaller than the threshold value. The arithmetic device is preferably configured to determine the display coordinates as the predetermined display coordinates when the folding angle is larger than the threshold value.

In each of the configurations above, the display portion preferably includes a pixel, the pixel preferably includes a first display element and a second display element, the first display element is preferably configured to display the first image data, and the second display element is preferably configured to display the second image data. In addition, the first display element is preferably a reflective display element, and the second display element is preferably a light-emitting display element.

Each of the configurations above preferably includes one or more of the following: a touch sensor, a keyboard, a hardware button, a pointing device, an illuminance sensor, an audio input device, and a viewpoint input device.

An input/output method using a foldable data processing device of one embodiment of the present invention includes a step to determine whether to generate or to delete an image when an angle formed by two housings connected to a hinge is less than or equal to a threshold value and display the image on the display panel, and a step to move the image to a predetermined position on the display panel when the angle formed by the two housings connected to the hinge is larger than the threshold value. In this configuration, a process associated with the image is preferably performed after the image is displayed on the predetermined position, and when sensing data is input from a region of a touch panel where the image is displayed.

The input/output method of a foldable data processing device with any of the configurations above may include first to fifth steps. The input/output method may obtain the angle determined by the two housings connected to the hinge in the first step, determine whether the image is created by the arithmetic device in the second step, proceed to the third step if the image is created in the arithmetic device (proceed to the first step if the image is not created in the arithmetic device), obtain an angle in the third step, determine whether the angle is smaller than or equal to the threshold value, proceed to the first step if the angle is smaller than or equal to the threshold value (proceed to the fifth step if the angle is larger than the threshold value, move the image to a specific position in the fifth step, and proceed to the first step. In addition, the input/output method may be a computer program that makes the foldable data processing device execute such an input/output method.

A server system of one embodiment of the present invention is configured to be able to communicate with a data processing device operated by an operator. The server system of one embodiment of the present invention includes a means for setting a restriction on the data processing device operated by the operator, which are determined by angular data between two housings connected to a hinge included in the data processing device, an input/output method, an image generation method, an image deletion method, a method to move an image, and a paid price, based on communication with the data processing device. The server system of one embodiment of the present invention a means for controlling reduction that reduces the restriction upon receiving a request from the data processing device to remove the restriction, on the basis of communication with the data processing device.

When a data processing device is used outdoors, particularly when input/output is performed while walking, precise controls are difficult. A data processing device of one embodiment of the present invention allows precise input through the operator first narrowing the selection range while walking with an operation that involves a large motion, i.e., folding the data processing device, and then stopping and inputting data from a region of a touch panel where an image is displayed. By including a novel input/output method using an angular sensor, the data processing device of one embodiment of the present invention can be highly convenient.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Furthermore, in a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of a transistor means a drain region that is part of the semiconductor film or a drain electrode connected to the semiconductor film. Furthermore, a "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor. Further, in this specification, one of a first electrode and a second electrode of a transistor refers to a source electrode and the other refers to a drain electrode.

In this specification, the term "connection" means an electrical connection and corresponds to a state where current, voltage, or a potential can be supplied or transmitted. Accordingly, connection means not only direct connection but also indirect connection through a circuit element such as a wiring, a resistor, a diode, or a transistor so that current, a potential, or voltage can be supplied or transmitted.

In this specification, even when different components are connected to each other in a circuit diagram, there may actually be a case where one conductive film has functions of a plurality of components such as a case where part of a wiring serves as an electrode. The term "connection" also means such a case where one conductive film has functions of a plurality of components.

According to one embodiment of the present invention, a data processing device having a novel input/output method can be provided. Alternatively, one embodiment of the present invention can provide a data processing device having a highly convenient input/output method. Alternatively, one embodiment of the present invention can provide a novel data processing device, a novel display device, a novel input/output device, a novel input/output method, a novel server system, a novel computer program or a novel semiconductor device.

The descriptions of these effects do not disturb the existence of other effects, and one embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 1A and 1C are plan views illustrating a data processing device of one embodiment of the present invention, and FIGS. 1B and 1D are side views illustrating the data processing device of one embodiment of the present invention.

DETAILED DESCRIPTION OF THE INVENTION

Figure 2A:
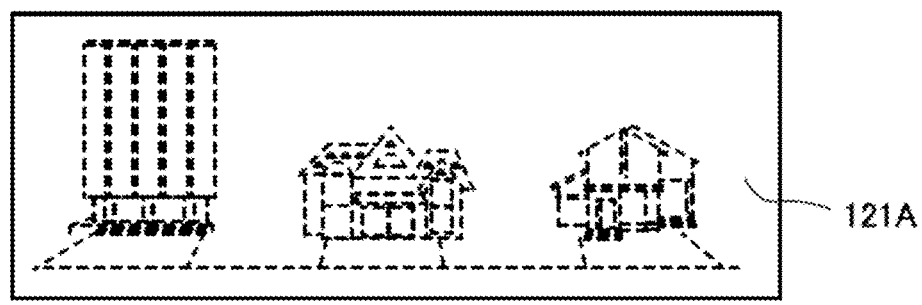
FIGS. 2A to 2D illustrate images that are generated by a data processing device of one embodiment of the present invention.
Figure 2B:
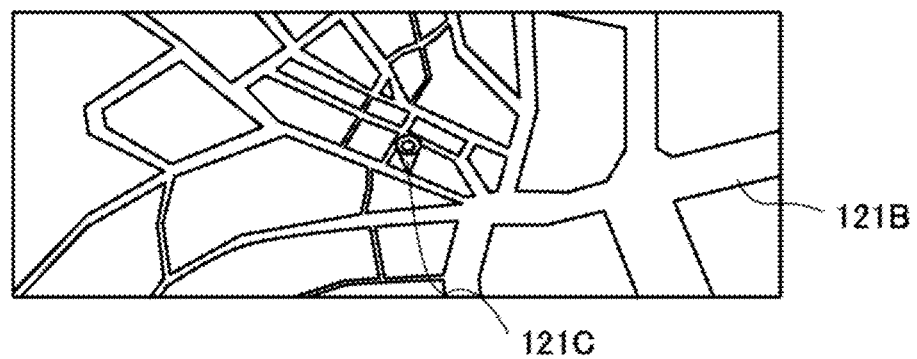
Figure 2C:
Figure 2D:

Embodiments are described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments and example. Note that in the configuration of the invention described below, the same portions or portions having similar functions are denoted by the same reference numerals across different drawings and repetitive description thereof is omitted.

One embodiment of the present invention is a data processing device having a display portion, a means to obtain locational data, an arithmetic device, and an angular sensor. The display portion has flexibility. The data processing device of one embodiment of the present invention preferably includes, in particular, the display portion, and a touch panel provided with a touch sensor. In addition, the data processing device of one embodiment of the present invention preferably includes a means for imaging. In addition, the data processing device of one embodiment of the present invention preferably includes a means for communication.

Embodiment 1

In this embodiment, the configuration of a data processing device of one embodiment of the present invention will be described with reference to FIGS. 1A, 1B, 1C, and 1D, FIGS. 2A, 2B, 2C, and 2D, FIGS. 3A and 3B, FIGS. 4A, 4B, and 4C, and FIGS. 5A, 5B, and 5C.

The data processing device of one embodiment of the present invention includes a touch panel and a means for imaging. The touch panel includes a display portion and a touch sensor.

The data processing device includes a panel substrate 101 that is the above-described touch panel, a first housing 104-1, a second housing 104-2, a third housing 104-3, a hinge 105-1, and a hinge 105-2. The panel substrate 101 has flexibility. An operator can manipulate the first housing 104-1 and the second housing 104-2 in such a way that the first housing 104-1 and the second housing 104-2 rotate on the axis of the hinge 105-1. Alternatively, the operator can manipulate the second housing 104-2 and the third housing 104-3 in such a way that the second housing 104-2 and the third housing 104-3 rotate on the axis of the hinge 105-2. The operator of the data processing device can manually manipulate the housings to rotate the housings while supporting the housings. Through this manipulation, the operator can manipulate the data processing device to be in a bent (folded) state or a stretched-out state.

On the inside of the first housing 104-1, the second housing 104-2, and the third housing 104-3, slits 108-1, 108-2, and 108-3 are provided, respectively. The panel substrate 101 is held in each of the slits.

The data processing device has a means for imaging, e.g., a camera 113. Furthermore, the data processing device has a means to obtain locational data, e.g., a global positioning system (GPS). The means to obtain locational data can obtain the locational data of the data processing device and the directional data of the housing of the data processing device, and supply the data to the arithmetic device. In addition, the data processing device has an angular sensor and two or more housings, and can obtain and supply angular data between two housings. In addition, the data processing device has an arithmetic device that controls the display method on the basis of the data above.

FIG. 1A is a plan view illustrating the foldable data processing device of one embodiment of the present invention in a stretched-out state. FIG. 1B is a side view of the data processing device in the state in FIG. 1A. FIG. 1C is a plan view illustrating a state in which the data processing device is bent (folded) on the axes of the hinges 105-1 and 105-2. FIG. 1D is a side view of the data processing device in the state in FIG. 1C.

The hinges 105-1 and 105-2 each have the angular sensor, and an angle formed by the first housing 104-1 and the second housing 104-2 and an angle formed by the second housing 104-2 and the third housing 104-3, i.e., angular data, can be sensed. In this specification, the angles described above are also referred to as folding angles.

The state in which the data processing device is stretched out, illustrated in FIG. 1A, specifically refers to a state in which the angle formed by the first housing 104-1 and the second housing 104-2 and the angle formed by the second housing 104-2 and the third housing 104-3 are both smaller than or equal to a certain threshold value. The state in which the data processing device is bent, illustrated in FIG. 1C, specifically refers to a state in which one or both of the angle formed by the first housing 104-1 and the second housing 104-2 and the angle formed by the second housing 104-2 and the third housing 104-3 are larger than a certain threshold value.

The data processing device can display, on the display portion of the panel substrate 101, a first image 121 imaged with the camera 113 and a second image 122 created by the arithmetic device. When the second image 122 is displayed on the display portion of the panel substrate 101, coordinates of the second image 122 on the display portion is referred to as display coordinates of the second image.

The arithmetic device included in the data processing device can create the second image 122 on the basis of the locational data obtained from the means to obtain locational data, while controlling the display method on the basis of the angular data as described above. The arithmetic device can also create the second image 122 on the basis of environmental data such as time, illuminance, or the like, and input data to the touch sensor by the operator, or the like, obtained by the data processing device. The arithmetic device can also create the second image 122 on the basis of data obtained from a means for communication included in the data processing device. In addition, the arithmetic device can determine the display coordinates of the second image on the basis of the data above. The display coordinates of the second image can be regarded as corresponding to the locational data of the data processing device and the directional data of the housing of the data processing device. Alternatively, the second image 122 and the display coordinates of the second image may be generated on the basis of data that are other than the data described above.

Because the first image 121 is imaged with the camera 113 included in the data processing device, an example of the first image 121 can be a scenery 121A or an object, which is visible on-site to the operator of the data processing device and is not the display portion (see FIG. 2A). Alternatively, the first image 121 can be a map 121B which is created on the basis of the locational data obtained by the means to obtain locational data (see FIG. 2B). A symbol 121C that can indicate the current position of the operator is preferably displayed on this map. Furthermore, it is preferable to display a map using aerial photography.

An example of the second image 122 is an image generated by the arithmetic device of the data processing device, which can be seen by the operator of the data processing device only on the display portion. The second image 122 can be, for example, a diagram 122A (see FIG. 2C). Alternatively, the second image 122 can be a diagram 122B that includes text data (see FIG. 2D).

At this time, for example, the second image 122 can be displayed at a certain position of the display portion of the panel substrate 101, so as to overlap the first image 121 that has been imaged (see FIG. 1A). In other words, when the location or the direction of the data processing device is changed, the second image 122 is displayed on the display portion of the panel substrate 101 while display coordinates of the second image 122 change.

Furthermore, the second image 122 can be displayed using a display method based on the above-described angular data, in addition to the display methods described above. For example, when the angle exceeds a certain threshold value, the second image 122 is displayed with its center set at predetermined display coordinates on the display portion of the panel substrate 101, regardless of positional or directional change in the data processing device (see FIG. 1C).

The arithmetic device has a function of storing a threshold value in the angle formed by two housings and predetermined display coordinates.

An image displayed on the data processing device in a stretched-out state (see FIG. 1A) is regarded as a reference of the first image 121 imaged with the camera 113, and the same image is displayed on the panel substrate 101 even when the data processing device is bent, unless the location or the direction of the data processing device changes (see FIG. 1C).

The data processing device with such a configuration can change its input/output method depending on the angle determined by two housings.

For example, when the data processing device is in a stretched-out state, the data processing device is brought into a state in which generating or deleting the second image 122 is possible.

In contrast, when the data processing device is in a bent state, the data processing device is brought into a state in which decision whether to generate or delete the second image 122 is terminated, and the second image 122 that is displayed immediately before is displayed on a predetermined position on the display portion. In other words, the second image 122 can be moved from a location where the second image 122 is displayed immediately before moving to a predetermined location by the operator putting the data processing device in a bent state.

Figure 3A:
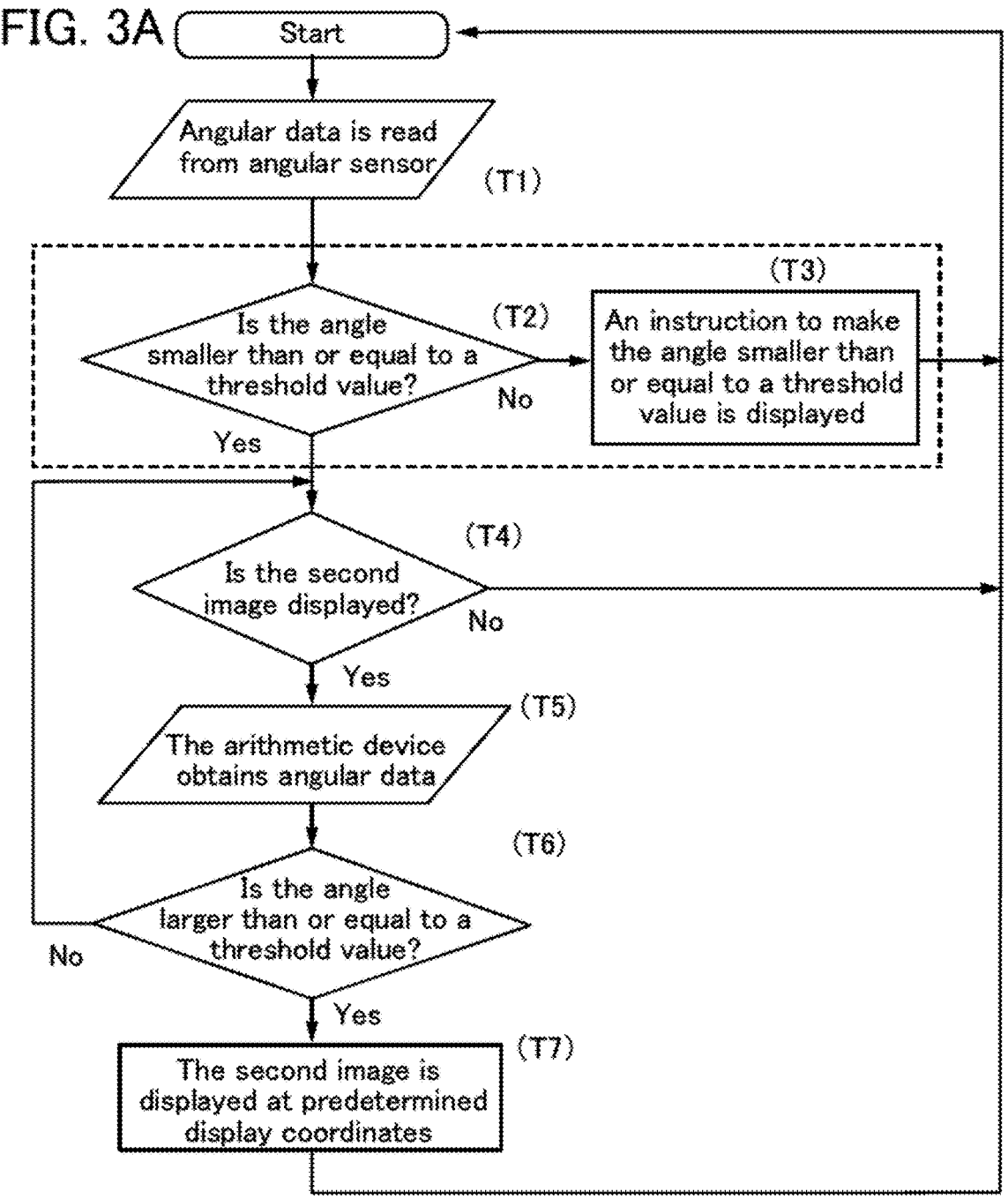
FIG. 3A is a flow chart showing an input/output method of one embodiment of the present invention.

An example of a novel and highly convenient input/output method that can determine the display method of the second image 122 on the basis of the angular data is shown in a flow chart (see FIG. 3A).

Figure 3B:
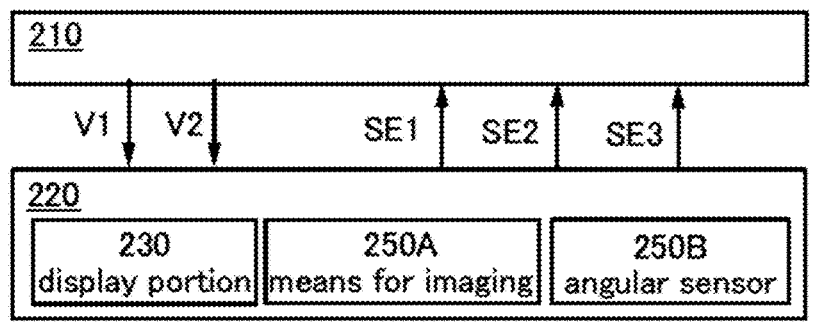
FIG. 3B illustrates a configuration of an input/output panel.
Figure 4A:
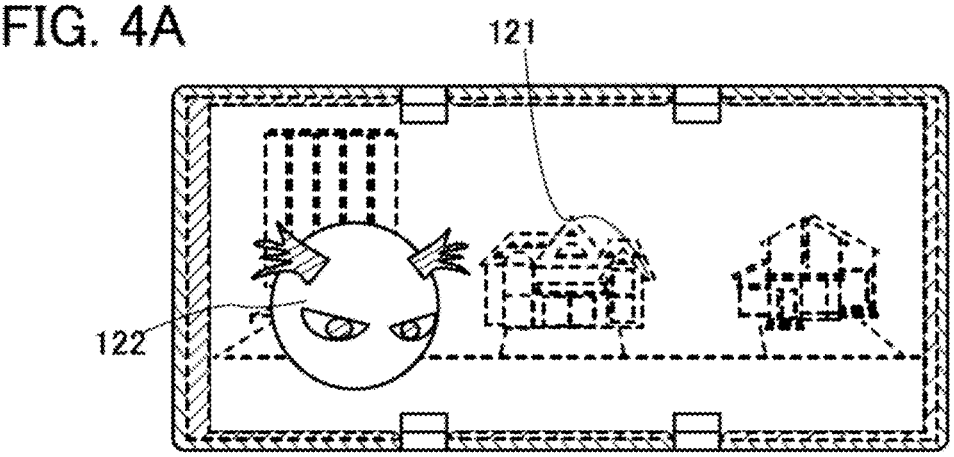
FIGS. 4A to 4C are plan views illustrating a data processing device of one embodiment of the present invention.
Figure 4B:
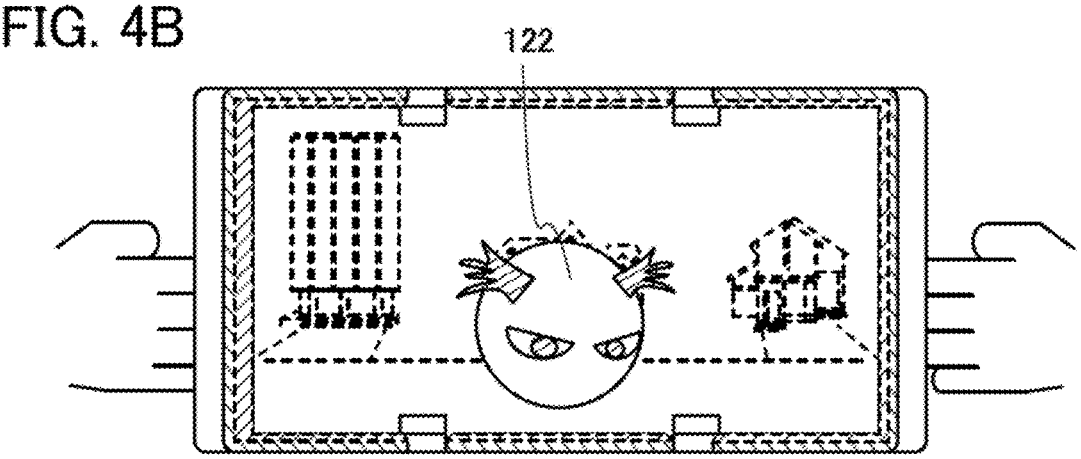
Figure 4C:
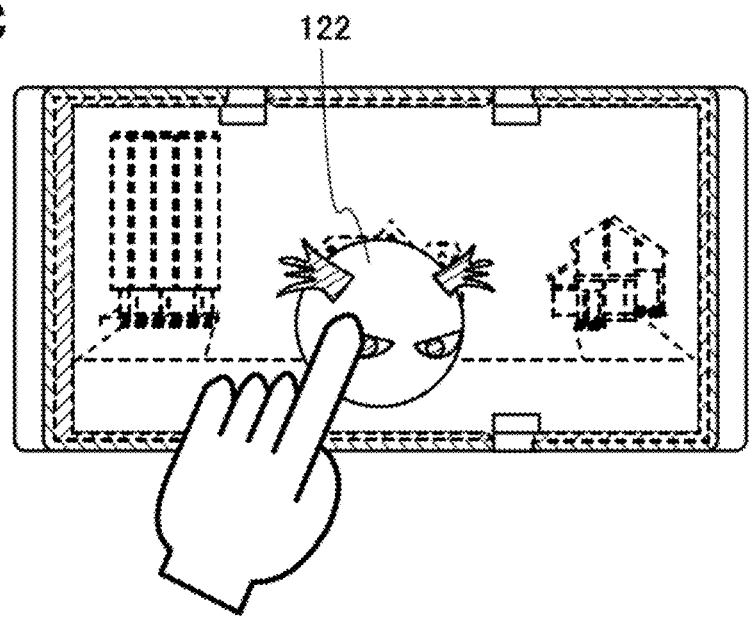
Figure 5A:
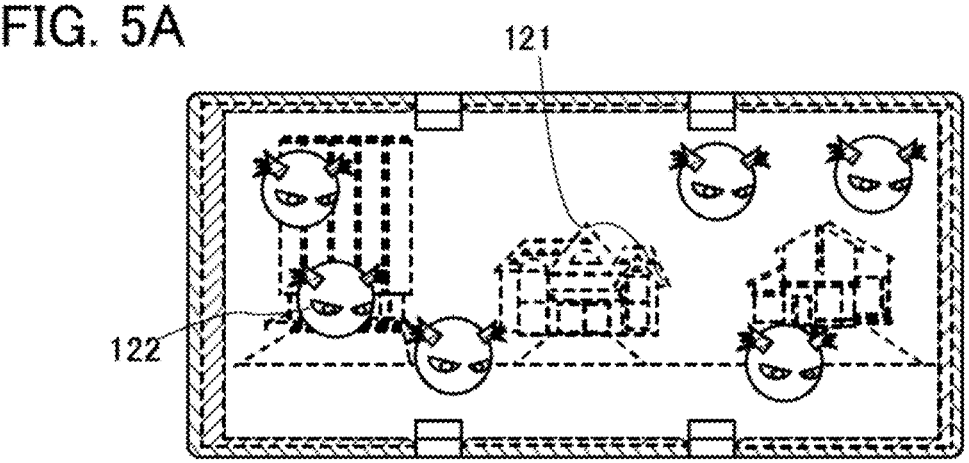
FIGS. 5A to 5C are plan views illustrating a data processing device of one embodiment of the present invention.
Figure 5B:
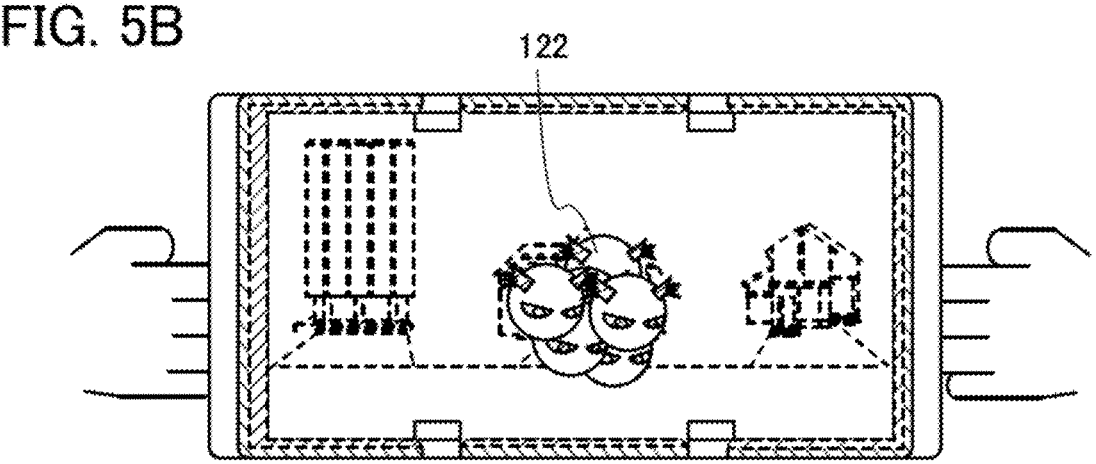
Figure 5C:
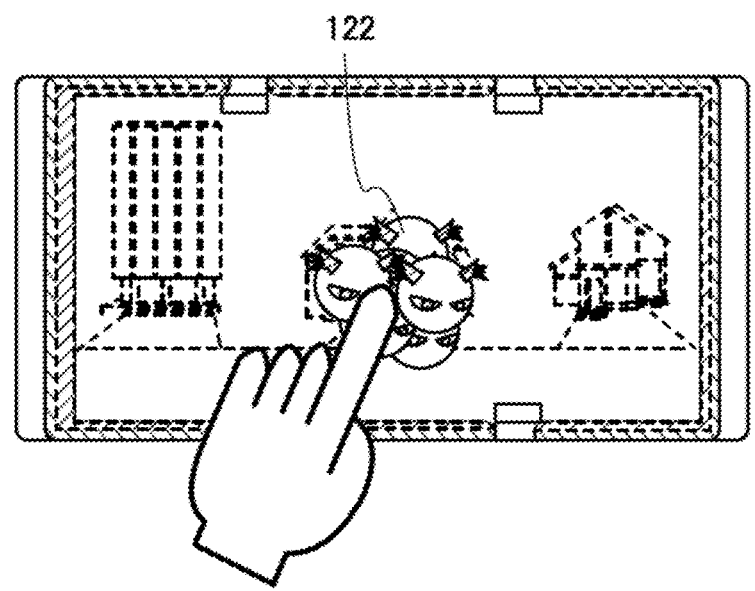

The input/output method shown in this flow chart is executed upon instruction from an arithmetic device 210 included in the data processing device of one embodiment of the present invention (see FIG. 3B). The arithmetic device 210 reads a computer program stored in a non-transitory computer-readable storage medium, and determines an input/output method.

The arithmetic device 210 included in the data processing device of one embodiment of the present invention has a function of obtaining, as sensing data SE1, the first image 121 obtained with a means for imaging 250A provided in a sensor portion included in an input/output device 220 (see FIG. 3B). In addition, the arithmetic device 210 has a function of obtaining, as sensing data SE2, locational data obtained with a means to obtain locational data provided in the sensor portion included in the input/output device 220. In addition, the arithmetic device 210 has a function of obtaining, as sensing data SE3, angular data obtained with an angular sensor 250B provided in the sensor portion included in the input/output device 220. The arithmetic device 210 may have a function of obtaining data from another means to obtain data. In other words, the sensing data SE1 may include data of the first image 121 imaged with the camera 113 (see FIG. 1A).

The arithmetic device 210 included in the data processing device of one embodiment of the present invention has a function of generating image data V1 or image data V2, and a function of supplying the image data V1 or the image data V2 to the input/output device 220 (see FIG. 3B).

While the camera 113 is imaging the first image 121, imaging data on the basis of the first image 121 is supplied to the arithmetic device 210, and the image data V1 is generated on the basis of the imaging data. Then, the image data V1 is supplied to the input/output device 220, and the first image 121 is displayed on a display portion 230 included in the input/output device 220. In addition, when the arithmetic device 210 creates the second image 122, the image data V2 is generated by the arithmetic device 210 on the basis of the second image 122. Then, the image data V2 is supplied to the input/output device 220, and the second image 122 is displayed on the display portion 230 included in the input/output device 220.

The arithmetic device 210 first reads angular data from the angular sensor (see (T1) in FIG. 3A) to determine whether the data processing device is in a stretched-out state (see FIG. 1A) or a bent state (see FIG. 1C).

Here, when the angle is smaller than or equal to a predetermined threshold value, the arithmetic device 210 determines that the data processing device is in a stretched-out state (see (T2) in FIG. 3A). When the data processing device is in a bent state, i.e., when the angle is larger than the threshold value, an instruction to make the angle smaller than or equal to the threshold value is displayed on the display portion (see (T3) in FIG. 3A).

When the data processing device is in a stretched-out state, the arithmetic device 210 determines whether the second image 122 is created by the arithmetic device 210 (see (T4) in FIG. 3A). If the second image 122 is already created, the second image 122 is displayed on the display portion at display coordinates of the second image 122 corresponding to the locational data of the data processing device and the directional data of the housing of the data processing device.

Here, the arithmetic device 210 obtains angular data (see (T5) in FIG. 3A) to determine whether the data processing device is manipulated from a stretched-out state to a bent state (see (T6) in FIG. 3A). If the data processing device is kept at a stretched-out state, the arithmetic device 210 returns to the state for determining whether the second image 122 is displayed (see (T4) in FIG. 3A), or the arithmetic device 210 returns to the initial state to read angular data (see (T1) in FIG. 3A). If the data processing device is manipulated from a stretched-out state to a bent state, the second image 122 is displayed at predetermined display coordinates on the display portion of the panel substrate 101 (see (T7) in FIG. 3A), and returns to the initial state.

An angle formed by two housings immediately after starting to use the data processing device can be set as a threshold value. In this case, a step for comparing an angle read from the angular sensor and the above-described threshold value (see inside the dotted line in FIG. 3A) can be skipped. Then, an angle that is first read from the angular sensor is set as the threshold value, angular data is obtained after the second image 122 is displayed, and an angle included in the above-described angular data is compared with the above-described threshold value (see (T6) in FIG. 3A). When the angle included in the above-described angular data is larger than the above-described threshold value, the second image 122 is displayed at predetermined display coordinates on the display portion of the panel substrate 101 (see (T7) in FIG. 3A), and the arithmetic device 210 returns to the initial state.

During the steps shown in the above flow chart, the first image 121 can be displayed on the display portion 230.

The data processing device with such a configuration can take the following input/output operations, for example. The second image 122 is displayed at given display coordinates of the second image 122 on the display portion of the panel substrate 101 (see FIG. 4A), in a state in which the data processing device is stretched out manually by the operator, using a given means such as moving the data processing device. Next, when the operator manually brings the data processing device into a state where the data processing device is bent on one or both of the axes of the hinges 105-1 and 105-2, the data processing device is brought into a state where the second image 122 is displayed at predetermined display coordinates and is selected (see FIG. 4B). Next, a process associated with the second image 122 can be performed by performing a given operation on the touch panel over the screen (see FIG. 4C).

When the operator moves the data processing device, the operator is in a state in which support of the data processing device is unstable, such as when walking. When an input at a specific timing is required, a precise operation is difficult. Bending the data processing device is an effective input method because this input method does not require high precision. A desired state is maintained with this input, and the operator performs an operation that require more precision with a stable posture, such as after coming to a stop. This series of operations enables precise input even in an unstable state.

The data processing device can also take the following input/output operations, for example. During a state in which the data processing device is stretched out, the second image 122 is displayed at given display coordinates of the second image 122 on the display portion of the panel substrate 101, using a given method such as moving the data processing device. Next, when the data processing device is in a state where the data processing device is bent on one or both of the axes of the hinges 105-1 and 105-2, the second image 122 is displayed while being restricted from moving across the areas in a bent state near the axis of the hinge. Next, the process associated with the second image 122 can be performed by performing a given operation on the touch panel over the screen.

The data processing device can also take the following input/output operations, for example. During a state in which the data processing device is stretched out, a plurality of the second images 122 are displayed (see FIG. 5A), using a given method such as moving the data processing device. Next, when the data processing device in a state where the data processing device is bent on one or both of the axes of the hinges 105-1 and 105-2, a plurality of the second images 122 are displayed at predetermined display coordinates (see FIG. 5B). Next, a process associated with each of the second image 122 can be performed by performing a given operation on the touch panel over the screen (see FIG. 5C).

The above-described predetermined display coordinates can be limited to, for example, being within a region of the display portion that overlaps with the second housing (see FIG. 1B).

The given operation refers to, for example, an operation such as touching the touch panel in a region where the second image 122 is displayed to specify the region so that the region being touched is used as a pointer to perform various gestures (e.g., tap, drag, swipe and pinch-in). In addition, the above-described process associated with the second image 122 refers to a process such as starting up an application, calling a functionality, and the like.

More specifically, a case where the above-described input/output operations are used on software of a game is assumed. For example, the operator can obtain predetermined points or additional content by folding the data processing device after confirming the appearance of the second image 122 during walking, thereby retaining the second image 122 in the screen, and tapping over the display of the second image 122 after coming to a stop.

The second image 122 may represent a character. In addition, when the data processing device is in a stretched-out state, the second image 122 may be in continuous motion on the display portion, or may disappear upon determination of the arithmetic device 210. In contrast, when the data processing device is in a bent state, the generated second image 122 may remain on a predetermined location.

When the input/output operations are performed using the above-described data processing device in a bent state, the second image 122 can be displayed clustered together in a smaller region on the display portion, narrowing the range that requires touch panel operation. This facilitates the operation of the data processing device. In addition, bending the data processing device when the second image 122 is displayed on the display portion creates a boundary at the bent portion, allowing the operator to associate the bending with narrowing of a region where the second image 122 appears, and enabling the operation to select a subject to become more intuitive.

The data processing device of one embodiment of the present invention is preferably provided with touch sensors on the entire surface of the display portion of the panel substrate 101. However, the data processing device of one embodiment of the present invention may allow input to only the touch sensors of the panel substrate 101 that is held by the slit of the second housing 104-2, by displaying the second image 122 only on the panel substrate 101 that is held at the slit of the second housing 104-2.

The input/output operations when the data processing device is in a bent state preferably use input with a touch panel, as an intuitive selection method. However, instead of the touch panel, any of input means such as a switch, a photodetector, an attitude sensor, an acceleration sensor, or the like included in the data processing device, can be used.

The data processing device of one embodiment of the present invention can have two housings or four or more housings. Even with a data processing device with this structure, the above-described input/output method is possible by displaying the second image 122 on a display portion of a display panel provided in a slit of any one of the housings when the data processing device is folded.

With this configuration provided with a novel input/output method, a more controllable and highly convenient data processing device can be provided. Alternatively, owing to the addition of a means for input that involves folding the data processing device during when the operator selects the second image 122 associated with locational data, a more controllable and highly convenient data processing device can be provided.

Embodiment 2

In this embodiment, a structure of a data processing device of one embodiment of the present invention will be described.
<Top View of Panel Substrate>

Figure 6A:
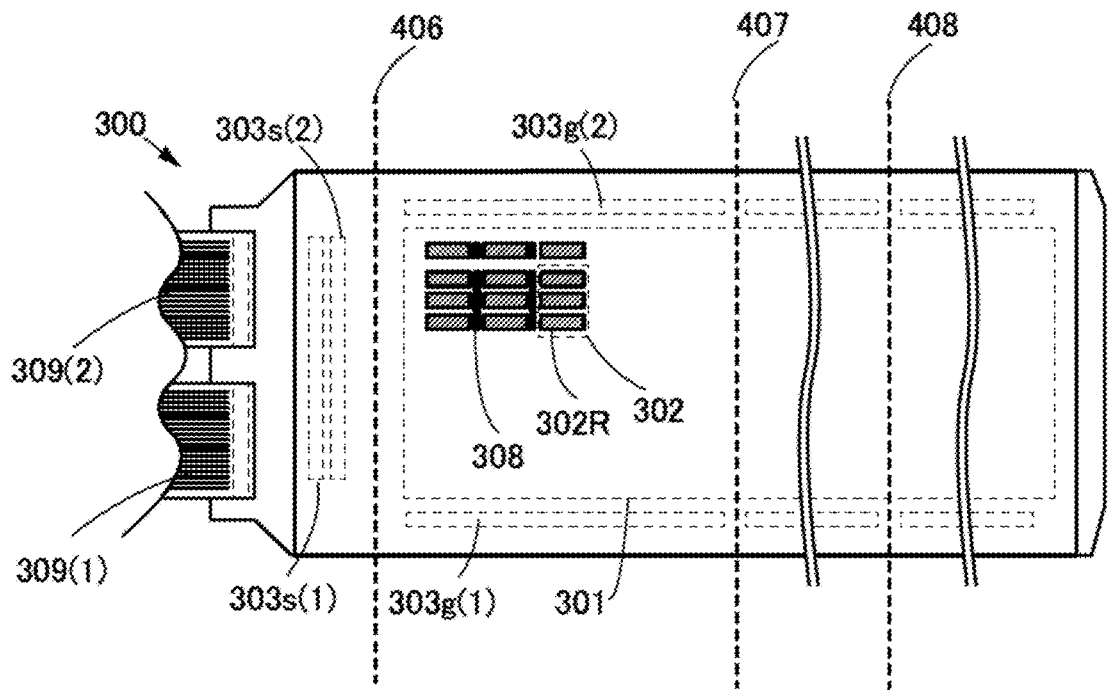
FIGS. 6A and 6B are plan views of a touch panel of one embodiment of the present invention.
Figure 6B:
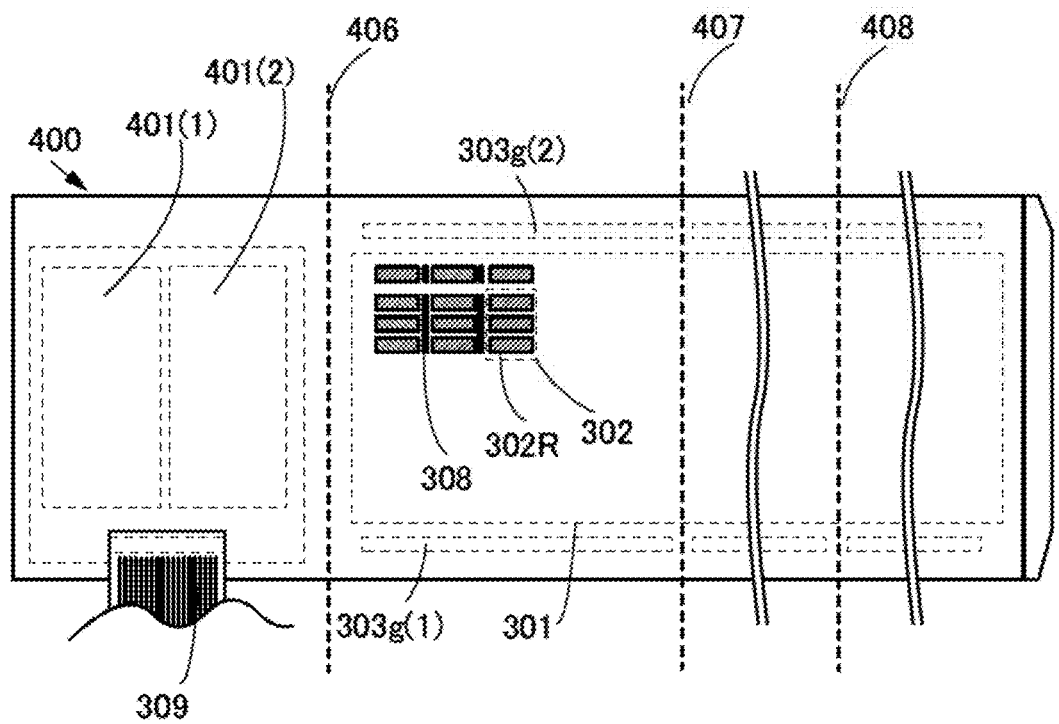

A touch panel 300 and a touch panel 400 are illustrated as examples that can be used as the panel substrate 101 illustrated in other embodiments (see FIGS. 6A and 6B). The touch panel 300 and the touch panel 400 each include a display portion 301.

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R), and each of the sub-pixels include light-emitting elements and pixel circuits that can supply electric power for driving the light-emitting elements.

The pixel circuits are electrically connected to wirings through which selection signals are supplied and wirings through which image signals are supplied.

The touch panel 300 illustrated in FIG. 6A includes in-cell circuits: a scan line driver circuit 303g(1) that can supply selection signals to the pixels 302 and an image signal line driver circuit 303s(1) that can supply image signals to the pixels 302. The touch panel 400 illustrated in FIG. 6B includes a region 401(1) and a region 401(2), in which a socket 109 is placed in the case where a scan line driver circuit that can supply selection signals to the pixels 302 and an image signal line driver circuit that can supply image signals to the pixels 302 are provided with a COG method.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The touch panels 300 and 400 include an imaging pixel driver circuit 303g(2) that can supply control signals to the imaging pixels 308. The touch panel 300 further includes an imaging signal line driver circuit 303s(2) that reads out imaging signals.

The touch panels 300 and 400 are each folded in regions around lines 406, 407, and 408. Each of the touch panels 300 and 400, which is folded along the line 406, along the line 407, and along the line 408, is folded in the vicinity of the end portion 111, in the vicinity of the hinge 105-1, and in the vicinity of the hinge 105-2, respectively. When a region where the panel is folded is referred to as a curved portion, the positions of the curved portions including the lines 406 and 407 with respect to the panel substrate are almost unchanged. In contrast, the position of the curved portion including the line 408 with respect to the panel substrate changes with the folding state of the hinge 105-1.

The touch panel 300 is folded at the line 406 between the display region and the region where the image signal line driver circuit 303s(1) and the imaging signal line driver circuit 303s(2) are provided (see FIG. 6A). In the touch panel 400, the line 406 is positioned between the display region and the region where the region 401(1) and the region 401(2) are provided. Such an arrangement of the line 406 can reduce the area seen from the top surface of the second part 104-1B in the first housing 104-1 and increase the area of the image signal line driver circuit 303s(1) and the imaging signal line driver circuit 303s(2) in the touch panel 300 and the area of the region 401(1) and the region 401(2) in the touch panel 400.

Figure 7A:
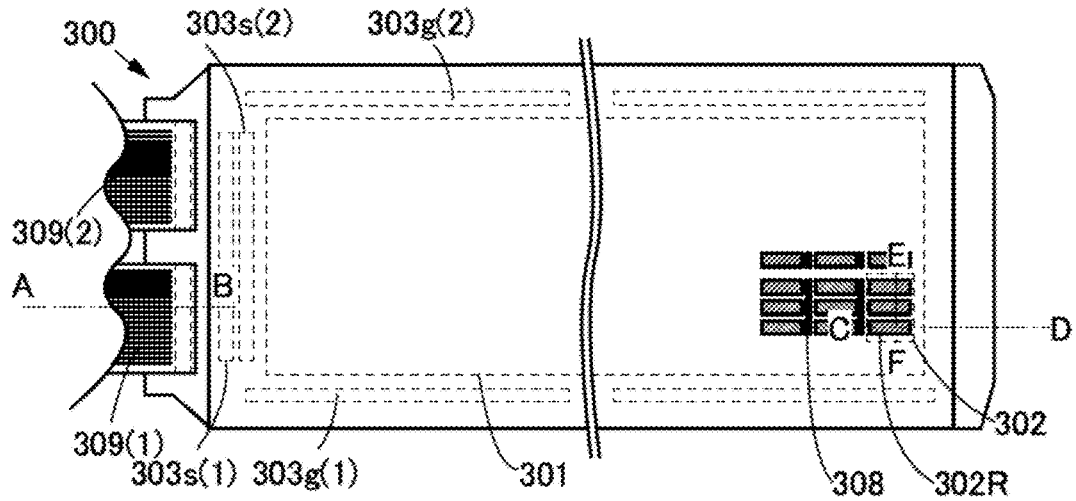
FIG. 7A is a top view illustrating a structure of a touch panel of one embodiment of the present invention.

FIG. 7A is a top view illustrating a structure of the touch panel that can be used in the data processing device of one embodiment of the present invention. The components in FIG. 7A correspond to those in FIG. 6A.

Figure 7B:
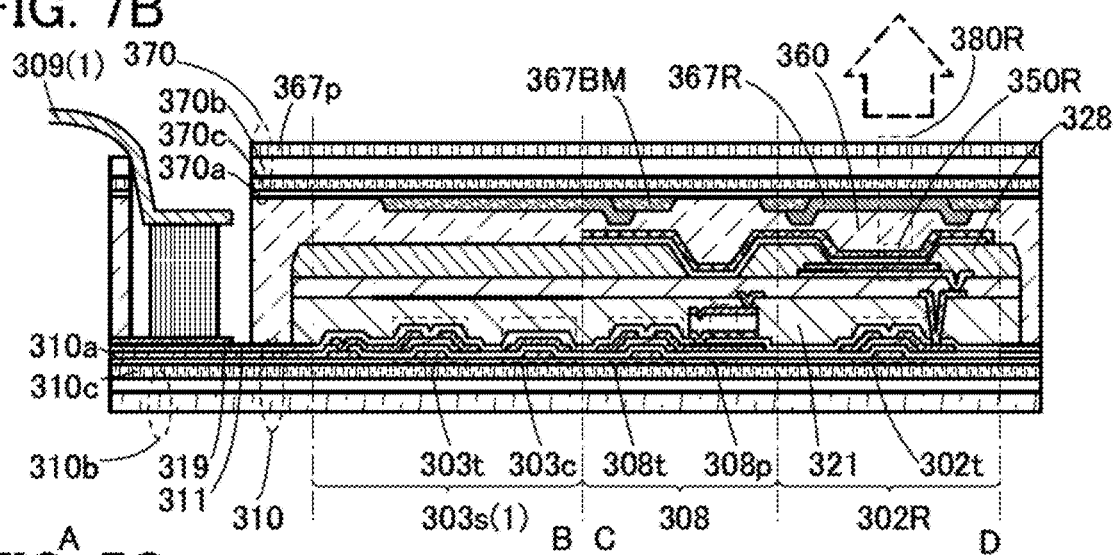
FIGS. 7B and 7C are cross-sectional views illustrating a structure of a touch panel of one embodiment of the present invention.

FIG. 7B is a cross-sectional view along line A-B and line C-D in FIG. 7A.

Figure 7C:
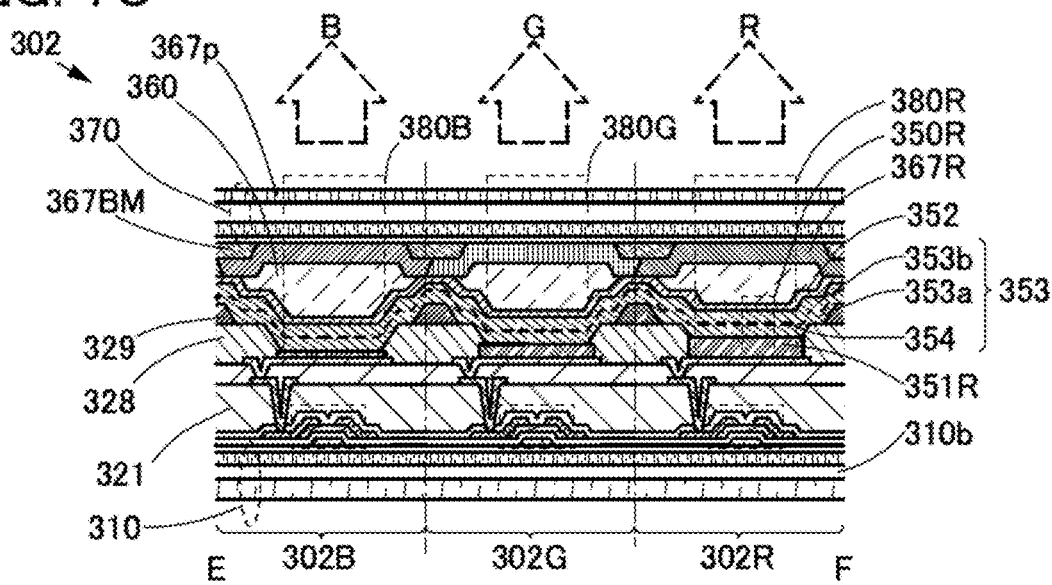

FIG. 7C is a cross-sectional view along line E-F in FIG. 7A.

<Cross-Sectional View>

The touch panel 300 includes a substrate 310 and a counter substrate 370 that faces the substrate 310 (see FIG. 7B).

When a material having flexibility is used for the substrate 310 and the counter substrate 370, the touch panel 300 can have flexibility.

Note that when the flexible touch panel 300 is changed in its form, stress is applied to a functional element provided in the touch panel 300. Preferably, the functional element is positioned substantially at the midpoint between the substrate 310 and the counter substrate 370, in which case a change in the form of the functional element can be prevented.

Furthermore, the substrate 310 is preferably formed using a material whose coefficient of linear expansion is substantially equal to that of the counter substrate 370. The coefficient of linear expansion of the material is preferably lower than or equal to $1\times10^{-3}$/K, more preferably lower than or equal to $5\times10^{-5}$/K, and still more preferably lower than or equal to $1\times10^{-5}$/K.

For example, materials that contain polyester, polyolefin, polyamide (e.g., nylon or aramid), polyimide, polycarbonate, polyurethane, an acrylic resin, an epoxy resin, or a resin having a siloxane bond such as silicone, can be used for the substrate 310 and the counter substrate 370.

The substrate 310 is a stack including a substrate 310b having flexibility, a barrier film 310a that prevents diffusion of impurities into light-emitting elements, and a resin layer 310c that attaches the barrier film 310a to the substrate 310b.

The counter substrate 370 is a stack including a base 370b having flexibility, a barrier film 370a that prevents diffusion of impurities into the light-emitting elements, and a resin layer 370c that attaches the barrier film 370a to the base 370b (see FIG. 7B).

A sealant 360 attaches the counter substrate 370 to the substrate 310. The sealant 360 has a refractive index higher than that of air, and functions also as an optical adhesive layer. The pixel circuits and the light-emitting elements (e.g., a first light-emitting element 350R) are provided between the substrate 310 and the counter substrate 370.

<Structure of Pixel>

Each of the pixels 302 includes the sub-pixel 302R, a sub-pixel 302G, and a sub-pixel 302B (see FIG. 7C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 7B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 7C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light with a particular wavelength and is, for example, a layer that selectively transmits red, green, or blue light. Alternatively, a region that transmits light emitted from the light-emitting element as it is may be provided.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360, which also serves as an optical adhesive layer, and the first coloring layer 367R and is emitted to the outside of the light-emitting module 380R as indicated by arrows in FIGS. 7B and 7C. The data processing device of one embodiment of the present invention includes the first film 102 in the direction of the arrows.

<Structure of Display Panel>

The touch panel 300 includes a light-blocking layer 367BM on the counter substrate 370. The light-blocking layer 367BM is provided so as to surround the coloring layer (e.g., the first coloring layer 367R).

The touch panel 300 includes an anti-reflective layer 367p positioned in a region overlapping with the display portion 301. As the anti-reflective layer 367p, for example, a circular polarizing plate can be used.

The touch panel 300 includes an insulating film 321. In FIG. 7B, the insulating film 321 covers the transistor 302t. Note that the insulating film 321 can be used as a layer for planarizing unevenness caused by the pixel circuits. The insulating film 321 may be an insulating film on which a layer that can prevent diffusion of impurities into the transistor 302t and the like is stacked.

The touch panel 300 includes the light-emitting elements (e.g., the first light-emitting element 350R) over the insulating film 321.

The touch panel 300 includes, over the insulating film 321, a partition wall 328 that overlaps with an end portion of the first lower electrode 351R (see FIG. 7C). In addition, a spacer 329 that controls the distance between the substrate 310 and the counter substrate 370 is provided on the partition wall 328.

<Structure of Image Signal Line Driver Circuit>

The image signal line driver circuit 303s(1) includes a transistor 303t and a capacitor 303c. Note that the driver circuit and the pixel circuits can be formed in the same process and over the same substrate.

<Structure of Imaging Pixel>

The imaging pixels 308 each include a photoelectric conversion element 308p and an imaging pixel circuit for sensing light received by the photoelectric conversion element 308p. In addition, the imaging pixel circuit includes a transistor 308t.

For example, a PIN photodiode can be used as the photoelectric conversion element 308p.

<Other Components>

The touch panel 300 includes a wiring 311 for supplying a signal, and the wiring 311 is provided with a terminal 319. Note that an FPC 309(1) that can supply a signal such as an image signal or a synchronization signal is electrically connected to the terminal 319. The terminal 319 may be connected to two FPCs, the FPC 309(1) and an FPC 309(2) (see FIG. 6A), or may be connected to one FPC 309.

Note that a printed wiring board (PWB) may be attached to the FPC 309(1).

Transistors formed in the same process can be used as the transistor 302t, the transistor 303t, the transistor 308t, and the like.

Transistors of a bottom-gate type, a top-gate type, or the like can be used.

Various kinds of semiconductors can be used in the transistors. For example, an oxide semiconductor, single crystal silicon, polysilicon, amorphous silicon, or the like can be used.

This embodiment can be combined with any of the other embodiments in this specification as appropriate.

Embodiment 3

In this embodiment, a structure of a flexible touch panel that can be used in the panel substrate of the data processing device of one embodiment of the present invention will be described with reference to FIGS. 8A and 8B and FIGS. 9A to 9C.

Figure 8A:
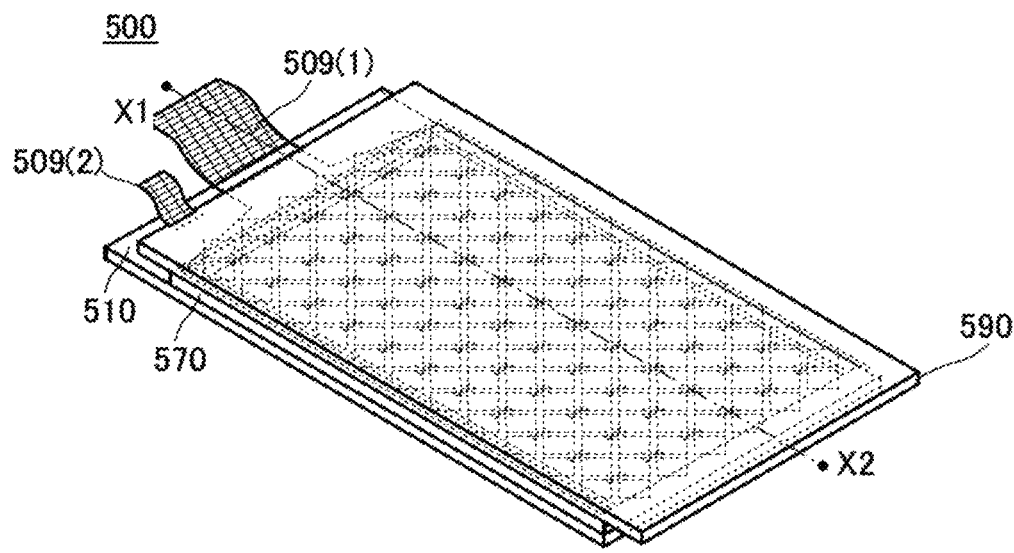
FIGS. 8A and 8B are perspective views illustrating a touch panel of one embodiment of the present invention.
Figure 8B:
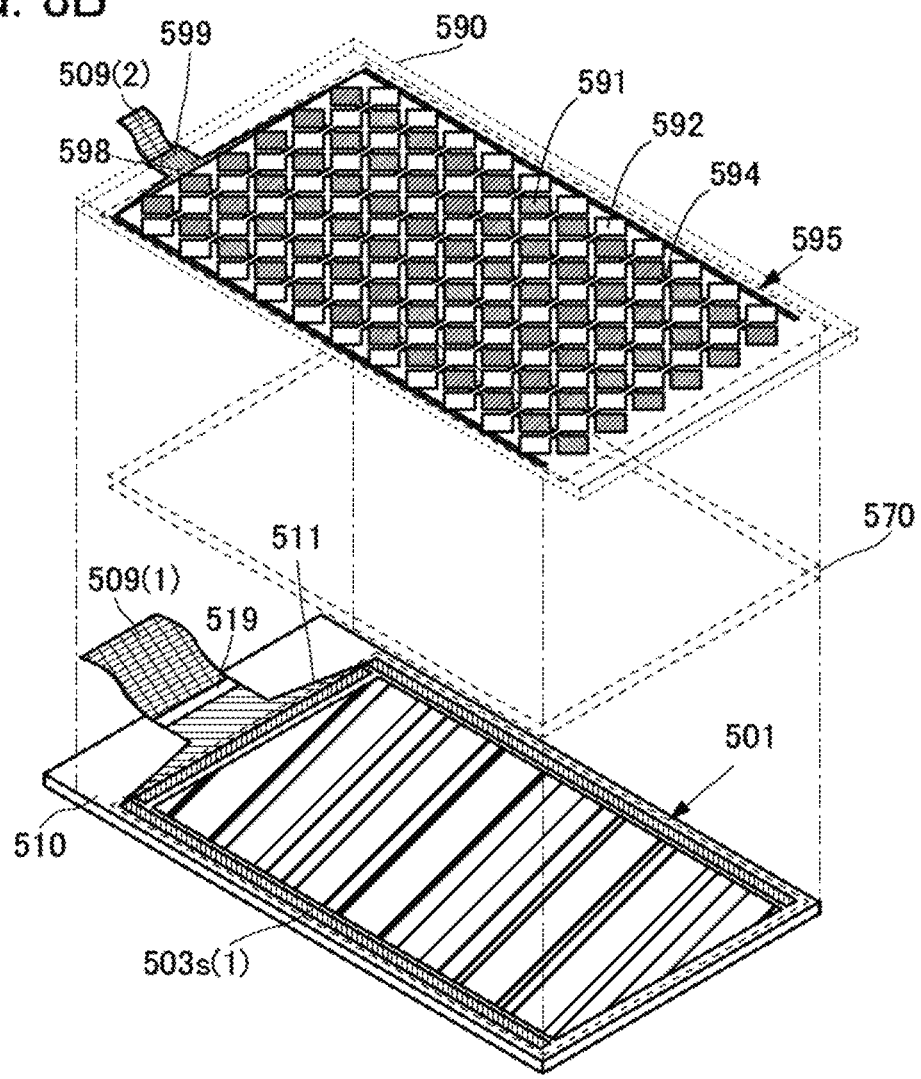

FIG. 8A is a perspective view of a touch panel 500 exemplified in this embodiment. Note that FIGS. 8A and 8B illustrate only main components for simplicity. FIG. 8B is a perspective view of the touch panel 500.

Figure 9A:
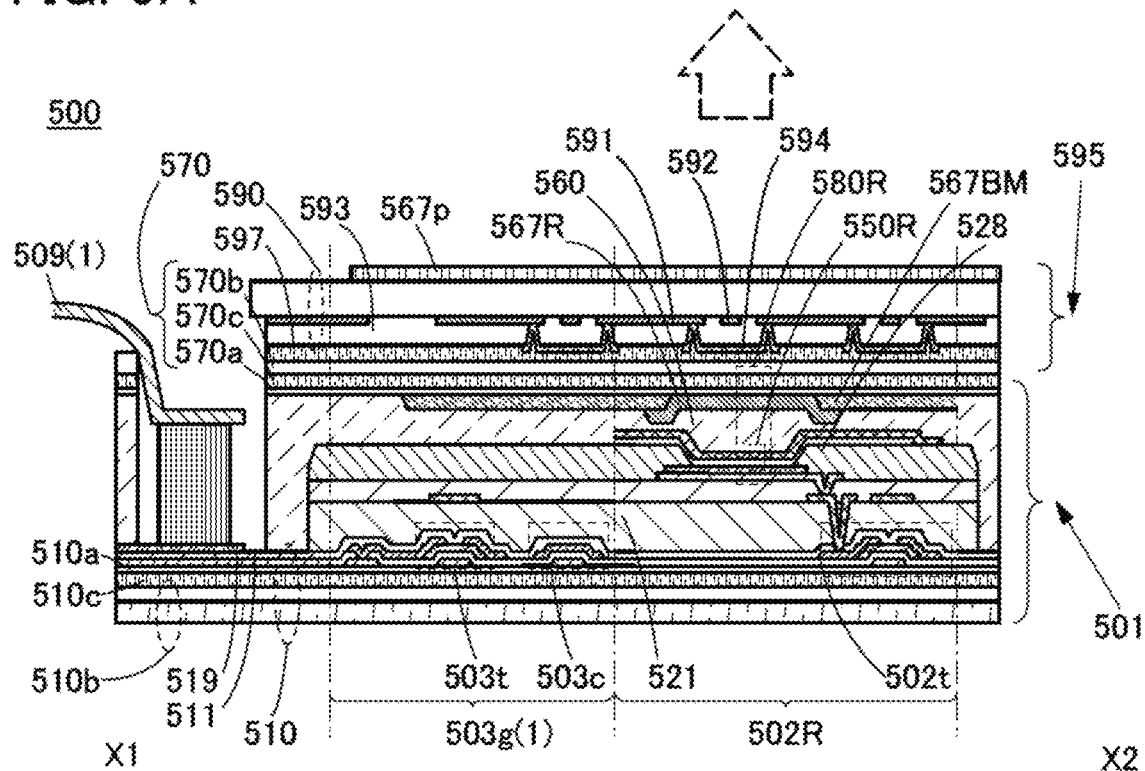
FIGS. 9A to 9C are cross-sectional views illustrating a touch panel of one embodiment of the present invention.

FIG. 9A is a cross-sectional view of the touch panel 500 along X1-X2 in FIG. 8A.

The touch panel 500 includes a display portion 501 and a touch sensor 595 (see FIG. 8B). Furthermore, the touch panel 500 includes a substrate 510, a substrate 570, and a substrate 590. Note that the substrates 510, 570, and 590 each have flexibility.

The display portion 501 includes the substrate 510, a plurality of pixels over the substrate 510, a plurality of wirings 511 through which signals are supplied to the pixels, and an image signal line driver circuit 503s(1). The plurality of wirings 511 are led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 are led to a peripheral portion of the substrate 590, and part of the plurality of wirings 598 forms a terminal. The terminal is electrically connected to an FPC 509(2). Note that in FIG. 8B, electrodes, wirings, and the like of the touch sensor 595 provided on the back side of the substrate 590 (the side that faces the substrate 510) are indicated by solid lines for clarity.

As the touch sensor 595, for example, a capacitive touch sensor can be used. Examples of the capacitive touch sensor include a surface capacitive touch sensor and a projected capacitive touch sensor.

Examples of the projected capacitive touch sensor include a self capacitive touch sensor and a mutual capacitive touch sensor, which differ mainly in the driving method. The use of a mutual capacitive type is preferred because multiple points can be sensed simultaneously.

The case of using a projected capacitive touch sensor will be described below with reference to FIG. 8B.

Note that a variety of sensors that can sense the proximity or touch of a sensing target such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 8A and 8B.

The electrodes 591 each have a quadrangular shape and are arranged in the direction intersecting with the direction in which the electrodes 592 extend.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light transmitted through the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that the space between the electrodes 591 is reduced as much as possible, and the plurality of electrodes 592 may be provided with an insulating layer interposed between the electrodes 591 and the electrodes 592 and may be spaced apart from each other to form a region not overlapping with the electrodes 591. In that case, a dummy electrode that is electrically insulated from these electrodes is preferably provided between two adjacent electrodes 592, whereby the area of a region having a different transmittance can be reduced.

The structure of the touch sensor 595 will be described with reference to FIGS. 9A to 9C.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

A resin layer 597 attaches the substrate 590 to the substrate 570 such that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used. Note that a film including graphene can be used as well. The film including graphene can be formed, for example, by reducing a film containing graphene oxide. As a reducing method, a method of applying heat or the like can be employed.

The electrodes 591 and the electrodes 592 can be formed by depositing a light-transmitting conductive material on the substrate 590 by a sputtering method and then removing an unnecessary portion by any of various patterning techniques such as photolithography.

Examples of a material for the insulating layer 593 include a resin such as an acrylic resin, an epoxy resin, a resin having a siloxane bond such as silicone, and inorganic insulating materials such as silicon oxide, silicon oxynitride, and aluminum oxide.

Furthermore, openings that reach the electrodes 591 are formed in the insulating layer 593, and the wiring 594 electrically connects the adjacent electrodes 591. A light-transmitting conductive material can be favorably used for the wiring 594 because the aperture ratio of the touch panel can be increased. Moreover, a material that has higher conductivity than the electrodes 591 and 592 can be favorably used for the wiring 594 because electric resistance can be reduced.

One electrode 592 extends in one direction, and a plurality of electrodes 592 are provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 are not necessarily arranged in the direction orthogonal to one electrode 592 and may be arranged to intersect with one electrode 592 at an angle of less than 90 degrees.

Each wiring 598 is electrically connected to the electrode 591 or the electrode 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Figure 9B:
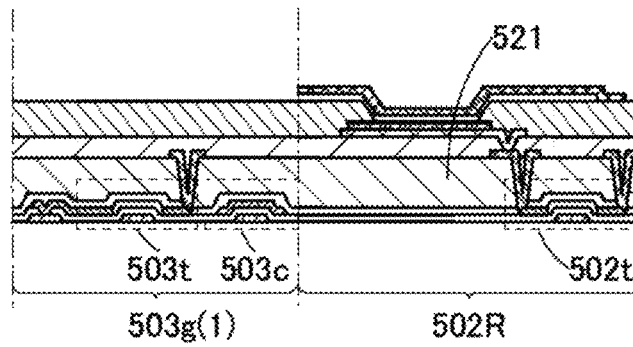
Figure 9C:
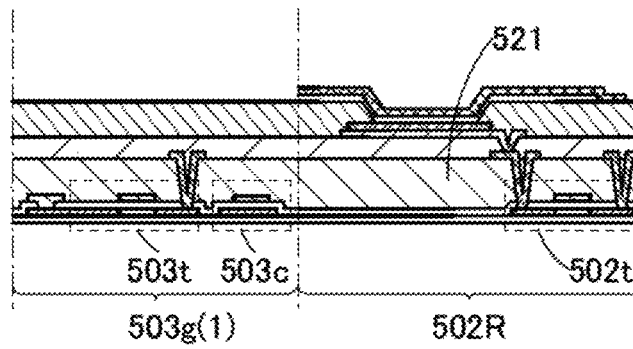

Although not illustrated in FIGS. 9A to 9C, a connection layer 599 electrically connects the wiring 598 to the FPC 509(2).

As the connection layer 599, any of various anisotropic conductive films (ACF), anisotropic conductive pastes (ACP), and the like can be used.

The resin layer 597 has a light-transmitting property. For example, a thermosetting resin or an ultraviolet curable resin can be used; specifically, an acrylic resin, polyurethane, an epoxy resin, or a resin having a siloxane bond such as silicone can be used.

<Display Portion>

The display portion 501 includes a plurality of pixels arranged in a matrix. Each of the pixels includes a display element and a pixel circuit for driving the display element.

In the description of this embodiment, an organic electroluminescent element that emits white light is used as a display element; however, the display element is not limited to such an element.

For example, organic electroluminescent elements that emit light of different colors may be included in sub-pixels so that the light of different colors can be emitted from the respective sub-pixels.

Other than organic electroluminescent elements, various display elements such as display elements (electronic ink) that perform display by an electrophoretic method, an electrowetting method, or the like; MEMS shutter display elements; optical interference type MEMS display elements; and liquid crystal elements can be used. Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some or all of pixel electrodes function as reflective electrodes. For example, some or all of pixel electrodes are formed to contain aluminum, silver, or the like. In such a case, a storage circuit such as an SRAM can be provided under the reflective electrodes, leading to lower power consumption. In addition, a structure suitable for employed display elements can be selected from a variety of structures of pixel circuits.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. These elements are manufactured in a small number of steps, resulting in reduced manufacturing costs or improved yield. Alternatively, the aperture ratio can be increased because these elements have small sizes, which reduces power consumption or achieves higher luminance.

As a method other than the active matrix method, the passive matrix method in which an active element (a non-linear element) is not used can also be used. Since an active element (a non-linear element) is not used, the number of manufacturing steps can be reduced, resulting in reduced manufacturing costs or improved yield. The aperture ratio can be increased because an active element (a non-linear element) is not used; accordingly, lower power consumption, higher luminance, and the like can be achieved.

Flexible materials can be favorably used for the substrate 510 and the substrate 570.

Materials with which passage of impurities is inhibited can be favorably used for the substrate 510 and the substrate 570. For example, materials with a vapor permeability of lower than or equal to $10^{-5}$ g/m$^2$·day, preferably lower than or equal to $10^{-6}$ g/m$^2$·day can be favorably used.

The substrate 510 can be favorably formed using a material whose coefficient of linear expansion is substantially equal to that of the substrate 570. For example, the coefficient of linear expansion of the material is preferably lower than or equal to $1\times10^{-3}$/K, more preferably lower than or equal to $5\times10^{-5}$/K, and still more preferably lower than or equal to $1\times10^{-5}$/K.

The substrate 510 is a stack including a substrate 510b having flexibility, a barrier film 510a that prevents diffusion of impurities into light-emitting elements, and a resin layer 510c that attaches the barrier film 510a to the substrate 510b.

For example, polyester, polyolefin, polyamide (e.g., nylon or aramid), polyimide, polycarbonate, an acrylic resin, polyurethane, an epoxy resin, or a resin having a siloxane bond, can be used for the resin layer 510c.

The substrate 570 is a stack including a substrate 570b having flexibility, a barrier film 570a that prevents diffusion of impurities into light-emitting elements, and a resin layer 570c that attaches the barrier film 570a to the substrate 570b.

A sealant 560 attaches the substrate 570 to the substrate 510. The sealant 560 has a refractive index higher than that of air. In the case of extracting light to the sealant 560 side, the sealant 560 also serves as an optical adhesive layer. The pixel circuits and the light-emitting elements (e.g., a first light-emitting element 550R) are positioned between the substrate 510 and the substrate 570.

<Structure of Pixel>

A pixel includes a sub-pixel 502R, and the sub-pixel 502R includes a light-emitting module 580R.

The sub-pixel 502R includes the first light-emitting element 550R and a pixel circuit that can supply electric power to the first light-emitting element 550R and includes a transistor 502t. Furthermore, the light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light with a particular wavelength and is, for example, a layer that selectively transmits red, green, or blue light. Note that in another sub-pixel, a region that transmits light emitted from the light-emitting element with no change may be provided.

In the case where the sealant 560 is provided on the light extraction side, the sealant 560 is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the first coloring layer 567R and is emitted to the outside of the light-emitting module 580R as indicated by an arrow in FIG. 9A. The data processing device of one embodiment of the present invention includes the first film 102 in the direction of the arrows.

<Structure of Display Portion>

The display portion 501 includes a light-blocking layer 567BM on the light extraction side. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness due to the pixel circuit. A layered film including a layer that can prevent diffusion of impurities can be used as the insulating film 521. This can prevent the reliability of the transistor 502t or the like from being lowered by diffusion of impurities.

The display portion 501 includes the light-emitting elements (e.g., the first light-emitting element 550R) over the insulating film 521.

The display portion 501 includes, over the insulating film 521, an insulating film 528 that overlaps with an end portion of the lower electrode. In addition, a spacer that controls the distance between the substrate 510 and the substrate 570 is provided on the insulating film 528.

<Structure of Scan Line Driver Circuit>

A scan line driver circuit 503g(1) includes a transistor 503t and a capacitor 503c. Note that the driver circuit and the pixel circuits can be formed in the same process and over the same substrate.

<Other Components>

The display portion 501 includes the wirings 511 for supplying signals, and the wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

The display portion 501 includes wirings such as scan lines, signal lines, and power supply lines. Various conductive films can be used for the wirings.

Specifically, a metal element selected from aluminum, chromium, copper, tantalum, titanium, molybdenum, tungsten, nickel, yttrium, zirconium, silver, and manganese; an alloy containing any of the above-described metal elements; an alloy containing any of the above-described metal elements in combination; or the like can be used. In particular, one or more elements selected from aluminum, chromium, copper, tantalum, titanium, molybdenum, and tungsten are preferably contained. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked structure in which an alloy film or a nitride film that contains one or more elements selected from titanium, tantalum, tungsten, molybdenum, chromium, neodymium, and scandium is stacked over an aluminum film can be used.

Alternatively, a light-transmitting conductive material containing indium oxide, tin oxide, or zinc oxide may be used.

<Modification Example 1 of Display Portion>

Various kinds of transistors can be used in the display portion 501.

In the structure illustrated in FIGS. 9A and 9B, bottom-gate transistors are used in the display portion 501.

For example, a semiconductor layer containing an oxide semiconductor, amorphous silicon, or the like can be used in the transistor 502t and the transistor 503t illustrated in FIG. 9A.

For example, a film represented by an In-M-Zn oxide that contains at least indium (In), zinc (Zn), and M (a metal such as Al, Ga, Ge, Y, Zr, Sn, La, Ce, or Hf) is preferably included. Alternatively, both In and Zn are preferably contained.

For example, a semiconductor layer containing polycrystalline silicon that is obtained by crystallization process such as laser annealing can be used in the transistor 502t and the transistor 503t illustrated in FIG. 9B.

In the structure illustrated in FIG. 9C, top-gate transistors are used in the display portion 501.

For example, a semiconductor layer containing polycrystalline silicon, a single crystal silicon film that is transferred from a single crystal silicon substrate, or the like can be used in the transistor 502t and the transistor 503t illustrated in FIG. 9C.

This embodiment can be combined with any of the other embodiments in this specification as appropriate.

Embodiment 4

In this embodiment, a structure of a display device that includes a first display element and a second display element in a display panel, provided in the data processing device of one embodiment of the present invention, is described. This display device can also allow the input/output operations described in Embodiment 1 by using a flexible material in a substrate included in the display device.

The display panel includes pixels, and has a function of receiving first data and second data.

Each of the pixels includes the first display element and the second display element.

The first display element has a function of displaying images on the basis of the first data, and the second display element has a function of displaying images on the basis of the second data.

Figure 10:
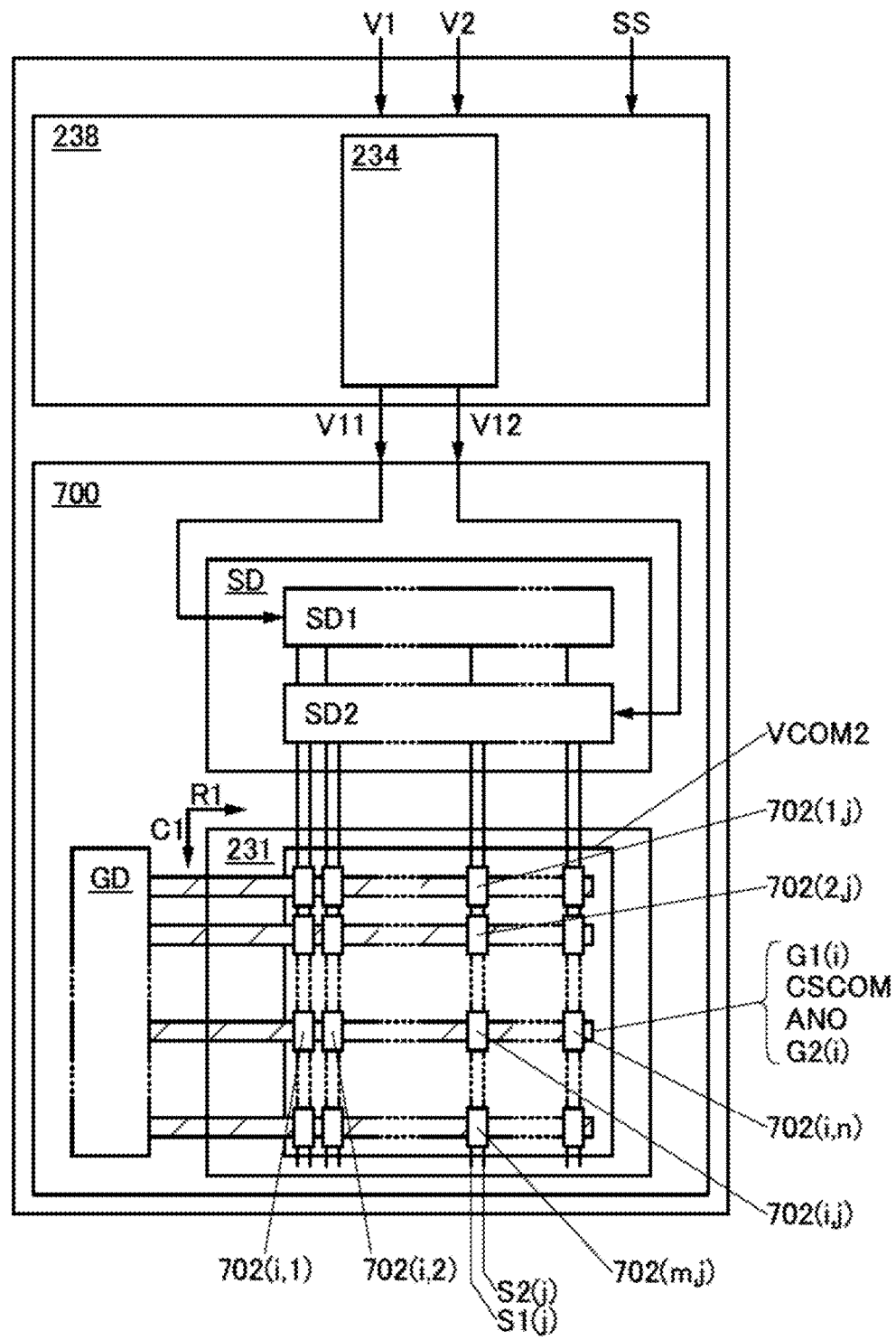
FIG. 10 is a block diagram illustrating a configuration of a display device of one embodiment of the present invention.

FIG. 10 is a block diagram illustrating the structure of the display device of one embodiment of the present invention.

The display device described in this embodiment includes a display panel 700 and a control portion 238 (see FIG. 10).

<Control portion 238>

The control portion 238 has a function of receiving the image data V1, the image data V2, and control data SS.

The control portion 238 has a function of generating first data V11 on the basis of the image data V1. In addition, the control portion 238 has a function of generating second data V12 on the basis of the image data V2.

In addition, the control portion 238 has a function of supplying the first data V11 and the second data V12.

For example, the control portion 238 includes a decompression circuit 234.

<Display Panel 700>

The display panel 700 has a function of receiving the first data V11 to the second data V12, and the display panel 700 includes a pixel 702($i, j$).

Figure 12A:
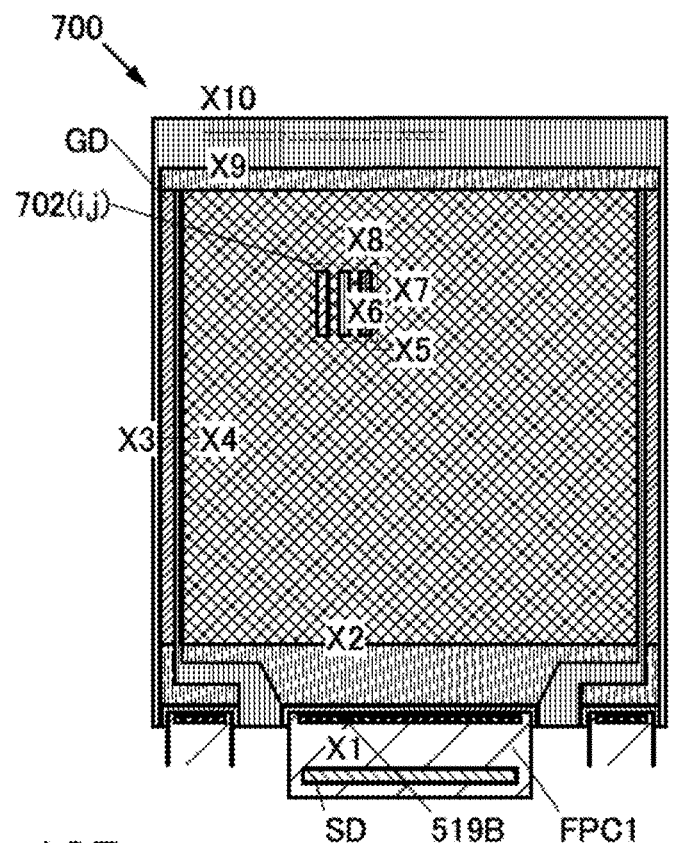
FIGS. 12A to 12C illustrate a configuration of a display panel that can be used for a display device of one embodiment of the present invention.
Figure 12B:
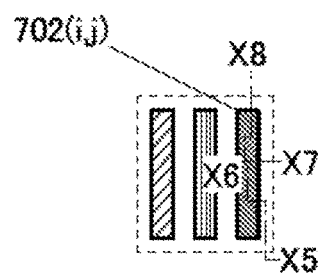
Figure 12C:
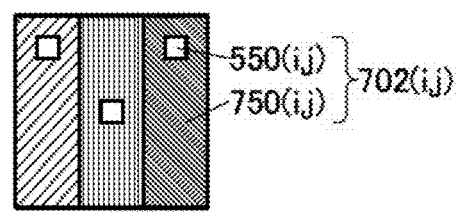

The pixel 702($i, j$) includes a first display element 750($i, j$) and a second display element 550($i, j$) (see FIG. 12C).

The first display element 750($i, j$) has a function of displaying an image on the basis of the first data V11, and the second display element 550($i, j$) has a function of displaying an image on the basis of the second data V12.

For example, a display panel described in Embodiment 2 or Embodiment 3 can be used for the display panel 700.

For example, a display element that can display images with lower power consumption than the first display element 750($i, j$) can be used for the second display element 550($i, j$). Specifically, a reflective display element can be used as the first display element 750($i, j$). In addition, a light-emitting element can be used for the second display element 550($i, j$).

Thus, an image with a high contrast ratio can be displayed with low power consumption as compared with a case using only the second display element. An image with a high contrast ratio can be displayed while a reduction in the reliability of the second display element is suppressed as compared with a case using only the second display element. Alternatively, a sharp and clear image can be displayed as compared with a case using only the first display element. Consequently, a novel display device that is highly convenient or reliable can be provided.

For example, a display element which can express a wider color gamut than a color gamut that can be expressed by the first display element 750($i, j$) can be used for the second display element 550($i, j$). Specifically, as the second display element, an organic EL element can be used, which can express a wider color gamut than a color gamut that can be expressed by a reflective liquid crystal element used as the first display element 750($i, j$).

Accordingly, an image can be displayed with an increased visibility as compared with an image displayed using only the first display element. Alternatively, a sharp and clear image can be displayed as compared with an image displayed using only the first display element. Alternatively, a vividly colored image can be displayed as compared with an image displayed using only the first display element. Consequently, a novel display device that is highly convenient or reliable can be provided.

The configuration in which the reflective display element is used as the first display element 750($i, j$) to reduce power consumption is suitable for the case where, as in the present invention, the first image 121 that is imaged with the camera 113 is displayed for a long time and is not important for the input/output operation. In particular, this configuration is suitable when the data processing device is a portable terminal and is seen under bright external light. In addition, the configuration in which the light-emitting element is used as the second display element 550($i, j$) to display images with increased visibility is suitable for the case where the second image 122 is displayed for a short time and is important for the input/output operation.

<Decompression Circuit 234>

The decompression circuit 234 has a function of decompressing the image data V1 and the image data V2 that are supplied in a compressed state. The decompression circuit 234 includes a memory portion. The memory portion has a function of storing the decompressed image data, for example.

This embodiment can be combined with any of the other embodiments in this specification as appropriate.

Embodiment 5

In this embodiment, the structure of the display panel 700 which can be used in the data processing device described in Embodiment 1 is described with reference to FIG. 10, FIG. 11, FIGS. 12A, 12B, and 12C, FIGS. 13A and 13B, FIGS. 14A and 14B, FIGS. 15A and 15B, FIG. 16, and FIGS. 17A, 17B, and 17C.

FIG. 10 is a block diagram illustrating the structure of the display device of one embodiment of the present invention. The display device includes a display panel.

Figure 11:
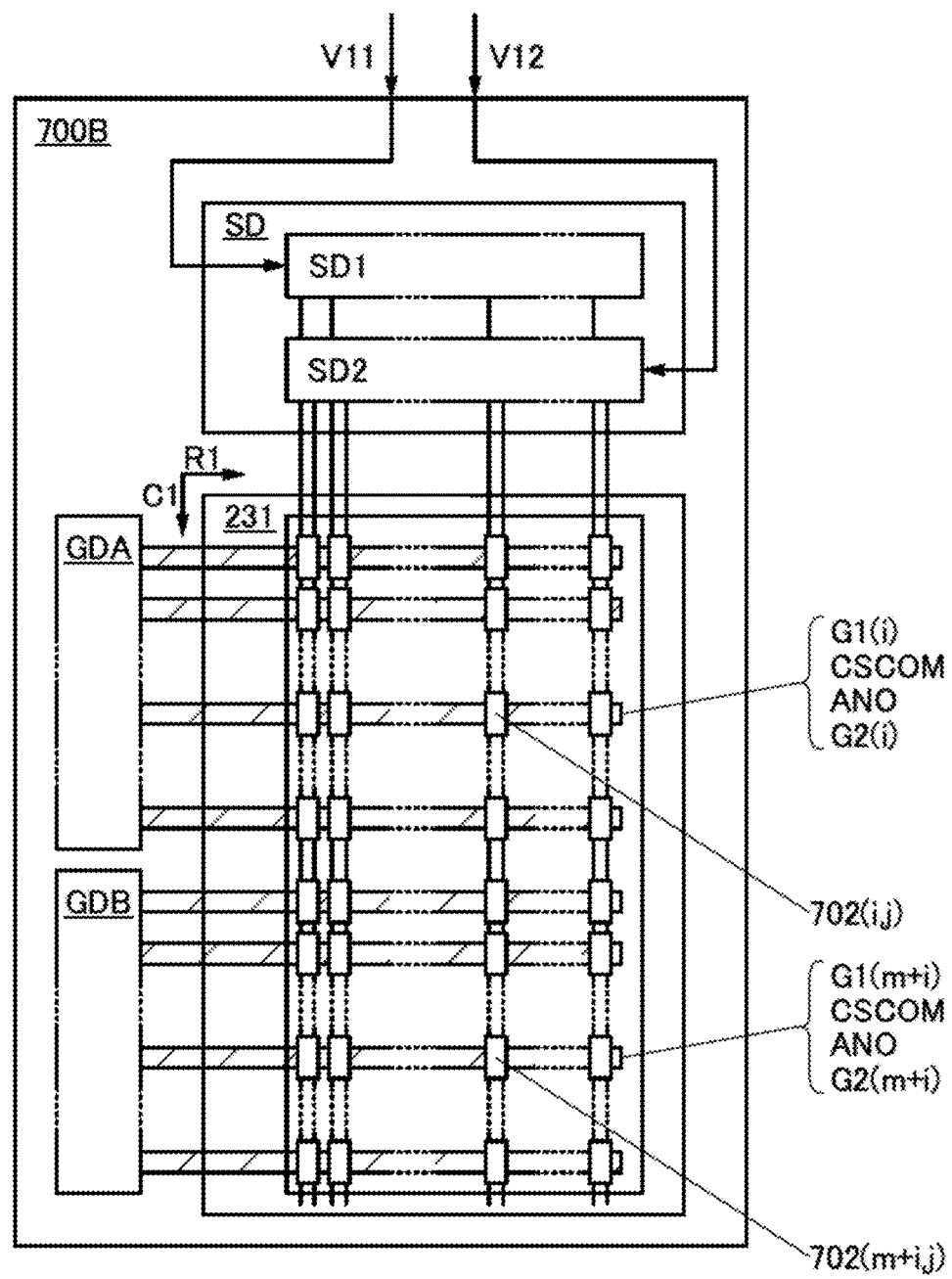
FIG. 11 is a block diagram illustrating a configuration of a display portion of a data processing device of one embodiment of the present invention.

FIG. 11 is a block diagram illustrating a structure of the display panel of the display device of one embodiment of the present invention. FIG. 11 is a block diagram illustrating a structure different from that in FIG. 10.

FIGS. 12A, 12B and 12C illustrate a structure of a display panel that can be used in the display device of one embodiment of the present invention. FIG. 12A is a top view of the display panel, and FIG. 12B is a top view illustrating part of a pixel of the display panel in FIG. 12A. FIG. 12C is a schematic view illustrating the structure of the pixel in FIG. 12B.

Figure 13A:
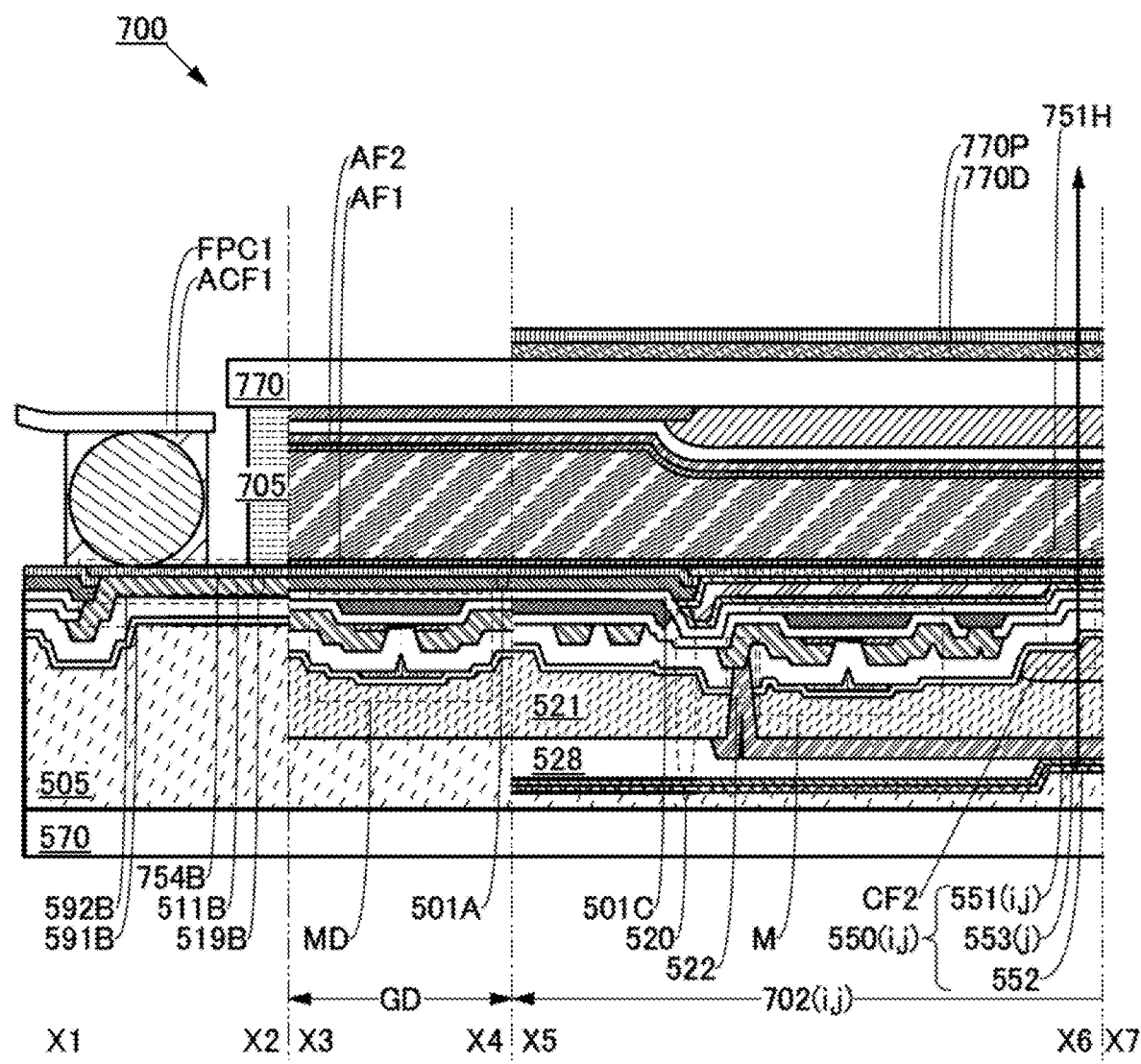
FIGS. 13A and 13B are cross-sectional views that illustrate a configuration of a display panel that can be used for a display device of one embodiment of the present invention.
Figure 13B:
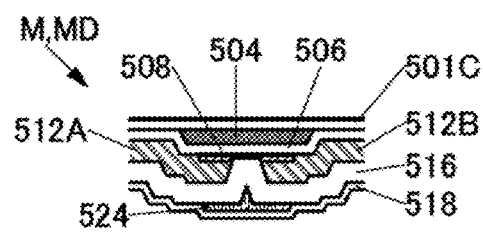

FIGS. 13A and 13B and FIGS. 14A and 14B are cross-sectional views each illustrating the structure of the display panel. FIG. 13A is a cross-sectional view taken along lines X1-X2, X3-X4, and X5-X6 in FIG. 12A, and FIG. 13B illustrates part of FIG. 13A.

Figure 14A:
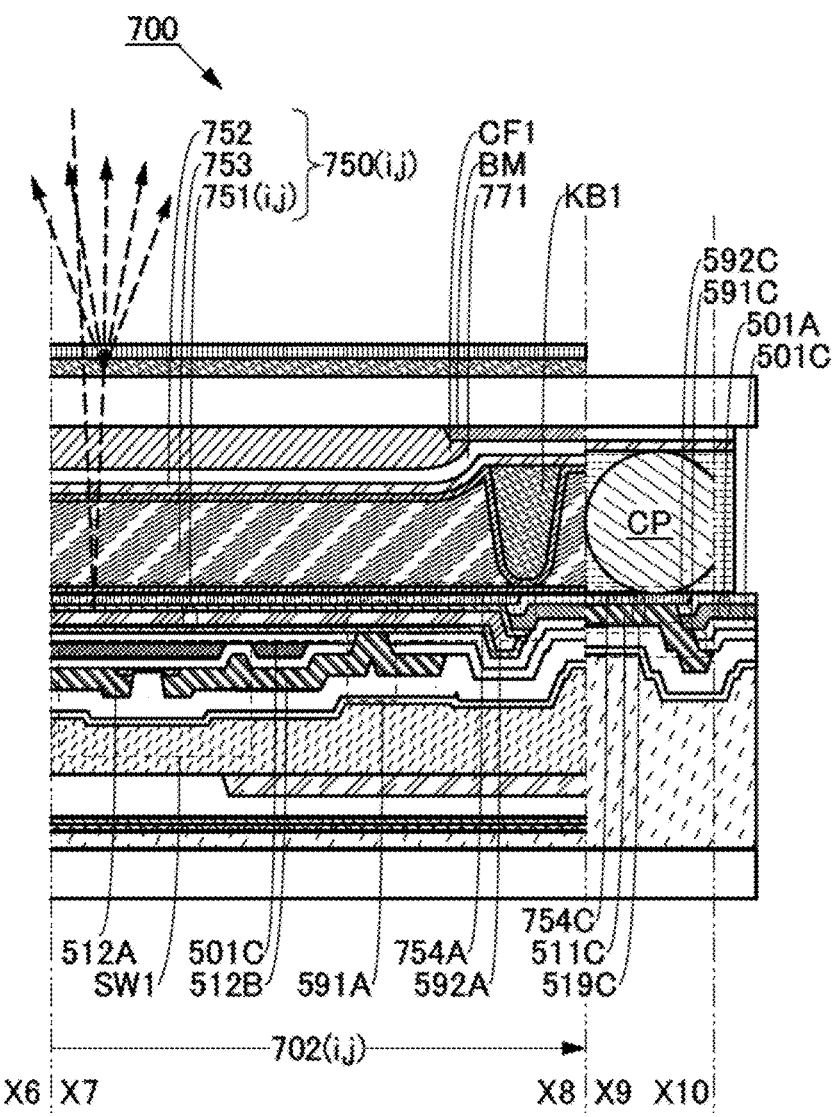
FIGS. 14A and 14B are cross-sectional views that illustrate a configuration of a display panel that can be used for a display device of one embodiment of the present invention.
Figure 14B:
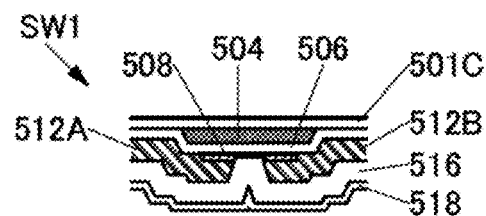

FIG. 14A is a cross-sectional view taken along lines X7-X8 and X9-X10 in FIG. 12A, and FIG. 14B illustrates part of FIG. 14A.

Figure 15A:
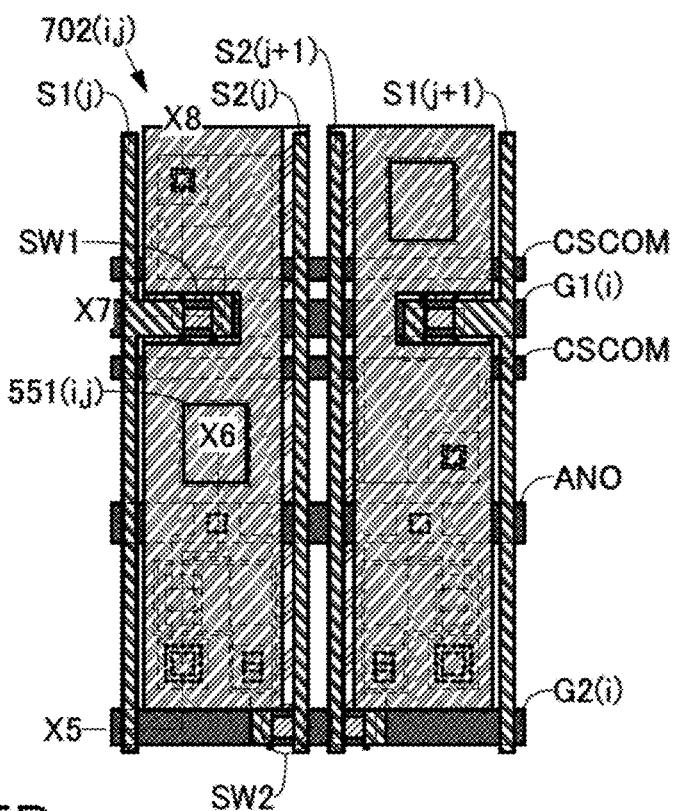
FIGS. 15A and 15B are bottom views that illustrate a configuration of a display panel that can be used for a display device of one embodiment of the present invention.
Figure 15B:
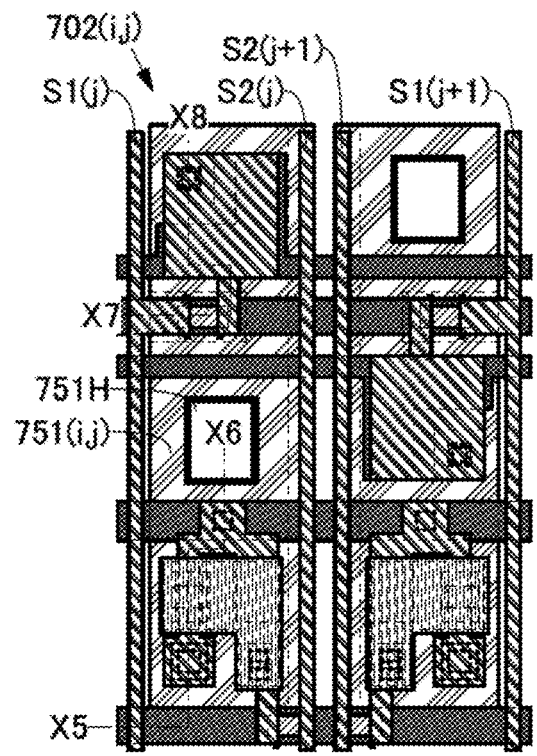

FIG. 15A is a bottom view illustrating part of the pixel of the display panel illustrated in FIG. 12B, and FIG. 15B is a bottom view illustrating the part of the structure illustrated in FIG. 15A in which some components are omitted.

Figure 16:
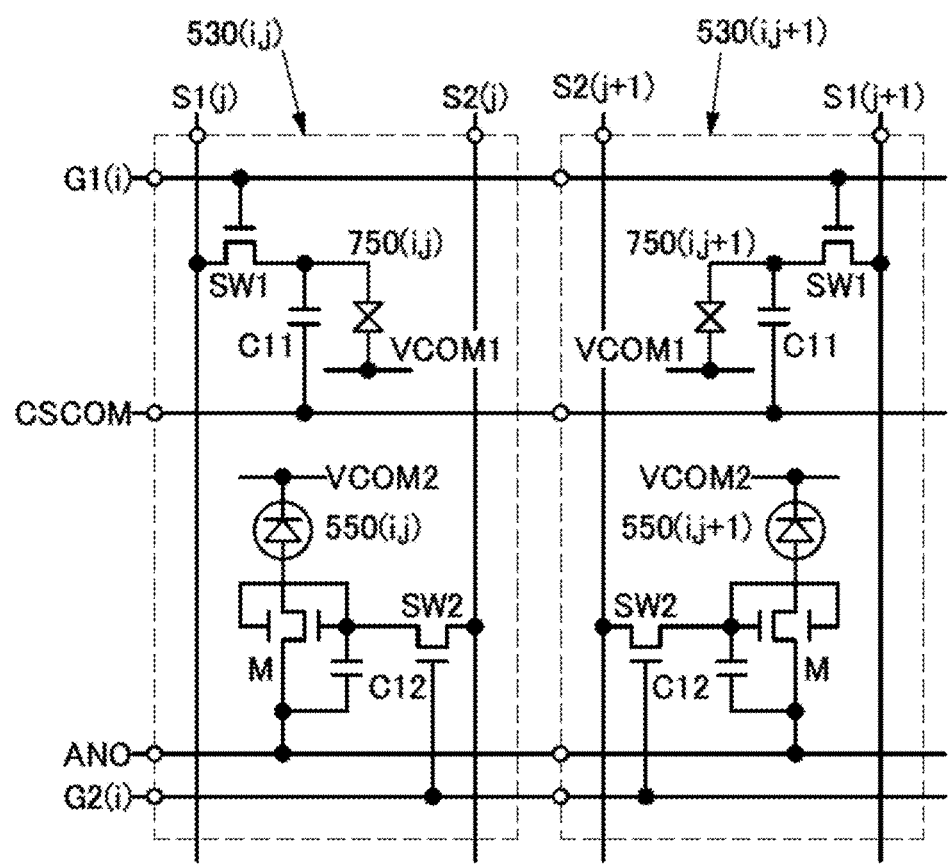
FIG. 16 is a circuit diagram that illustrates a configuration of a display panel that can be used for a display device of one embodiment of the present invention.

FIG. 16 is a circuit diagram illustrating a configuration of a pixel circuit included in a display panel of one embodiment of the present invention.

Figure 17A:
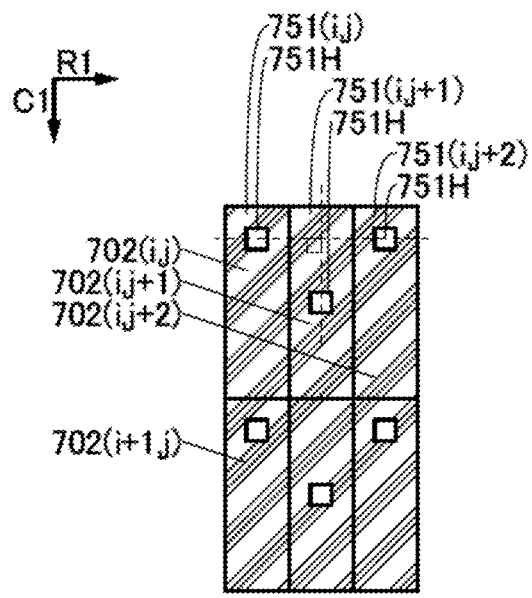
FIGS. 17A to 17C are schematic diagrams that each illustrate a shape of a reflective film of a pixel that can be used for a display device of one embodiment of the present invention.
Figure 17B:
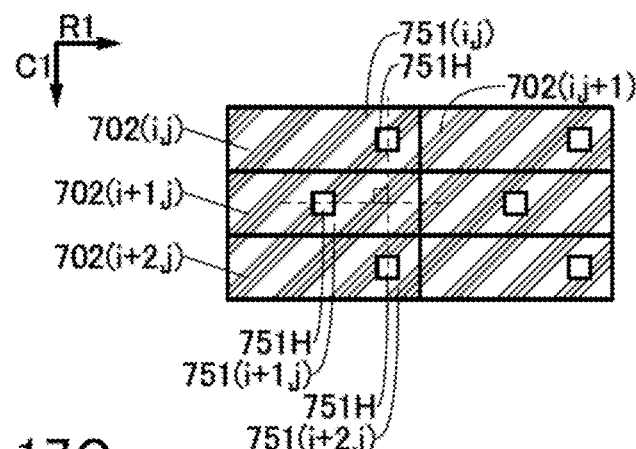
Figure 17C:
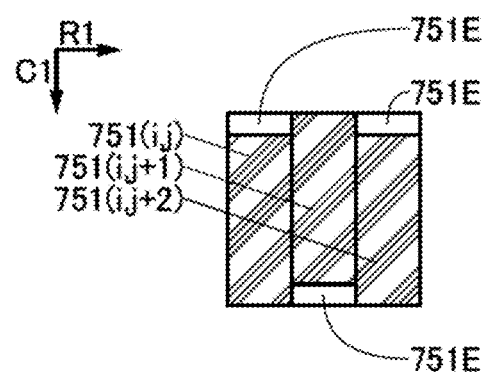

FIGS. 17A, 17B, and 17C are schematic views each illustrating the shape of a reflective film that can be used in the pixel of the display panel.

Note that in this specification, an integral variable of 1 or more may be used for reference numerals. For example, "(p)" where p is an integral value of 1 or more may be used for part of a reference numeral that specifies any one of components (p components at the maximum). For another example, "(m, n)" where m and n are each an integral value of 1 or more may be used for part of a reference numeral that specifies any one of components (m×n components at the maximum).

<Structural Example 1 of Display Panel>

The display panel 700 described in this embodiment includes a display region 231 (see FIG. 10). Note that the display panel 700 includes a driving circuit GD or a driving circuit SD.

A display panel can include a plurality of driver circuits. For example, a display panel 700B can include a driver circuit GDA and a driver circuit GDB (see FIG. 11).

<Display Region 231>

A display region 231 includes one group of pixels 702(*i*, 1) to 702(*i*, *n*), another group of pixels 702(1, *j*) to 702(*m*, *j*), and a scan line G1(*i*) (see FIG. 10 and FIGS. 15A and 15B or FIG. 16). In addition, a scanning line G2(*i*), a wiring CSCOM, a third conductive film ANO, and a signal line S2(*j*) are included. Note that i is an integer greater than or equal to 1 and less than or equal to m, j is an integer greater than or equal to 1 and less than or equal to n, and each of m and n is an integer greater than or equal to 1.

The one group of pixels 702(*i*, 1) to 702(*i*, *n*) include the pixel 702(*i*, *j*) and are provided in the row direction (the direction indicated by the arrow R1 in the drawing).

The another group of pixels 702(1, *j*) to 702(*m*, *j*) include the pixel 702(*i*, *j*) and are provided in the column direction (the direction indicated by the arrow C1 in the drawing) that intersects the row direction.

The scan line G1(*i*) and the scan line G2(*i*) are electrically connected to the group of pixels 702(*i*, 1) to 702(*i*, *n*) provided in the row direction.

The signal line S1(*j*) and the signal line S2 (*j*) are electrically connected to the another group of the pixels 702(1, *j*) to 702(*m*, *j*) arranged in the column direction.

<Driver Circuit GD>

The driver circuit GD is configured to supply a selection signal in accordance with the control data.

For example, the driver circuit GD has a function of supplying a selection signal to one scan line at a frequency of 30 Hz or higher, preferably 60 Hz or higher, in accordance with the control data. Accordingly, moving images can be smoothly displayed.

For example, the driver circuit GD is configured to supply a selection signal to one scan line at a frequency of lower than 30 Hz, preferably lower than 1 Hz, more preferably less than once per minute, in accordance with the control data. Accordingly, a still image can be displayed while flickering is suppressed.

For example, in the case where a plurality of driver circuits is provided, the driver circuits GDA and GDB may supply the selection signals at different frequencies. Specifically, the selection signal can be supplied at a higher frequency to a region on which moving images are smoothly displayed than to a region on which a still image is displayed in a state where flickering is suppressed.

<Driver Circuit SD, Driver Circuit SD1, Driver Circuit SD2>

The driver circuit SD includes a driver circuit SD1 and a driver circuit SD2. The driver circuit SD1 has a function of supplying an image signal on the basis of the data V11, and the driver circuit SD2 has a function of supplying an image signal on the basis of the data V12 (see FIG. 10).

The driver circuit SD1 has a function of generating an image signal that is to be supplied to a pixel circuit electrically connected to one display element. Specifically, the driver circuit SD1 has a function of generating a signal whose polarity is inverted. Thus, for example, a liquid crystal display element can be driven.

The driver circuit SD2 has a function of generating an image signal that is supplied to a pixel circuit electrically connected to another display element which displays an image with a method different from that of the one display element. For example, an organic EL element can be driven.

For example, any of a variety of sequential circuits, such as a shift register, can be used as the driver circuit SD.

For example, an integrated circuit in which the driver circuit SD1 and the driver circuit SD2 are integrated can be used as the driver circuit SD. Specifically, an integrated circuit formed on a silicon substrate can be used as the driver circuit SD.

For example, the driver circuit SD can be mounted on a terminal by a chip on glass (COG) method or a chip on film (COF) method. Specifically, an anisotropic conductive film can be used to mount an integrated circuit on the terminal.

<Structure Example of Pixel>

The pixel 702(*i*, *j*) includes the first display element 750(*i*, *j*), the second display element 550(*i*, *j*), and part of a functional layer 520 (see FIG. 12C, FIG. 13A, and FIG. 14A).

<Functional Layer>

The functional layer 520 includes a first conductive film, a second conductive film, an insulating film 501C, and a pixel circuit 530(*i*, *j*) (see FIGS. 13A and 13B). The functional layer 520 includes an insulating film 521, an insulating film 528, an insulating film 518, and an insulating film 516.

Note that the functional layer 520 includes a region positioned between the substrate 570 and the substrate 770.

<Insulating Film 501C>

The insulating film 501C includes a region positioned between the first conductive film and the second conductive film and the insulating film 501C has an opening 591A (see FIG. 14A).

<First Conductive Film>

For example, a first electrode 751(*i*, *j*) of the first display element 750(*i*, *j*) can be used as the first conductive film. The first conductive film is electrically connected to the first electrode 751(*i*, *j*).

<Second Conductive Film>

For example, the conductive film 512B can be used as the second conductive film. The second conductive film includes a region overlapping with the first conductive film. The second conductive film is electrically connected to the first conductive film through the opening 591A. Note that the first conductive film electrically connected to the second conductive film in the opening 591A that is formed in the insulating film 501C can be referred to as a through electrode.

The second conductive film is electrically connected to the pixel circuit 530(*i*, *j*). For example, a conductive film that functions as a source electrode or a drain electrode of a transistor used as a switch SW1 of the pixel circuit 530(*i*, *j*) can be used as the second conductive film.

<Pixel Circuit>

The pixel circuit 530(*i*, *j*) has a function of driving the first display element 750(*i*, *j*) and the second display element 550(*i*, *j*) (see FIG. 16).

Thus, the first display element and the second display element that displays an image using a method different from that of the first display element can be driven using pixel circuits that can be formed in the same process. Specifically, a reflective display element is used as the first display element, whereby the power consumption can be reduced. In addition, an image can be favorably displayed with high contrast in an environment with bright external light. In addition, the second display element which emits light is used, whereby an image can be favorably displayed in a dark environment. Furthermore, using the insulating film, impurity diffusion between the first display element and the second display element or between the first display element and the pixel circuit can be suppressed. Consequently, a novel display device that is highly convenient or reliable can be provided.

A switch, a transistor, a diode, a resistor, an inductor, a capacitor, or the like can be used in the pixel circuit 530 (i, j).

For example, one or a plurality of transistors can be used as a switch. Alternatively, a plurality of transistors connected in parallel, in series, or in combination of parallel connection and series connection can be used as a switch.

For example, the pixel circuit 530(i, j) is electrically connected to the signal line S1(j), the signal line S2(j), the scan line G1(i), the scan line G2(i), the wiring CSCOM, and the third conductive film ANO (see FIG. 16). Note that the conductive film 512A is electrically connected to the signal line S1(j) (see FIG. 14A and FIG. 16).

The pixel circuit 530(i, j) includes the switch SW1 and a capacitor C11 (see FIG. 16).

The pixel circuit 530(i, j) includes a switch SW2, a transistor M, and a capacitor C12.

For example, a transistor including a gate electrode electrically connected to the scan line G1(i) and a first electrode electrically connected to the signal line S1(j) can be used for the switch SW1.

The capacitor C11 includes a first electrode electrically connected to a second electrode of the transistor used as the switch SW1 and a second electrode electrically connected to the wiring CSCOM.

For example, a transistor including a gate electrode electrically connected to the scan line G2(i) and a first electrode electrically connected to the signal line S2(j) can be used for the switch SW2.

The transistor M includes a gate electrode electrically connected to the second electrode of the transistor used as the switch SW2 and includes a first electrode electrically connected to the third conductive film ANO.

Note that a transistor including a conductive film provided such that a semiconductor film is interposed between a gate electrode and the conductive film can be used as the transistor M. For example, as the conductive film, a conductive film electrically connected to a wiring that can supply the same potential as that of the gate electrode of the transistor M can be used.

The capacitor C12 includes a first electrode electrically connected to a second electrode of the transistor used as the switch SW2 and a second electrode electrically connected to the first electrode of the transistor M.

A first electrode of the first display element 750(i, j) is electrically connected to the second electrode of the transistor used for the switch SW1. A second electrode of the first display element 750(i, j) is electrically connected to a wiring VCOM1. This enables the first display element 750 to be driven.

Furthermore, the third electrode 551(i, j) and the fourth electrode 552 of the second display element 550(i, j) are electrically connected to the second electrode of the transistor M and the fourth conductive film VCOM2, respectively. This enables the second display element 550(i, j) to be driven.

<First Display Element 750(1,j)>

For example, a display element having a function of controlling transmission or reflection of light can be used as the first display element 750(i, j). Specifically, a reflective liquid crystal display element can be used as the first display element 750(i, j). Alternatively, a MEMS shutter display element and the like can be used. The use of a reflective display element can reduce power consumption of a display panel.

The first display element 750(i, j) includes the first electrode 751 (i, j), a second electrode 752, and a layer 753 containing a liquid crystal material. The second electrode 752 is positioned such that an electric field which controls the alignment of the liquid crystal material is generated between the second electrode 752 and the first electrode 751(i, j) (see FIG. 13A and FIG. 14A).

The first display element 750(i, j) includes an alignment film AF1 and an alignment film AF2. The alignment film AF2 includes a region provided so that a layer 753 containing a liquid crystal material is positioned between the alignment film AF2 and the alignment film AF1.

<Second Display Element 550(i, j)>

A display element having a function of emitting light can be used as the second display element 550(i, j), for example. Specifically, an organic EL element and the like can be used.

The second display element 550(i, j) has a function of emitting light toward insulating film 501C (see FIG. 13A).

The second display element 550(i, j) is provided so as to be seen in a part of a range in which an image displayed by the first display element 750(i, j) can be seen.

For example, a dashed arrow in the drawing denotes the directions in which external light is incident on and reflected by the first display element 750(i, j) that displays image data by controlling the intensity of external light reflection (see FIG. 14A). In addition, a solid arrow in the drawing denotes the direction in which the second display element 550(i, j) emits light to the part of the region from which the image displayed by the first display element 750(i, j) can be seen.

Accordingly, the image displayed using the second display element can be seen from part of the region where the image displayed using the first display element can be seen. Alternatively, users can see the image displayed without changing the attitude or the like of the display panel. Thus, a novel display panel that is highly convenient or reliable can be provided.

The second display element 550(i, j) includes a third electrode 551(i, j), a fourth electrode 552, and a layer 553(j) containing a light-emitting material (see FIG. 13A).

The fourth electrode 552 includes a region overlapping with the third electrode 551(i, j).

The layer 553(j) containing a light-emitting material includes a region positioned between the third electrode 551(i, j) and the fourth electrode 552.

The third electrode 551(i, j) is electrically connected to the pixel circuit 530(i, j) at a connection portion 522. Note that the third electrode 551(i, j) and the fourth electrode 552 are electrically connected to the third conductive film ANO and the fourth conductive film VCOM2, respectively (see FIG. 16).

<Intermediate Film>

The display panel described in this embodiment includes an intermediate film 754A, an intermediate film 754B, and an intermediate film 754C.

The intermediate film 754A includes a region which overlaps with the insulating film 501C with the first conductive film interposed therebetween, and the intermediate film 754A includes a region in contact with first electrode 751(i, j). The intermediate film 754B includes a region in contact with the conductive film 511B. The intermediate film 754C includes a region in contact with a conductive film 511C.

<Insulating Film 501A>

The display panel described in this embodiment includes an insulating film 501A (see FIG. 13A).

The insulating film 501A has a first opening 592A, a second opening 592B, and an opening 592C (see FIG. 13A or FIG. 14A).

The first opening 592A includes a region overlapping with the intermediate film 754A and the first electrode 751($i, j$) or a region overlapping with the intermediate film 754A and the insulating film 501C.

The second opening 592B includes a region overlapping with the intermediate film 754B and the conductive film 511B.

Furthermore, the opening 592C includes a region overlapping with an intermediate film 754C and the conductive film 511C.

The insulating film 501A includes a region where the insulating film 501C is positioned between the insulating film 501A and the conductive film 511B. The insulating film 501A is in contact with the conductive film 511B in an opening 591B provided in the insulating film 501C. The insulating film 501A is in contact with the conductive film 511C in an opening 591C provided in the insulating film 501C.

The insulating film 501A includes a region positioned between the intermediate film 754A and the insulating film 501C along the periphery of the first opening 592A. The insulating film 501A includes a region positioned between the intermediate film 754B and the conductive film 511B along the periphery of the second opening 592B.

<Insulating Film 521, Insulating Film 528, Insulating Film 518, Insulating Film 516, or the Like>

The insulating film 521 includes a region positioned between the pixel circuit 530($i, j$) and the second display element 550($i, j$).

The insulating film 528 is provided between the insulating film 521 and the substrate 570, and has an opening in a region overlapping with the second display element 550($i, j$).

The insulating film 528 formed along the periphery of the third electrode 551($i, j$) can prevent a short circuit between the third electrode 551($i, j$) and the fourth electrode.

The insulating film 518 includes a region positioned between the insulating film 521 and the pixel circuit 530($i, j$).

The insulating film 516 includes a region positioned between the insulating film 518 and the pixel circuit 530($i, j$).

<Terminal and the Like>

The display panel described in this embodiment includes a terminal 519B and a terminal 519C.

The terminal 519B includes the conductive film 511B and the intermediate film 754B, and the intermediate film 754B includes a region in contact with the conductive film 511B. The terminal 519B is electrically connected to the signal line S1($j$), for example.

The terminal 519C includes the conductive film 511C and the intermediate film 754C, and the intermediate film 754C includes a region in contact with the conductive film 511C. The conductive film 511C is electrically connected to the wiring VCOM1, for example.

A conductive material CP is positioned between the terminal 519C and the second electrode 752, and has a function of electrically connecting the terminal 519C and the second electrode 752. For example, a conductive particle can be used as the conductive material CP.

<Substrate and the Like>

In addition, the display panel described in this embodiment includes the substrate 570 and the substrate 770.

The substrate 770 includes a region overlapping with the substrate 570. The substrate 770 includes a region provided so that the functional layer 520 is positioned between the substrate 770 and the substrate 570.

<Bonding Layer, Sealing Material, Structure, and the Like>

The display panel described in this embodiment also includes a bonding layer 505, a sealant 705, and a structure KB1.

The bonding layer 505 includes a region interposed between the functional layer 520 and the substrate 570, and has a function of bonding the functional layer 520 and the substrate 570 together.

The sealant 705 includes a region interposed between the functional layer 520 and the substrate 770, and has a function of bonding the functional layer 520 and the substrate 770 together.

The structure KB1 has a function of providing a certain space between the functional layer 520 and the substrate 770.

<Functional Film and the Like>

The display panel described in this embodiment includes a light-blocking film BM, an insulating film 771, a functional film 770P, and a functional film 770D. In addition, a coloring film CF1 and a coloring film CF2 are included.

The light-blocking film BM has an opening in a region overlapping with the first display element 750($i, j$). The coloring film CF2 is provided between the insulating film 501C and the second display element 550($i, j$) and includes a region overlapping with an opening 751H (see FIG. 13A).

The insulating film 771 includes a region interposed between the coloring film CF1 and the layer 753 containing a liquid crystal material or between the light-blocking film BM and the layer 753 containing a liquid crystal material. Thus, the insulating film 771 can reduce unevenness due to the thickness of the coloring film CF1. Alternatively, impurities can be prevented from being diffused from the light blocking film BM, the coloring film CF1, or the like to the layer 753 containing a liquid crystal material.

The functional film 770P includes a region overlapping with the first display element 750($i, j$).

The functional film 770D includes a region overlapping with the first display element 750($i, j$). The functional film 770D is provided so that a substrate 770 is interposed between the functional film 770D and the first display element 750($i, j$). Thus, for example, light reflected by the first display element 750($i, j$) can be diffused.

<Example of Components>

The display panel 700 includes the substrate 570, the substrate 770, the structure KB1, the sealant 705, or the bonding layer 505.

The display panel 700 includes the functional layer 520, the insulating film 521, or the insulating film 528.

The display panel 700 also includes the signal line S1($j$), the signal line S2($j$), the scan line G1($i$), the scan line G2($i$), the wiring CSCOM, or the third conductive film ANO.

The display panel 700 also includes the first conductive film or the second conductive film.

The display panel 700 also includes the terminal 519B, the terminal 519C, the conductive film 511B, or the conductive film 511C.

The display panel 700 includes the pixel circuit 530($i, j$) or the switch SW1.

The display panel 700 also includes the first display element 750(i, j), the first electrode 751(i, j), the reflective film, the opening, the layer 753 containing a liquid crystal material, or the second electrode 752.

The display panel 700 also includes the alignment film AF1, the alignment film AF2, the coloring film CF1, the coloring film CF2, the light-blocking film BM, the insulating film 771, the functional film 770P, or the functional film 770D.

In addition, the display panel 700 includes the second display element 550(i, j), the third electrode 551(i, j), the fourth electrode 552, or the layer 553(j) containing a light-emitting material.

In addition, the display panel 700 includes the insulating film 501A and the insulating film 501C.

The display panel 700 includes the driver circuit GD or the driver circuit SD.

<Substrate 570>

The substrate 570 or the like can be formed using a material having heat resistance high enough to withstand heat treatment in the manufacturing process. In addition, a flexible substrate can be used as the substrate 570 and the like.

For example, a single crystal semiconductor substrate or a polycrystalline semiconductor substrate of silicon or silicon carbide, a compound semiconductor substrate of silicon germanium or the like, or an SOI substrate can be used as the substrate 570 or the like. Thus, a semiconductor element can be provided over the substrate 570 or the like.

For example, an organic material such as a resin, a resin film, or plastic can be used for the substrate 570 or the like. Specifically, a resin film or resin plate of polyester, polyolefin, polyamide, polyimide, polycarbonate, an acrylic resin, or the like can be used for the substrate 570 or the like.

Furthermore, a single-layer material or a layered material in which a plurality of layers are stacked can be used for the substrate 570 or the like. For example, a layered material in which a base, an insulating film that prevents diffusion of impurities contained in the base, and the like are stacked can be used for the substrate 570 or the like.

Specifically, a resin film, a resin plate, a stacked-layer material, or the like containing polyester, polyolefin, polyamide, polyimide, polycarbonate, an acrylic resin, or the like can be used as the substrate 570 or the like.

Specifically, a material including polyester, polyolefin, polyamide (e.g., nylon or aramid), polyimide, polycarbonate, polyurethane, an acrylic resin, a urethane resin, an epoxy resin, a resin having a siloxane bond, such as silicone, or the like can be used for the substrate 570 or the like.

Specifically, polyethylene terephthalate (PET), polyethylene naphthalate (PEN), polyethersulfone (PES), an acrylic resin, or the like can be used for the substrate 570 or the like. Alternatively, a cyclo olefin polymer (COP), a cyclo olefin copolymer (COC), or the like can be used.

Alternatively, paper, wood, or the like can be used for the substrate 570 or the like.

<Substrate 770>

A material having flexibility can be used for the substrate 770. In addition, a light-transmitting material can be used for the substrate 770. Specifically, any of the materials that can be used for the substrate 570 can be used for the substrate 770.

<Structure KB1>

The structure KB1 or the like can be formed using an organic material, an inorganic material, or a composite material of an organic material and an inorganic material. Accordingly, a predetermined space can be provided between components between which the structure KB1 and the like are provided.

Specifically, polyester, polyolefin, polyamide, polyimide, polycarbonate, polysiloxane, an acrylic resin, or the like, or a composite material of a plurality of resins selected from these can be used for the structure KB1. Alternatively, a photosensitive material may be used.

<Sealant 705>

For the sealant 705 or the like, an inorganic material, an organic material, a composite material of an inorganic material and an organic material, or the like can be used.

For example, an organic material such as a thermally fusible resin or a curable resin can be used for the sealant 705 or the like.

For example, an organic material such as a reactive curable adhesive, a light curable adhesive, a thermosetting adhesive, and/or an anaerobic adhesive can be used for the sealant 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used for the sealant 705 or the like.

<Bonding Layer 505>

For example, any of the materials that can be used for the sealant 705 can be used for the bonding layer 505.

<Insulating Film 521>

For example, an insulating inorganic material, an insulating organic material, an insulating composite material containing an inorganic material and an organic material can be used for the insulating film 521 or the like.

Specifically, for example, an inorganic oxide film, an inorganic nitride film, an inorganic oxynitride film, or a material obtained by stacking any of these films and the like can be used as the insulating film 521 or the like. For example, a silicon oxide film, a silicon nitride film, a silicon oxynitride film, an aluminum oxide film, or a film including a stack of any of these films and the like can be used as the insulating film 521 or the like.

Specifically, for the insulating film 521 or the like, polyester, polyolefin, polyamide, polyimide, polycarbonate, polysiloxane, an acrylic resin, or the like, or a layered or composite material of a plurality of kinds of resins selected from these can be used. Alternatively, a photosensitive material may be used.

Thus, steps due to various components overlapping with the insulating film 521, for example, can be reduced.

<Insulating Film 528>

For example, any of the materials that can be used for the insulating film 521 can be used for the insulating film 528 or the like. Specifically, a film containing polyimide with a thickness of 1 μm can be used as the insulating film 528.

<Insulating Film 501A>

For example, any of the materials that can be used for the insulating film 521 can be used for the insulating film 501A. Alternatively, for example, a material having a function of supplying hydrogen can be used for the insulating film 501A.

Specifically, a material in which a material containing silicon and oxygen and a material containing silicon and nitrogen are stacked can be used for the insulating film 501A. For example, a material having a function of releasing hydrogen by heating or the like to supply the hydrogen to another component can be used for the insulating film 501A. Specifically, a material having a function of releasing hydrogen taken in the manufacturing process by heating or the like, to supply the hydrogen to another component can be used for the insulating film 501A.

For example, a film containing silicon and oxygen that is formed by a chemical vapor deposition method using silane or the like as a source gas can be used as the insulating film 501A.

Specifically, a material in which a 200- to 600-nm-thick material containing silicon and oxygen and a material containing silicon and nitrogen with a thickness of approximately 200 nm are stacked can be used for the insulating film 501A.

<Insulating Film 501C>

For example, any of the materials that can be used for the insulating film 521 can be used for the insulating film 501C. Specifically, a material containing silicon and oxygen can be used for the insulating film 501C. Thus, diffusion of impurities into the pixel circuit, the second display element, or the like can be inhibited.

For example, a 200-nm-thick film containing silicon, oxygen, and nitrogen can be used as the insulating film 501C.

<Intermediate film 754A, intermediate film 754B, intermediate film 754C>

A film with a thickness greater than or equal to 10 nm and less than or equal to 500 nm, preferably greater than or equal to 10 nm and less than or equal to 100 nm, can be used for the intermediate film 754A, the intermediate film 754B, or the intermediate film 754C, for example. Note that in this specification, the intermediate film 754A, the intermediate film 754B, or the intermediate film 754C is referred to as an intermediate film.

For example, a material having a function of allowing hydrogen passage and supplying hydrogen can be used for the intermediate film.

For example, a conductive material can be used for the intermediate film.

For example, a light-transmitting material can be used for the intermediate film.

Specifically, a material containing indium and oxygen, a material containing indium, gallium, zinc, and oxygen, a material containing indium, tin, and oxygen, or the like can be used for the intermediate film. Note that the above material is permeable to hydrogen.

Specifically, a 50- or 100-nm-thick film containing indium, gallium, zinc, and oxygen can be used as the intermediate film.

Note that a material in which films serving as etching stoppers are stacked can be used for the intermediate film. Specifically, a material in which a 50-nm-thick film containing indium, gallium, zinc, and oxygen and a 20-nm-thick film containing indium, tin, and oxygen, are stacked in this order can be used for the intermediate film.

<Wiring, Terminal, Conductive Film>

A conductive material can be used for the wiring or the like. Specifically, the conductive material can be used for the signal line S1(*j*), the signal line S2(*j*), the scan line G1(*i*), the scan line G2(*i*), the wiring CSCOM, the third conductive film ANO, the terminal 519B, the terminal 519C, a terminal 719, the conductive film 511B, the conductive film 511C, or the like.

For example, an inorganic conductive material, an organic conductive material, a metal, conductive ceramics, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

A film containing a metal nanowire can be used for the wiring or the like, for example. Specifically, a nanowire containing silver can be used.

Specifically, a conductive high molecular compound can be used for the wiring or the like.

Note that the terminal 519B can be electrically connected to the flexible printed circuit FPC1 using a conductive material ACF1, for example.

<First Conductive Film, Second Conductive Film>

For example, any of the materials that can be used for the wiring or the like can be used for the first conductive film or the second conductive film.

Alternatively, the first electrode 751(*i, j*), the wiring, or the like can be used for the first conductive film.

The conductive film 512B functioning as the source electrode or the drain electrode of the transistor that can be used for the switch SW1, the wiring, or the like can be used for the second conductive film.

<First Display Element 750(*i, j*)>

For example, a display element having a function of controlling transmission or reflection of light can be used as the first display element 750(*i, j*). For example, a combined structure of a polarizing plate and a liquid crystal element or a MEMS shutter display element can be used. Specifically, a reflective liquid crystal display element can be used as the first display element 750(*i, j*). The use of a reflective display element can reduce power consumption of a display panel.

For example, a liquid crystal element driven in any of the following driving modes can be used: an in-plane switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

The first display element 750(i, j) includes a first electrode, a second electrode, and a layer containing a liquid crystal material. The layer containing a liquid crystal material contains a liquid crystal material whose orientation can be controlled by voltage applied between the first electrode and the second electrode. For example, the alignment of the liquid crystal material can be controlled by an electric field in the thickness direction (also referred to as the vertical direction) of the layer containing a liquid crystal material, or the direction that intersects the vertical direction (the horizontal direction, or the diagonal direction).

<Layer 753 Containing a Liquid-Crystal Material>

A thermotropic liquid crystal, a low-molecular liquid crystal, a high-molecular liquid crystal, a polymer dispersed liquid crystal, a ferroelectric liquid crystal, an anti-ferroelectric liquid crystal, or the like can be used for the layer containing a liquid crystal material, for example. Alternatively, a liquid crystal material which exhibits a cholesteric phase, a smectic phase, a cubic phase, a chiral nematic phase, an isotropic phase, or the like can be used. Alternatively, a liquid crystal material which exhibits a blue phase can be used.

<First Electrode 751(i, j)>

For example, a material that can be used for the wiring or the like can be used for the first electrode 551(i, j). Specifically, a reflective film can be used for the first electrode 751(i, j). For example, a material in which a conductive film having light-transmitting properties and a reflective film having an opening are stacked can be used for the first electrode 751(i, j).

<Reflective Film>

For example, the material that is used for the wiring or the like can be used for the first electrode 751(i, j). Specifically, a material containing silver can be used for the reflective film. For example, a material containing silver, palladium, and the like or a material containing silver, copper, and the like can be used for the reflective film.

The reflective film reflects light that passes through the layer 753 containing a liquid crystal material, for example. This allows the first display element 750 to serve as a reflective liquid crystal element. Alternatively, for example, a material with unevenness on its surface can be used for the reflective film. In that case, incident light can be reflected in various directions so that a white image can be displayed.

For example, the first conductive film, the first electrode 751(i, j), or the like can be used as a reflective film.

For example, a film including a region interposed between the layer 753 containing a liquid crystal material and the first electrode 751(i, j) can be used as the reflective film. Alternatively, a film including a region interposed between the layer 753 containing a liquid crystal material and the first electrode 751(i, j) with light transmitting property can be used as the reflective film.

The reflective film has a shape including a region that does not block light emitted from the second display element 550(i, j), for example.

For example, the reflective film can have one or more openings.

The opening 751H may have a polygonal shape, a quadrangular shape, an elliptical shape, a circular shape, a cross-like shape, or the like. The opening 751H may also have a stripe shape, a slit-like shape, or a checkered pattern.

If the ratio of the total area of the opening 751H to the total area of the reflective film other than the opening is excessively high, an image displayed using the first display element 750(i, j) is dark.

If the ratio of the total area of the opening 751H to the total area of the reflective film other than the opening is excessively low, an image displayed using the second display element 750(i, j) is dark. Alternatively, the reliability of the second display element 550(i, j) is reduced in some cases.

For example, the opening 751H of a pixel 702(i, j+1), which is adjacent to the pixel 702(i, j), is not provided on a line that extends in the row direction (the direction indicated by the arrow R1 in the drawing) through the opening 751H of the pixel 702(i, j) (see FIG. 17A). Alternatively, for example, the opening 751H of a pixel 702(i+1, j), which is adjacent to the pixel 702(i, j), is not provided on a line that extends in the column direction (the direction indicated by the arrow C1 in the drawing) through the opening 751H of the pixel 702(i, j) (see FIG. 17B).

For example, the opening 751H of the pixel 702(i, j+2) is provided on a line that extends in the row direction through the opening 751H of the pixel 702(i, j) (see FIG. 17A). In addition, the opening 751H of the pixel 702(i, j+1) is provided on a line that is perpendicular to the above-mentioned line between the opening 751H of the pixel 702(i, j) and the opening 751H of the pixel 702(i, j+2).

Alternatively, for example, the opening 751H of the pixel 702(i+2, j) is provided on a line that extends in the column direction through the opening 751H of the pixel 702(i, j) (see FIG. 17B). In addition, for example, the opening 751H of the pixel 702(i+1, j) is provided on a line that is perpendicular to the above-mentioned line between the opening 751H of the pixel 702(i, j) and the opening 751H of the pixel 702(i+2, j).

Thus, a second element that includes a region overlapping with an opening of a pixel adjacent to one pixel can be apart from a second display element that includes a region overlapping with an opening of the one pixel. Furthermore, a display element that exhibits a color different from that exhibited by the second display element of the one pixel can be provided as the second display element of the pixel adjacent to the one pixel. Furthermore, the difficulty in adjacently arranging a plurality of display elements that exhibit different colors can be lowered. Thus, a novel display panel that is highly convenient or reliable can be provided.

For example, the reflective film can be formed using a material having a shape in which an end portion is cut off so as to form a region 751E that does not block light emitted from the second display element 550(i, j) (see FIG. 17C). Specifically, the first electrode 751(i, j) whose end portion is cut off so as to be shorter in the column direction (the direction indicated by the arrow C1 in the drawing) can be used as the reflective film.

<Second Electrode 752>

For example, a material having conductivity can be used for the second electrode 752. A material having a visible-light-transmitting property can be used for the second electrode 752.

For example, a conductive oxide, a metal film thin enough to transmit light, or a metal nanowire can be used for the second electrode 752.

Specifically, a conductive oxide containing indium can be used for the second electrode 752. Alternatively, a metal thin film with a thickness greater than or equal to 1 nm and less than or equal to 10 nm can be used for the second electrode 752. Alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<Alignment Film AF1 and Alignment Film AF2>

For example, the alignment films AF1 and AF2 can be formed with a material containing polyimide or the like. Specifically, a material formed by rubbing treatment or an optical alignment technique such that a liquid crystal material has a predetermined alignment can be used.

For example, a film containing soluble polyimide can be used for the alignment films AF1 and AF2. In this case, the temperature required in forming the alignment film AF1 can be low. Accordingly, damage to other components at the time of forming the alignment film AF1 can be lessened.

<Coloring Film CF1 and Coloring Film CF2>

A material transmitting light of a predetermined color can be used for the coloring film CF1 or the coloring film CF2. Thus, the coloring film CF1 or the coloring film CF2 can be used as a color filter, for example. For example, a material that transmits blue light, green light, or red light can be used for the coloring film CF1 or the coloring film CF2. Furthermore, a material that transmits yellow light, white light, or the like can be used for the coloring film.

Note that a material having a function of converting the emitted light to a predetermined color light can be used for the coloring film CF2. Specifically, quantum dots can be used for the coloring film CF2. Thus, display with high color purity can be achieved.

<Light-Blocking Film BM>

A material that prevents light transmission can be used for the light-blocking film BM. This allows the light-blocking film BM to be used as a black matrix, for example.

<Insulating film 771>

The insulating film 771 can be formed of polyimide, an epoxy resin, an acrylic resin, or the like, for example.

<Functional Film 770P and Functional Film 770D>

For example, an anti-reflection film, a polarizing film, a retardation film, a light diffusion film, a condensing film, or the like can be used as the functional film 770P or the functional film 770D.

Specifically, a film containing a dichromatic pigment can be used for the functional film 770P or the functional film 770D. Furthermore, a material having a pillar-shaped structure with an axis in a direction that intersects a surface of the substrate can be used for the functional film 770P or the functional film 770D. In that case, light can be transmitted in the direction along the axis and scattered in other directions easily.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used for the functional film 770P. Furthermore, a light diffusion film can be used for the functional film 770D.

<Second Display Element 550(i, j)>

For example, a light-emitting element can be used as the second display element 550(i, j). Specifically, an organic electroluminescent element, an inorganic electroluminescent element, a light-emitting diode, or the like can be used as the second display element 550(i, j).

For example, a light-emitting organic compound can be used for the layer 553(j) containing a light-emitting material.

For example, quantum dots can be used for the layer 553(j) containing a light-emitting material. Accordingly, the half width becomes narrow, and light of a bright color can be emitted.

For example, a layered material for emitting blue light, green light, or red light, or the like can be used for the layer 553(j) containing a light-emitting material.

For example, a belt-like stacked-layer material that extends in the column direction along the signal line S2(j) can be used for the layer 553(j) containing a light-emitting material.

Alternatively, a stacked-layer material for emitting white light can be used for the layer 553(j) containing a light-emitting material. Specifically, a layered material in which a layer containing a light-emitting material including a fluorescent material that emits blue light, and a layer containing a material that is other than a fluorescent material and that emits green light and/or red light or a layer containing a material that is other than a fluorescent material and that emits yellow light are stacked can be used for the layer 553(j) containing a light-emitting material.

For example, a material that can be used for the wiring or the like can be used for the third electrode 551(i, j).

For example, a material that transmits visible light selected from materials that can be used for the wiring or the like can be used for the third electrode 551(i, j).

Specifically, conductive oxide, indium-containing conductive oxide, indium oxide, indium tin oxide, indium zinc oxide, zinc oxide, zinc oxide to which gallium is added, or the like can be used for the third electrode 551(i, j). Alternatively, a metal film that is thin enough to transmit light can be used as the third electrode 551(i, j). Further alternatively, a metal film that transmits part of light and reflects another part of light can be used as the third electrode 551(i, j). Thus, the second display element 550(i,j) can be provided with a microcavity structure. As a result, light of a predetermined wavelength can be extracted more efficiently than light of other wavelengths.

For example, a material that can be used for the wiring or the like can be used for the fourth electrode 552. Specifically, a material that reflects visible light can be used for the fourth electrode 552.

<Driver Circuit GD>

Any of a variety of sequential circuits, such as a shift register, can be used as the driver circuit GD. For example, a transistor MD, a capacitor, and the like can be used in the driver circuit GD. Specifically, a transistor including a semiconductor film that can be formed in the same process as the transistor M or the transistor which can be used as the switch SW1 can be used.

As the transistor MD, a transistor having a different structure from the transistor that can be used as the switch SW1 can be used, for example. Specifically, a transistor including a conductive film 524 can be used as the transistor MD (see FIG. 13B).

Note that the transistor MD can have the same structure as the transistor M.

<Transistor>

For example, semiconductor films formed at the same step can be used for transistors in the driver circuit and the pixel circuit.

For example, a bottom-gate transistor, a top-gate transistor, or the like can be used for transistors in a driver circuit or a pixel circuit.

A manufacturing line for a bottom-gate transistor including amorphous silicon as a semiconductor can be easily remodeled into a manufacturing line for a bottom-gate transistor including metal oxide as a semiconductor, for example. Furthermore, for example, a manufacturing line for a top-gate transistor including polysilicon as a semiconductor can be easily remodeled into a manufacturing line for a top-gate transistor including a metal oxide as a semiconductor. In any reconstruction, a conventional manufacturing line can be effectively used.

For example, a transistor including a semiconductor containing an element belonging to Group 14 in a semiconductor film can be used. Specifically, a semiconductor containing silicon can be used for a semiconductor film. For example, single crystal silicon, polysilicon, microcrystalline silicon, amorphous silicon, or the like can be used for the semiconductor film of the transistor.

Note that the temperature for forming a transistor using polysilicon as a semiconductor is lower than the temperature for forming a transistor using single crystal silicon as a semiconductor.

In addition, the transistor using polysilicon as a semiconductor has higher field-effect mobility than the transistor using amorphous silicon as a semiconductor. Thus, a pixel including the transistor using polysilicon can have a high aperture ratio. Moreover, pixels arranged at high resolution, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

Alternatively, for example, a transistor including a compound semiconductor can be used. Specifically, a semiconductor containing gallium arsenide can be used in a semiconductor film.

For example, a transistor including an organic semiconductor can be used. Specifically, an organic semiconductor containing any of polyacenes and graphene can be used in the semiconductor film.

For example, a transistor including a metal oxide in a semiconductor film can be used. Specifically, a metal oxide containing indium or a metal oxide containing indium, gallium, and zinc can be used for a semiconductor film.

For example, a transistor having a lower leakage current in an off state than a transistor that uses amorphous silicon in a semiconductor film can be used. Specifically, a transistor that uses a metal oxide in a semiconductor film can be used.

Thus, a pixel circuit can hold an image signal for a longer time than a pixel circuit including a transistor that uses amorphous silicon for a semiconductor film.

Specifically, a selection signal can be supplied at a frequency of lower than 30 Hz, preferably lower than 1 Hz, further preferably less than once per minute while flickering is suppressed. Consequently, eyestrain on a user of a data processing device can be reduced, and power consumption for driving can be reduced.

For example, a transistor including a semiconductor film 508, a conductive film 504, the conductive film 512A, and the conductive film 512B can be used as the switch SW1 (see FIG. 14B). Note that an insulating film 506 includes a region positioned between the semiconductor film 508 and the conductive film 504.

The conductive film 504 includes a region overlapping with the semiconductor film 508. The conductive film 504 serves as a gate electrode. The insulating film 506 has a function of a gate insulating film.

The conductive film 512A and the conductive film 512B are electrically connected to the semiconductor film 508. The conductive film 512A has one of a function of a source electrode and a function of a drain electrode, and the conductive film 512B has the other.

A transistor including the conductive film 524 can be used as the transistor in the driver circuit or the pixel circuit (see FIG. 13B). The conductive film 524 includes a region provided in a way that the semiconductor film 508 is positioned between the conductive film 504 and the conductive film 524 in the region. Note that the insulating film 516 includes a region positioned between the conductive film 524 and the semiconductor film 508. In addition, for example, the conductive film 524 is electrically connected to a wiring that supplies the same potential as that supplied to the conductive film 504.

A conductive film in which a 10-nm-thick film containing tantalum and nitrogen and a 300-nm-thick film containing copper are stacked in this order can be used as the conductive film 504, for example. A film containing copper includes a region provided in a way that a film containing tantalum and nitrogen is positioned between the film containing copper and the insulating film 506 in the region.

A material in which a 400-nm-thick film containing silicon and nitrogen and a 200-nm-thick film containing silicon, oxygen, and nitrogen are stacked can be used for the insulating film 506, for example. Note that the film containing silicon and nitrogen includes a region so that the film containing silicon, oxygen, and nitrogen is positioned between the film containing silicon and nitrogen and the semiconductor film 508.

A 25-nm-thick film containing indium, gallium, and zinc can be used as the semiconductor film 508, for example.

For example, a conductive film in which a 50-nm-thick film containing tungsten, a 400-nm-thick film containing aluminum, and a 100-nm-thick film containing titanium are stacked in this order can be used as the conductive film 512A or 512B. Note that the film containing tungsten includes a region in contact with the semiconductor film 508.

This embodiment can be combined with any of the other embodiments in this specification as appropriate.

Embodiment 6

In this embodiment, a structure of an input/output device included in the data processing device of one embodiment of the present invention will be described with reference to FIG. 18, FIGS. 19A, 19B-1, 19B-2, and 19C, FIGS. 20A and 20B, and FIG. 21.

Figure 18:
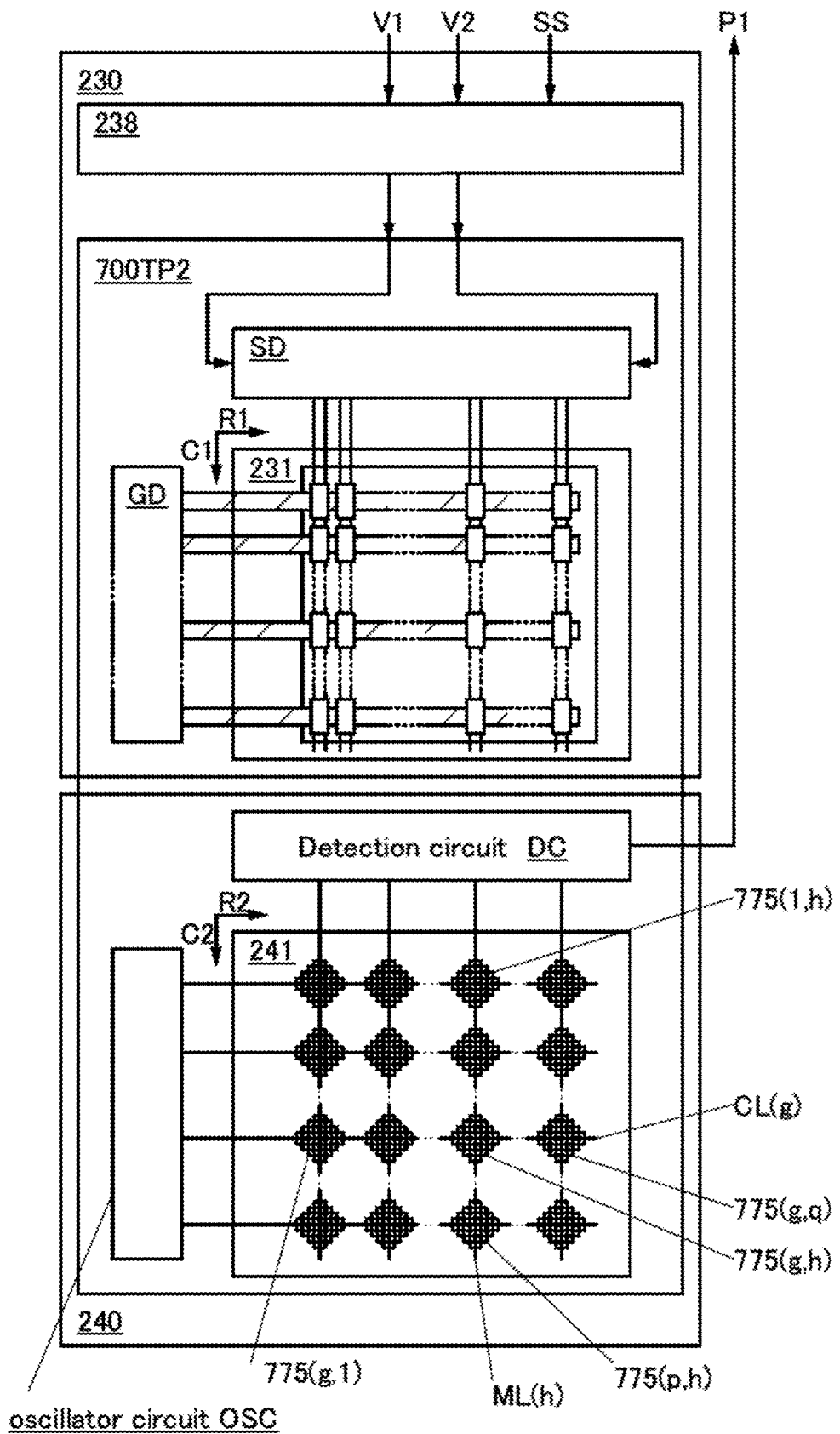
FIG. 18 is a block diagram that illustrate a configuration of an input portion that can be used for an input/output device of one embodiment of the present invention.

FIG. 18 is a block diagram illustrating a structure of an input portion of the input/output device of one embodiment of the present invention.

Figure 19A:
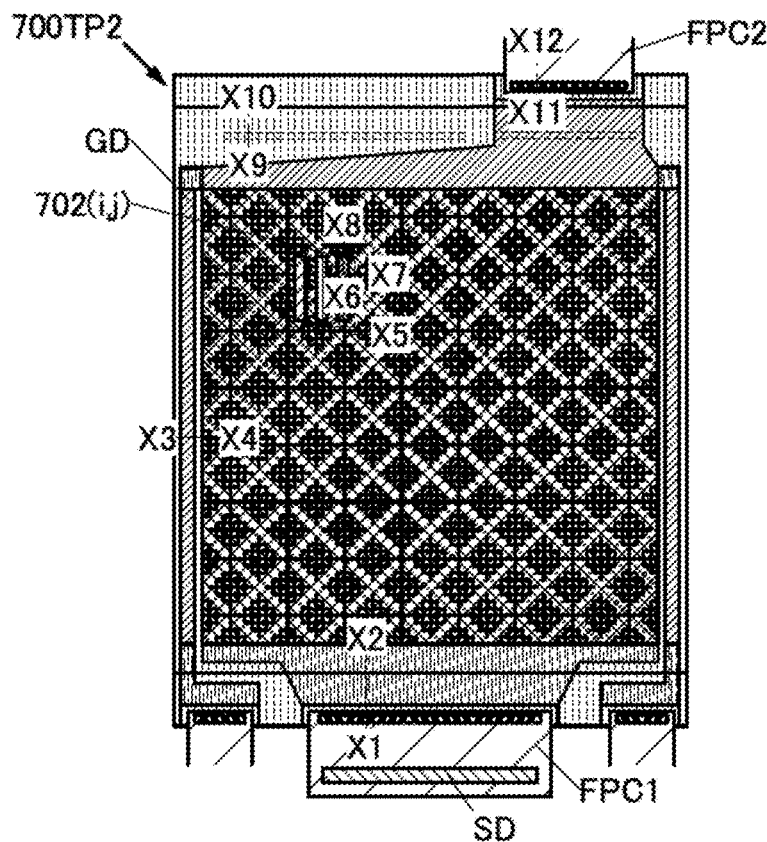
FIGS. 19A to 19C illustrate a configuration of an input/output panel that can be used for an input/output device of one embodiment of the present invention.
Figures 1, 19B:
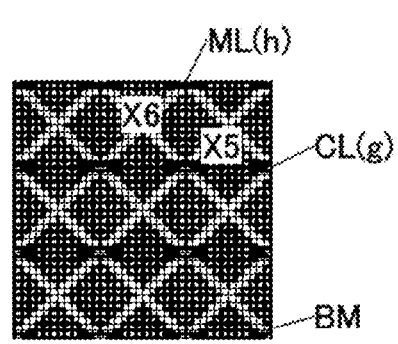
Figures 2, 19B:
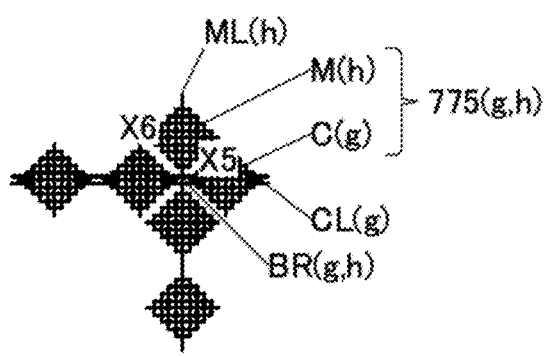
Figure 19C:
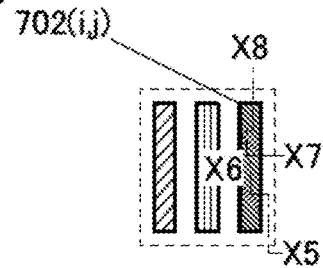

FIGS. 19A to 19C illustrate a structure of an input/output panel that can be used for an input/output device of one embodiment of the present invention. FIG. 19A is a top view of the input/output panel. FIG. 19B-1 is a schematic view illustrating part of an input portion of the input/output panel of one embodiment of the present invention, and FIG. 19B-2 is a schematic view illustrating part of FIG. 19B-1. FIG. 19C is a schematic view illustrating a structure of the pixel 702(0 that can be used for the input/output device.

Figure 20A:
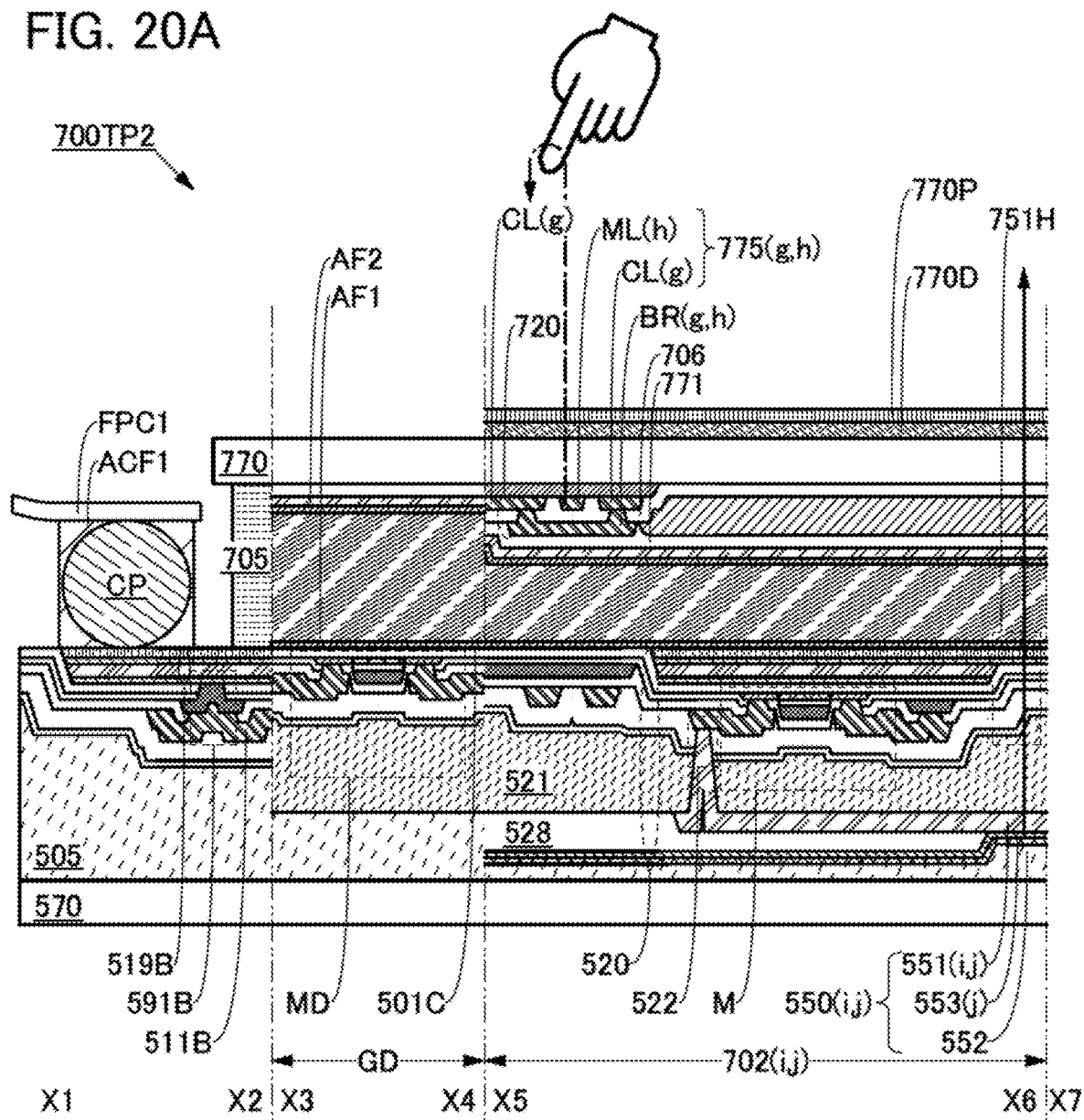
FIGS. 20A and 20B are cross-sectional views that illustrate a configuration of an input/output panel that can be used for an input/output device of one embodiment of the present invention.
Figure 20B:
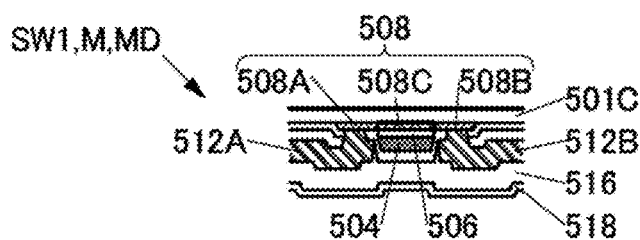
Figure 21:
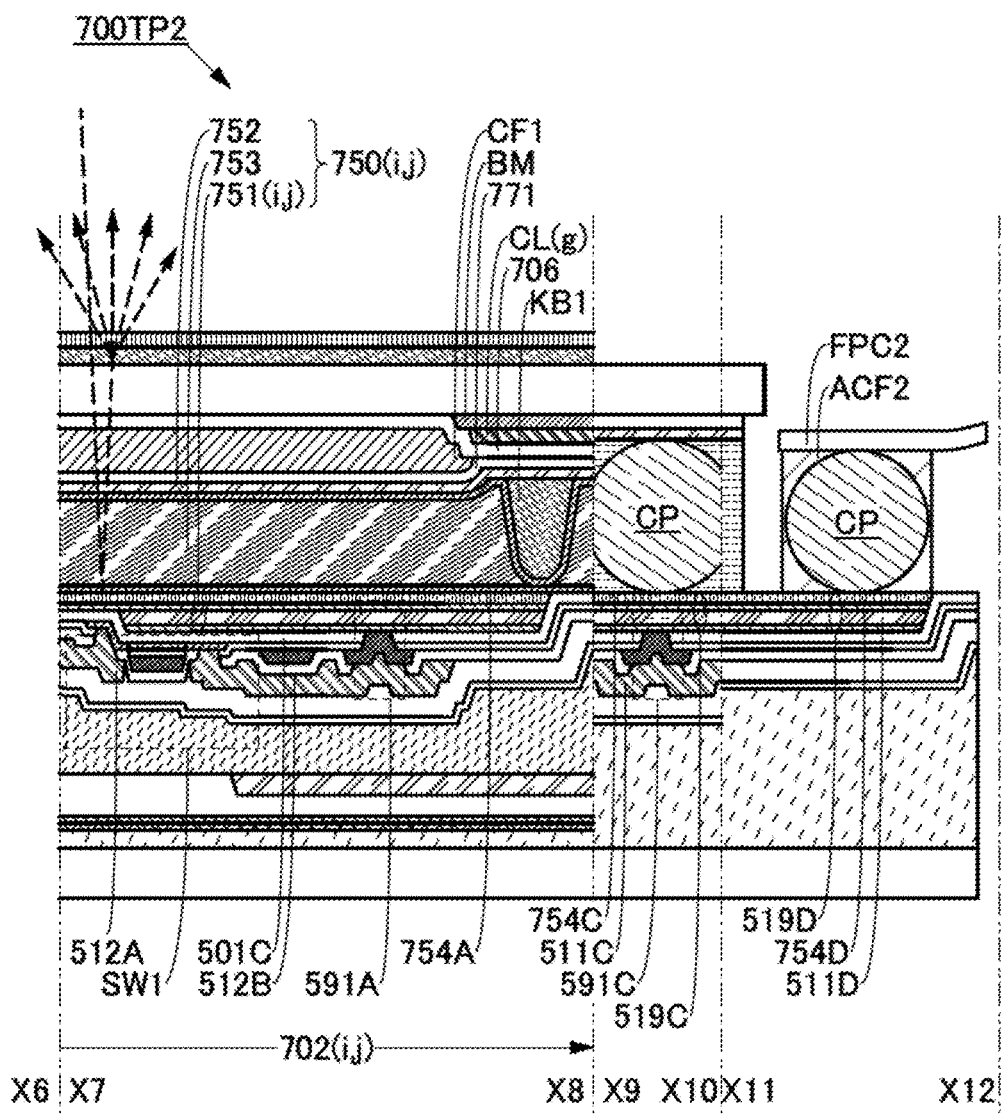
FIG. 21 is a cross-sectional view that illustrate a configuration of an input/output panel that can be used for an input/output device of one embodiment of the present invention.

FIGS. 20A and 20B and FIG. 21 illustrate a structure of an input/output panel that can be used for an input/output device of one embodiment of the present invention. FIG. 20A is a cross-sectional view taken along lines X1-X2, X3-X4, and X5-X6 in FIG. 19A, and FIG. 20B is a cross-sectional view illustrating part of the structure illustrated in FIG. 20A.

FIG. 21 is a cross-sectional view taken along lines X7-X8, X9-X10, and

X11-X12 in FIG. 19A.

<Configuration Example of Input/Output Device>

The input/output device illustrated in this embodiment includes a display portion 230 and an input portion 240 (see FIG. 18). Note that the input/output device includes an input/output panel 700TP2.

The input portion 240 includes a sensor region 241, and the sensor region 241 includes a region overlapping with the display region 231 in the display portion 230. The sensor region 241 has a function of sensing an object approaching a region overlapping with the display region 231 (see FIG. 20A).

<Input portion 240>

The input portion 240 includes the sensor region 241, an oscillator circuit OSC, and a Detection circuit DC (see FIG. 18).

The sensor region 241 includes one group of sensor elements 775(g, 1) to 775(g, q) and another group of sensor elements 775(1, h) to 775(p, h) (see FIG. 18). Note that g is an integer greater than or equal to 1 and less than or equal to p, h is an integer greater than or equal to 1 and less than or equal to q, and each of p and q is an integer greater than or equal to 1.

The one group of sensing elements 775(g, 1) to 775(g, q) include the sensing element 775(g, h). The one group of sensing elements 775(g, 1) to 775(g, q) are provided in a row direction (the direction indicated by an arrow R2 in the drawing). Note that the direction indicated by the arrow R2 in FIG. 18 may be the same as or different from the direction indicated by the arrow R1 in FIG. 18.

The another group of sensor elements 775(1, h) to 775(p, h) include the sensor element 775(g, h) and are provided in the column direction (the direction indicated by the arrow C2 in the drawing) that intersects the row direction.

The one group of sensor elements 775(g, 1) to 775(g, q) provided in the row direction include an electrode C(g) that is electrically connected to a control line CL(g) (see FIG. 19B-2).

The another group of sensing elements 775(1, h) to 775(p, h) provided in the column direction include an electrode M(h) that is electrically connected to a sensor signal line ML(h).

The control line CL(g) includes a conductive film BR(g, h) (see FIG. 20A). The conductive film BR(g, h) includes a region overlapping with the sensor signal line ML(h).

An insulating film 706 includes a region interposed between the sensor signal line ML(h) and the conductive film BR(g, h). Thus, a short circuit between the sensor signal line ML(h) and the conductive film BR(g, h) can be prevented.

<Sensing Element 775(g, h)>

The sensing element 775(g, h) is electrically connected to the control line CL(g) and the sensor signal line ML(h).

The sensing element 775(g, h) has a light-transmitting property. The sensing element 775(g, h) includes an electrode C(g) and an electrode M(h).

A conductive film having an opening at a region overlapping with the pixel 702(i, j), for example, can be used for the electrodes C(g) and M(h). Accordingly, an object that approaches the region overlapping with the display panel can be sensed without disturbing display of the display panel. Moreover, the thickness of the input/output device can be reduced. As a result, a novel input/output device with high convenience or high reliability can be provided.

The electrode C(g) is electrically connected to the control line CL(g).

The electrode M(h) is electrically connected to the sensing signal line ML(h) and is positioned so that an electric field part of which is blocked by an object approaching a region overlapping with the display panel 700 is generated between the electrode M(h) and the electrode C(g).

Note that the control line CL(g) has a function of supplying a control signal.

The sensor signal line ML(h) has a function of receiving the sensor signal.

The sensing element 775(g, h) has a function of supplying a sensing signal which changes in accordance with the control signal and a distance between the sensing element and an object approaching a region overlapping with the display panel 700.

Thus, the object that approaches the region overlapping with the display device can be sensed while the image data is displayed by the display device. As a result, a novel input/output device with high convenience or high reliability can be provided.

<Oscillator Circuit OSC>

The oscillator circuit OSC is electrically connected to the control line CL(g) and has a function of supplying a control signal. For example, a rectangular wave, a sawtooth wave, a triangular wave, or the like can be used as the control signal.

<Detection Circuit DC>

The detection circuit DC is electrically connected to the sensor signal line ML(h) and has a function of supplying a sensor signal on the basis of a change in the potential of the sensor signal line ML(h). Note that the sensing signal includes positional data P1, for example. Put another way with an example, the positional data P1 includes positional data of the finger that touch on the touch panel.

<Display Portion 230>

The display device described in Embodiment 1 can be used as the display portion 230, for example.

<Input/Output Panel 700TP2>

The input/output panel 700TP2 is different from, for example, the display panel 700 described in Embodiment 2 in that a functional layer 720 and a top-gate transistor are provided. Different structures will be described in detail here, and the above description is referred to for the other similar structures.

<Functional Layer 720>

The functional layer 720 includes a region surrounded by the substrate 770, the insulating film 501C, and the sealant 705, for example (see FIGS. 20A and 20B and FIG. 21).

The functional layer 720 includes, for example, the control line CL(g), the sensor signal line ML(h), and the sensing element 775(g, h).

The gap between the control line CL(g) and the second electrode 752 or between the sensor signal line ML(h) and the second electrode 752 is greater than or equal to 0.2 μm and less than or equal to 16 μm, preferably greater than or equal to 1 μm and less than or equal to 8 μm, further preferably greater than or equal to 2.5 μm and less than or equal to 4 μm.

<Conductive Film 511D>

The input/output panel 700TP2 described in this embodiment includes the conductive film 511D (see FIG. 21).

Note that a conductive material CP or the like can be provided between the control line CL(g) and the conductive film 511D to electrically connect the control line CL(g) and the conductive film 511D. Alternatively, the conductive material CP or the like can be provided between the sensor signal line ML(h) and the conductive film 511D to electrically connect the sensor signal line ML(h) and the conductive film 511D. A material that can be used for the wiring or the like can be used for the conductive film 511D, for example.

<Terminal 519D>

Furthermore, the input/output panel 700TP2 described in this embodiment includes a terminal 519D. The terminal 519D is electrically connected to the conductive film 511D.

The terminal 519D is provided with the conductive film 511D and an intermediate film 754D, and the intermediate film 754D includes a region in contact with the conductive film 511D.

For example, a material that can be used for a wiring or the like can be used for the terminal 519D. Specifically, the terminal 519D can have the same structure as that of the terminal 519B or the terminal 519C (see FIG. 21).

Note that the terminal 519D can be electrically connected to the flexible printed circuit FPC2 using a conductive material ACF2, for example. Thus, a control signal can be supplied to the control line CL(g) with use of the terminal 519D, for example. Alternatively, a sensor signal can be supplied from the sensor signal line ML(h) with use of the terminal 519D.

<Switch SW1, Transistor M, Transistor MD>

A transistor that can be used for the switch SW1, the transistor M, and the transistor MD include the conductive film 504 having a region overlapping with the insulating film 501C and the semiconductor film 508 having a region located between the insulating film 501C and the conductive film 504. Note that the conductive film 504 serves as a gate electrode (see FIG. 20B).

The semiconductor film 508 includes a first region 508A, a second region 508B, and a third region 508C. The first region 508A and the second region 508B do not overlap with the conductive film 504. The third region 508C is positioned between the first region 508A and the second region 508B and overlaps with the conductive film 504.

The transistor MD includes the insulating film 506 between the third region 508C and the conductive film 504. Note that the insulating film 506 functions as a gate insulating film.

The first region 508A and the second region 508B have a lower resistivity than the third region 508C, and serve as a source region or a drain region.

The first region 508A and the second region 508B can be formed in the semiconductor film 508 by, for example, performing plasma treatment on the metal oxide film using a gas containing a rare gas.

In addition, for example, the conductive film 504 can be used as a mask. The use of the conductive film 504 as a mask allows the shape of part of the third region 508C to be self-aligned with the shape of an end of the conductive film 504.

The transistor MD includes the conductive film 512A and the conductive film 512B that are in contact with the first region 508A and the second region 508B, respectively. The conductive film 512A and the conductive film 512B function as a source electrode and a drain electrode.

For example, a transistor that can be fabricated in the same process as the transistor MD can be used as the transistor M.

This embodiment can be combined with any of the other embodiments in this specification as appropriate.

Embodiment 7

In this embodiment, the structure of a data processing device of one embodiment of the present invention will be described with reference to FIG. 22, FIGS. 23A and 23B, and FIG. 24.

Figure 22:
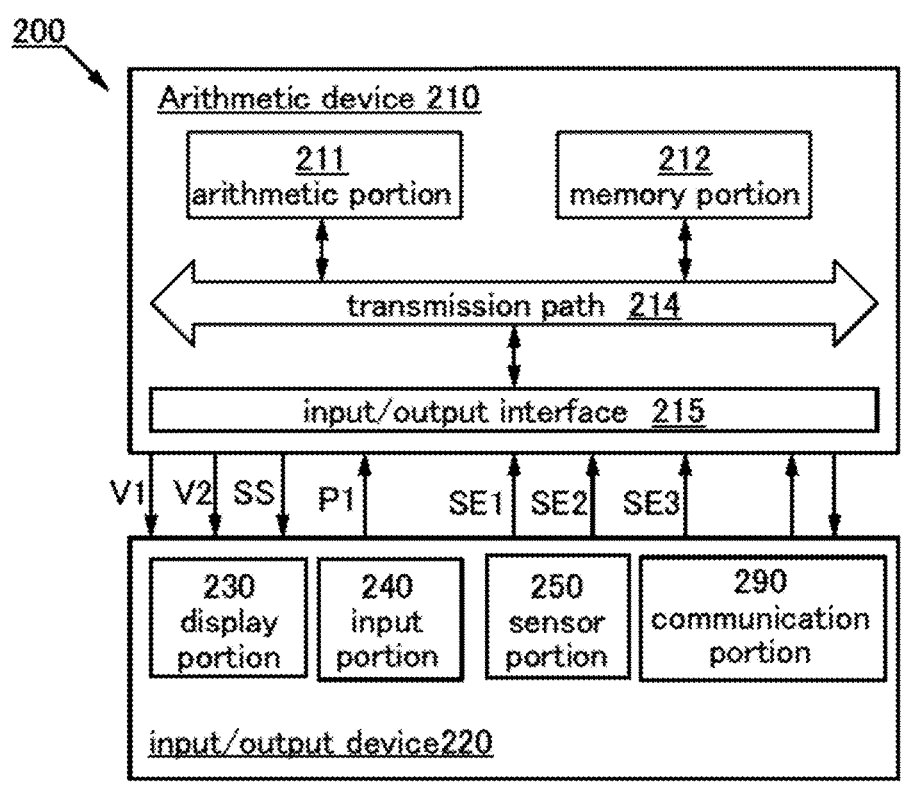
FIG. 22 is a block diagram illustrating a configuration of a data processing device of one embodiment of the present invention.

FIG. 22 is a block diagram illustrating the structure of the data processing device of one embodiment of the present invention.

Figure 23A:
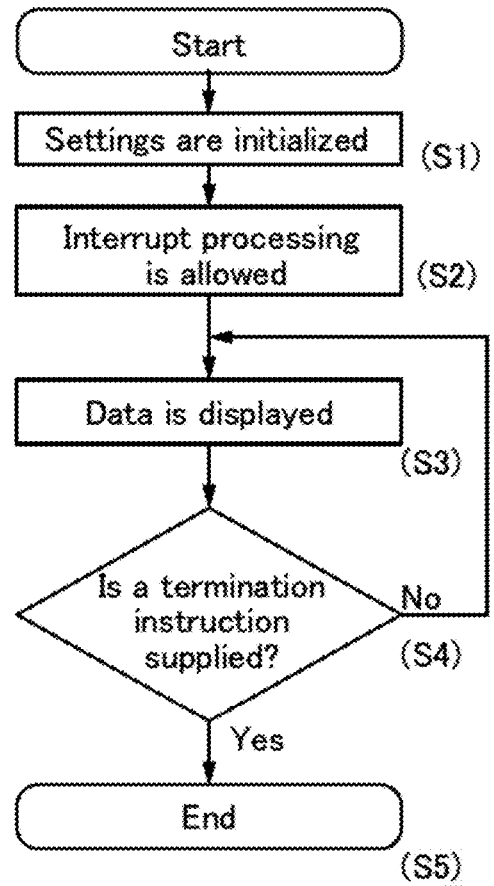
FIGS. 23A and 23B are flow charts each showing a driving method of a data processing device of one embodiment of the present invention.
Figure 23B:
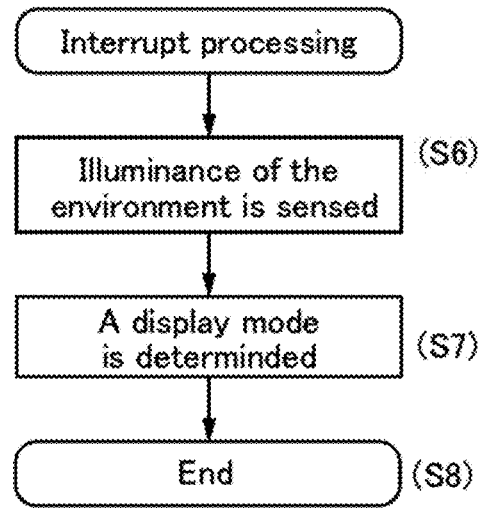

FIGS. 23A and 23B are flow charts showing the program of one embodiment of the present invention. FIG. 23A is a flow chart showing main processing of the program of one embodiment of the present invention, and FIG. 23B is a flow chart showing interrupt processing.

Figure 24:
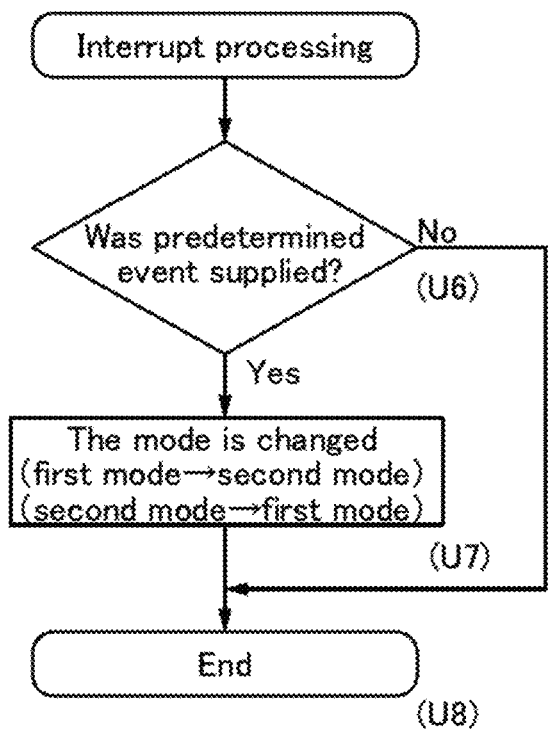
FIG. 24 is a flow chart showing a driving method of a data processing device of one embodiment of the present invention.

FIG. 24 is a flow chart showing interrupt processing of the program of one embodiment of the present invention.

<Structure Example 1 of Data Processing Device>

A data processing device 200 described in this embodiment includes the input/output device 220 and the arithmetic device 210 (see FIG. 22). The input-output device 220 is electrically connected to the arithmetic device 210.

The input/output device 220 includes the display portion 230 and the input portion 240 (see FIG. 22). The input/output device 220 includes a sensor portion 250. The input/output device 220 can include a communication portion 290.

The input/output device 220 has a function of receiving the image data V1 and the image data V2, and a function of supplying the positional data P1 or the sensing data SE1. However, as shown in Embodiment 4, the input/output device 220 has a function of supplying the positional data P1 or the sensing data SE1 in addition to the control data SS, when the display portion 230 has the first display element and the second display element. In addition, the input/output device 220 may have a function of supplying the sensing data SE2 and the sensing data SE3.

The arithmetic device 210 has a function of receiving the positional data P1 or the sensing data S1. In addition, the arithmetic device 210 may have a function of receiving the sensing data SE2 and the sensing data SE3. The arithmetic device 210 has a function of supplying the image data V1 and the image data V2. For example, the arithmetic device 210 has a function of operating on the basis of the positional data P1 or the sensing data SE1.

Note that the housing has a function of storing the input/output device 220 or the arithmetic device 210. Alternatively, the housing has a function of supporting the display portion 230 or the arithmetic device 210.

The display portion 230 has a function of displaying an image on the basis of the image data V1 and the image data V2. However, as shown in Embodiment 4, the display portion 230 has a function of displaying an image on the basis of the control data SS, when the display portion 230 has the first display element and the second display element.

The input portion 240 has a function of supplying the positional data P1.

The sensor portion 250 has a function of supplying the sensing data SE1. In addition, the sensor portion 250 may have a function of supplying the sensing data SE2 and the sensing data SE3.

The sensor portion 250 has a function of supplying angular data that is supplied from an angular sensor provided on a hinge included in the foldable input/output device 220. In addition, the sensor portion 250 has a function of supplying image data that is supplied from the means for imaging included in the input/output device 220. Furthermore, the sensor portion 250 has a function of supplying locational data that is supplied from the means to obtain locational data included in the input/output device 220.

In addition, the sensor portion 250 has a function of measuring the illuminance of an environment where the data processing device 200 is used and a function of supplying illuminance data, for example. The sensor portion 250 has a function of measuring the chromaticity of ambient light in the environment where the data processing device 200 is used and a function of supplying illuminance data, for example.

Thus, the data processing device can identify the intensity of light received by the housing of the data processing device, in addition to the angular data, the image data, and locational data, and operate under a usage environment of the data processing device. As a result, a novel data processing device with high convenience or high reliability can be provided.

When the display portion 230 includes the first display element and the second display element, the operator of the data processing device can select the display method. Specifically, the operator can select the display method using the first display element to reduce power consumption, for example. Alternatively, the operator can select the display method using the second display element, and an image can be displayed in a dark place, for example. Alternatively, the operator can select the display method in which the first display element and the second display element are used, and text data can be displayed with an increase in the visibility as compared with the case of using only the first display element. A schematic diagram can be displayed with an increase in the visibility as compared with a case where an image is displayed using only the first display element. A sharp and clear image can be displayed as compared with the case where an image is displayed using only the first display element. As a result, a novel data processing device with high convenience or high reliability can be provided.

Individual components included in the data processing device will be described below. Note that these components cannot be clearly distinguished and one component may also serve as another component or include part of another component. For example, a touch panel in which a touch sensor is provided so as to overlap with a display panel serves as an input portion as well as a display portion.

<Configuration Example>

The data processing device 200 of one embodiment of the present invention includes a housing or the arithmetic device 210.

The arithmetic device 210 includes an arithmetic portion 211, a memory portion 212, a transmission path 214, or an input/output interface 215.

The data processing device of one embodiment of the present invention includes the input/output device 220.

The input/output device 220 includes the display portion 230, the input portion 240, the sensor portion 250, and the communication portion 290.

<Data Processing Device>

The data processing device of one embodiment of the present invention includes the arithmetic device 210 or the input/output device 220.

<Arithmetic device 210>

The arithmetic device 210 includes the arithmetic portion 211 and the memory portion 212. The arithmetic device 210 further includes the transmission path 214 and the input/output interface 215.

<Arithmetic Portion 211>

The arithmetic portion 211 is configured to, for example, execute a program.

<Memory Portion 212>

The memory portion 212 is configured to, for example, store the program executed by the arithmetic portion 211, initial data, setting data, an image, or the like.

Specifically, a hard disk, a flash memory, a memory including a transistor including a metal oxide, or the like can be used for the memory portion 212.

<Input/Output Interface 215, Transmission Path 214>

The input/output interface 215 includes a terminal or a wiring and is configured to supply and receive data. For example, the transmission path 214 can be electrically connected to the input/output interface 215. In addition, the input/output interface 215 can be electrically connected to the input/output device 220.

The transmission path 214 includes a wiring and has a function of supplying and receiving data. For example, the transmission path 214 can be electrically connected to the input/output interface 215. In addition, the transmission path 214 can be electrically connected to the arithmetic portion 211, the memory portion 212 or the input/output interface 215.

<Input/Output Device 220>

The input/output device 220 includes the display portion 230, the input portion 240, the sensor portion 250, or the communication portion 290. For example, the input/output device described in Embodiment 3 can be used. In that case, power consumption can be reduced.

<Display Portion 230>

The display portion 230 includes the control portion 238, a driver circuit GD, a driver circuit SD, and the display panel 700 (see FIG. 10). For example, the display device described in Embodiment 1 can be used as the display portion 230.

<Input portion 240>

Any of a variety of human interfaces or the like can be used as the input portion 240 (see FIG. 22).

For example, a keyboard, a mouse, a touch sensor, a microphone, a camera, or the like can be used as the input portion 240. Note that a touch sensor having a region overlapping with the display portion 230 can be used. An input/output device that includes the display portion 230 and a touch sensor having a region overlapping with the display portion 230 can be referred to as a touch panel or a touch screen.

For example, a user can make various gestures (e.g., tap, drag, swipe, and pinch in) using his/her finger as a pointer on the touch panel.

The arithmetic device 210, for example, analyzes data on the position, track, or the like of the finger on the touch panel and determines that a specific gesture is supplied when the analysis results meet predetermined conditions. Therefore, the user can supply a certain operation instruction associated with a certain gesture by using the gesture.

For instance, the user can supply a "scrolling instruction" for changing the location where image data is displayed by using a gesture of touching and moving his/her finger on the touch panel.

<Sensor Portion 250>

The sensor portion 250 has a function of sensing the ambient conditions and supplying the sensing data. Specifically, the sensor portion 250 can supply illuminance data, attitude data, pressure data, positional data, and the like.

For example, a photosensor, an attitude sensor, an acceleration sensor, a direction sensor, a global positioning system (GPS) signal receiving circuit, a pressure sensor, a temperature sensor, a humidity sensor, a camera, or the like can be used as the sensor portion 250.

<Communication Portion 290>

The communication portion 290 is configured to supply and acquire data to/from a network.

<Program>

A program of one embodiment of the present invention has a step to read the angular data and determine a location where the second image 122 is displayed, as shown in Embodiment 1.

When the input/output device of one embodiment of the present invention includes the first display element and the second display element in the display panel, a program including the following steps illustrated in FIGS. 23A and 23B and FIG. 24 can be used in an appropriate timing, one of which is between the initial state and the reading of angular data (see. (T1) in FIG. 11).

[First Step]

In a first step, settings are initialized (see (S1) in FIG. 23A).

Specifically, the first image 121 imaged with the camera 113 can be used for the first display method, and the second image 122 can be used for the second display method. Furthermore, a first mode or a second mode can be used as the predetermined mode.

[Second Step]

In a second step, interrupt processing is allowed (see (S2) in FIG. 23A). Note that an arithmetic device 210 allowed to execute the interrupt processing can perform the interrupt processing in parallel with the main processing. The arithmetic device 210 which has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

[Third Step]

In a third step, data is displayed in the predetermined mode or with the predetermined display method selected in the first step or the interrupt processing (see (S3) in FIG. 23A). Note that the predetermined mode identifies a mode for displaying the data, and the predetermined display method identifies a method for displaying image data. For example, data V11, or data V12 can be used for data to be displayed, for example.

For example, when the first image 121 imaged with the camera 113 is displayed with the first display method, the movement of the image is fast; this case can be associated with the first mode. In addition, when the second image 122 is displayed with the second display method and the display does not move frequently, this case can be associated with the second mode. As described above, images can be displayed with a mode or a display method optimal to the images.

<First Mode>

Specifically, a method of supplying selection signals to a scan line at a frequency of 30 Hz or more, preferably 60 Hz or more, and displaying images in accordance with the selection signals can be associated with the first mode.

For example, the supply of selection signals at a frequency of 30 Hz or more, preferably 60 Hz or more, can display a smooth moving image.

For example, an image is refreshed at a frequency of 30 Hz or more, preferably 60 Hz or more, so that an image smoothly following the user's operation can be displayed on the data processing device 200 the user operates.

<Second Mode>

Specifically, a method of supplying selection signals to a scan line at a frequency of less than 30 Hz, preferably less than 1 Hz, further preferably once a minute and performing displaying images in accordance with the selection signals can be associated with the second mode.

The supply of selection signals at a frequency of less than 30 Hz, preferably less than 1 Hz, more preferably once a minute, can enable display of images with flickers reduced. Further, power consumption can be reduced.

For example, when the data processing device 200 is used as a clock or watch, the display can be refreshed at a frequency of once a second, once a minute, or the like.

For example, when a light-emitting element is used as the second display element, the light-emitting element can be configured to emit light in a pulsed manner so as to display image data. Specifically, an organic EL element can be configured to emit light in a pulsed manner, and its afterglow can be used for display. The organic EL element has excellent frequency characteristics; thus, time for driving the light-emitting element can be shortened, and thus power consumption can be reduced in some cases. Alternatively, heat generation can be inhibited, and thus the deterioration of the light-emitting element can be suppressed in some cases.

<First Display Method>

Specifically, a method in which the first display element $750(i, j)$ is used to display image data can be used as the first display method. Thus, for example, the power consumption can be reduced. In addition, image data with high contrast can be favorably displayed in a bright environment.

<Second Display Method>

Specifically, a method in which the second display element $550(i, j)$ is used to display image information can be used as the second display method. Thus, for example, an image can be favorably displayed in a dark environment. Furthermore, a photograph and the like can be displayed with favorable color reproducibility. In addition, a moving image which moves quickly can be displayed smoothly.

In the case where the images are displayed using the second display element $550(i, j)$, brightness for displaying the images can be determined on the basis of illuminance data. For example, when the illuminance is higher than or equal to 5,000 lux and less than 100,000 lux, the images are displayed using the second display element $550(i, j)$ to be brighter than the case where the illuminance is less than 5,000 lux.

<Third Display Method>

Specifically, a method in which the first display element $750(i, j)$ and the second display element $550(j)$ are used to display images can be used as the third display method. In that case, power consumption can be reduced. Thus, for example, an image can be favorably displayed in a dark environment. Furthermore, a photograph and the like can be displayed with favorable color reproducibility. In addition, a moving image which moves quickly can be displayed smoothly.

Note that a function of adjusting the brightness of display by using the first display element $750(i, j)$ and the second display element $550(i, j)$ for display can be referred to as a light adjusting function. For example, the brightness of a reflective display element can be compensated using the display element having a function of emitting light.

Note that a function of adjusting the color of display by using the first display element $750(i, j)$ and the second display element $550(i, j)$ can be referred to as a color adjusting function. For example, the color of a reflective display element can be changed using the display element having a function of emitting light. Specifically, the use of a blue organic EL element can make a yellowish color displayed by the reflective liquid crystal element closer to white. Thus, text data can be displayed like text printed on a plain paper, for example. Furthermore, an eye-friendly display can be achieved.

[Fourth Step]

In the fourth step, the program proceeds to the fifth step when a termination instruction is supplied, and the program moves to the third step when the termination instruction is not supplied (see (S4) in FIG. 23A).

For example, the termination instruction supplied in the interrupt processing can be used to determine the next step.

[Fifth Step]

In the fifth step, the program terminates (see (S5) in FIG. 23A).

<Interrupt Processing>

The interrupt processing includes sixth to eighth steps described below (see FIG. 23B).

[Sixth Step]

In the sixth step, the illuminance of the environment where the data processing device 200 is used can be sensed using the sensor portion 250, for example (see (S6) in FIG. 23B). Note that color temperature or chromaticity of ambient light can be sensed instead of the illuminance of the environment.

[Seventh Step]

In the seventh step, a display method is determined on the basis of the sensed illuminance data. For example, the first display method is determined when the illuminance is greater than or equal to the predetermined value, whereas the second display method is determined when the illuminance is less than the predetermined value. Alternatively, the display method may be determined to be the third display method when the illuminance is within a predetermined range (see (S7) in FIG. 23B).

Specifically, in the case where the illuminance is greater than or equal to 100,000 lux, the first display method may be determined to be used. In the case where the illuminance is less than 5,000 lux, the second display method may be determined to be used. In the case where the illuminance is greater than or equal to 5,000 lux and less than 100,000 lux, the third display method may be determined to be used.

In the case where color temperature or chromaticity of the ambient light is sensed in the sixth step, the color of display may be adjusted using the second display element 550($i, j$) by the third display method.

For example, the first-status control data SS is supplied when the first display method is used, the second-status control data SS is supplied when the second display method is used, and the third-status control data SS is supplied when the third display method is used.

[Eighth Step]

In the eighth step, the interrupt processing terminates (see (S8) in FIG. 23B).

In this embodiment, another structure of the data processing device of one embodiment of the present invention will be described with reference to FIG. 24.

FIG. 24 is a flow chart describing the program of one embodiment of the present invention. The interrupt processing in the flow chart in FIG. 24 is different from that in FIG. 23B.

Note that a structure example 3 of the data processing device is different from the interrupt processing in FIG. 23B in that the interrupt processing includes a step in which a mode is changed on the basis of a supplied predetermined event. Different structures will be described in detail here, and the above description is referred to for the other similar structures.

<Interrupt Processing>

The interrupt processing includes sixth to eighth steps described below (see FIG. 24).

<Sixth Step>

In the sixth step, the processing proceeds to the seventh step when a predetermined event has been supplied, whereas the processing proceeds to the eighth step when the predetermined event has not been supplied (see (U6) in FIG. 24). For example, whether the predetermined event is supplied in a predetermined period can be a branch condition. Specifically, the predetermined period can be longer than 0 seconds and shorter than or equal to 5 seconds, preferably shorter than or equal to 1 second, further preferably shorter than or equal to 0.5 seconds, still further preferably shorter than or equal to 0.1 seconds.

<Seventh Step>

In the seventh step, the mode is changed (see (U7) in FIG. 24). Specifically, the mode is changed to the second mode when the first mode has been selected, or the mode is changed to the first mode when the second mode has been selected.

<Eighth Step>

In the eighth step, the interrupt processing terminates (see (U8) in FIG. 24). Note that in a period in which the main processing is executed, the interrupt processing may be repeatedly executed.

This embodiment can be combined with any of the other embodiments in this specification as appropriate.

Embodiment 8

In this embodiment, an electronic device of one embodiment of the present invention will be described with reference to drawings.

The electronic device of one embodiment of the present invention may include a secondary battery. It is preferable that the secondary battery be capable of being charged by non-contact power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display an image, data, or the like on a display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays).

The electronic device of one embodiment of the present invention can have a variety of functions. The electronic device of one embodiment of the present invention can have a variety of functions, for example, a function of displaying a variety of information (e.g., a still image, a moving image, and a text image) on a display portion, a touch panel function, a function of displaying a calendar, date, time, and the like, a function of executing a variety of software (programs), a wireless communication function, and a function of reading a program or data stored in a recording medium.

Furthermore, the electronic device including a plurality of display portions can have a function of displaying image information mainly on one display portion while displaying text information mainly on another display portion, a function of displaying a three-dimensional image by displaying images where parallax is considered on a plurality of display portions, or the like. Furthermore, the electronic device including an image receiving portion can have a function of photographing a still image or a moving image, a function of automatically or manually correcting a photographed image, a function of storing a photographed image in a recording medium (an external recording medium or a recording medium incorporated in the electronic device), a function of displaying a photographed image on a display portion, or the like. Note that the functions of the electronic devices of embodiments of the present invention are not limited thereto, and the electronic devices can have a variety of functions.

FIGS. 25A to 25I illustrate examples of portable information terminals each including a flexible and bendable display portion 7001.

The display portion 7001 is manufactured the display device or the like of one embodiment of the present invention. For example, a display device or the like that can be bent with a radius of curvature of greater than or equal to 0.01 mm and less than or equal to 150 mm can be used. The display portion 7001 may include a touch sensor so that the portable information terminal can be operated by touching the display portion 7001 with a finger or the like. One embodiment of the present invention makes it possible to provide a highly reliable electronic device including a display portion having flexibility.

Figure 25A:
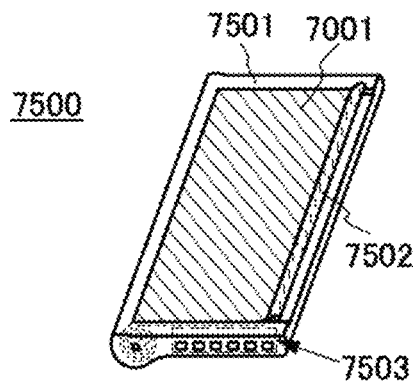
FIGS. 25A to 25I each illustrate an electronic device of one embodiment of the present invention.
Figure 25B:
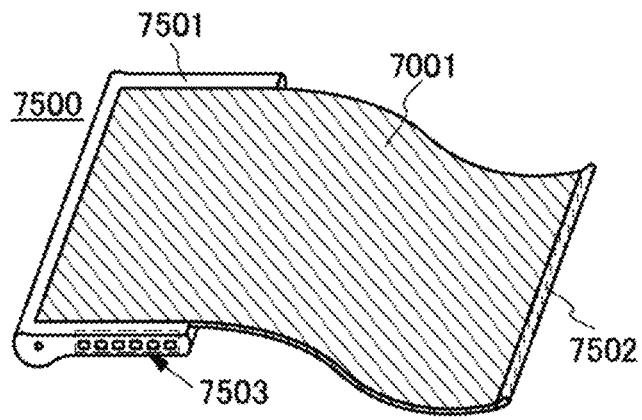

FIGS. 25A and 25B are perspective views showing an example of a mobile information terminal. A portable information terminal 7500 includes a housing 7501, the display portion 7001, a display unit tab 7502, operation buttons 7503, and the like.

The portable information terminal 7500 includes the display portion 7001 that is flexible and rolled into the housing 7501. The display portion 7001 can be pulled out by using the display unit tab 7502.

The portable information terminal 7500 can receive a video signal with a control portion incorporated therein and can display the received video on the display portion 7001. Furthermore, the portable information terminal 7500 incorporates a battery. A terminal portion for connecting a connector may be included in the housing 7501 so that a video signal and power can be directly supplied from the outside with a wiring.

By pressing the operation buttons 7503, power ON/OFF, switching of displayed videos, and the like can be performed. Although FIGS. 25A and 25B illustrate an example where the operation buttons 7503 are positioned on a side surface of the portable information terminal 7500, one embodiment of the present invention is not limited thereto. The operation buttons 7503 may be placed on a display surface (a front surface) or a rear surface of the portable information terminal 7500.

FIG. 25B illustrates the portable information terminal 7500 in a state where the display portion 7001 is pulled out. Videos can be displayed on the display portion 7001 in this state. In addition, the portable information terminal 7500 may display images differently in the state where part of the display portion 7001 is rolled as shown in FIG. 25A and in the state where the display portion 7001 is pulled out as shown in FIG. 25B. For example, in the state illustrated in FIG. 25A, the rolled portion of the display portion 7001 is put in a non-display state, which results in a reduction in power consumption of the portable information terminal 7500.

Note that a reinforcement frame may be provided for a side portion of the display portion 7001 so that the display portion 7001 maintains a flat display surface when pulled out.

Note that in addition to this structure, a speaker may be provided in the housing so that sound is output in accordance with an audio signal received together with a video signal.

Figure 25C:
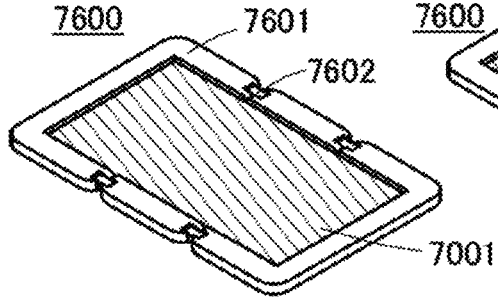
Figure 25D:
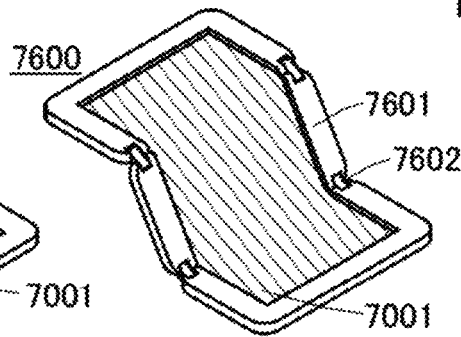
Figure 25E:
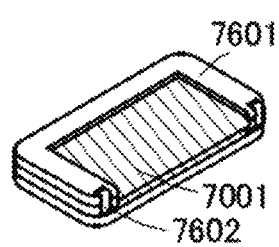

FIGS. 25C to 25E illustrate an example of a foldable portable information terminal. FIG. 25C illustrates a portable information terminal 7600 that is unfolded. FIG. 25D illustrates the portable information terminal 7600 that is being unfolded or folded. FIG. 25E illustrates the portable information terminal 7600 that is folded. The portable information terminal 7600 is highly portable when folded, and is highly browsable when opened because of a seamless large display area.

The display portion 7001 is supported by three housings 7601 joined together by hinges 7602. By folding the portable information terminal 7600 at a connection portion between two housings 7601 with the hinges 7602, the portable information terminal 7600 can be reversibly changed in shape from the unfolded state to the folded state.

Figure 25F:
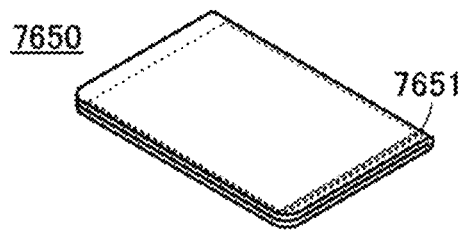
Figure 25G:
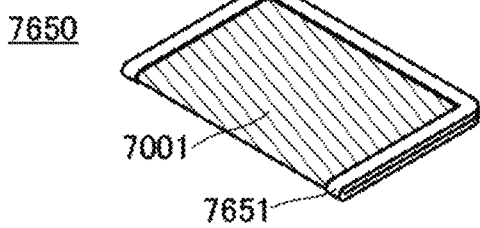

FIGS. 25F and 25G illustrate an example of a foldable portable information terminal. FIG. 25F illustrates a portable information terminal 7650 that is folded so that the display portion 7001 is on the inside. FIG. 25F illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated and damaged.

Figure 25H:
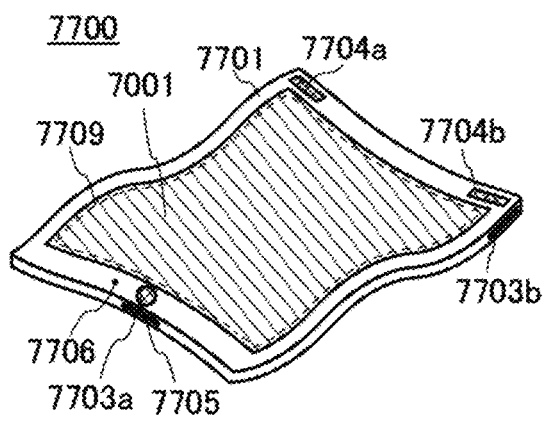
Figure 25I:
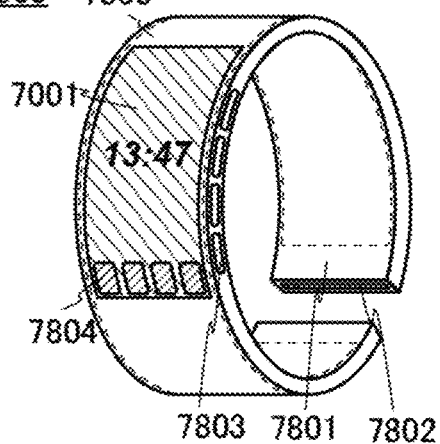

FIG. 25H illustrates an example of a flexible portable information terminal. A portable information terminal 7700 includes a housing 7701 and the display portion 7001. In addition, the portable information terminal 7700 may include buttons 7703a and 7703b which serve as input means, speakers 7704a and 7704b which serve as sound output means, an external connection port 7705, a microphone 7706, or the like. A flexible battery 7709 can be mounted on the portable information terminal 7700. The battery 7709 may be arranged to overlap with the display portion 7001, for example.

The housing 7701, the display portion 7001, and the battery 7709 are flexible. Thus, it is easy to curve the portable information terminal 7700 into a desired shape and to twist the portable information terminal 7700. For example, the portable information terminal 7700 can be folded so that the display portion 7001 is on the inside or on the outside. The portable information terminal 7700 can be used in a rolled state. Since the housing 7701 and the display portion 7001 can be transformed freely in this manner, the portable information terminal 7700 is less likely to be broken even when the portable information terminal 7700 is dropped or subjected to unintentional external stress.

The portable information terminal 7700 is lightweight and therefore can be used conveniently in various situations. For example, the portable information terminal 7700 can be used in the state where the upper portion of the housing 7701 is suspended by a clip or the like, or in the state where the housing 7701 is fixed to a wall by magnets or the like.

FIG. 25D illustrates an example of a wrist-watch-type portable information terminal. A portable information terminal 7800 includes a band 7801, the display portion 7001, an input/output terminal 7802, operation buttons 7803, and the like. The band 7801 has a function of a housing. In addition, a flexible battery 7805 can be mounted on the portable information terminal 7800. The battery 7805 may be arranged to overlap with the display portion 7001, the band 7801, or the like, for example.

The band 7801, the display portion 7001, and the battery 7805 have flexibility. Thus, the portable information terminal 7800 can be easily curved to have a desired shape.

With the operation buttons 7803, a variety of functions such as time setting, ON/OFF of the power, ON/OFF of wireless communication, setting and cancellation of silent mode, and setting and cancellation of power saving mode can be performed. For example, the functions of the operation buttons 7803 can be set freely by the operating system incorporated in the portable information terminal 7800.

By touching an icon 7804 displayed on the display portion 7001 with a finger or the like, application can be started.

The portable information terminal 7800 can employ near field communication that is a communication method on the basis of an existing communication standard.

In that case, for example, mutual communication between the portable information terminal 7800 and a headset capable of wireless communication can be performed, and thus hands-free calling is possible.

Alternatively, the portable information terminal 7800 may include the input/output terminal 7802. In the case where the input/output terminal 7802 is included, data can be directly transmitted to and received from another information terminal via a connector. Charging through the input/output terminal 7802 is also possible. Note that charging of the portable information terminal described as an example in this embodiment can be performed by non-contact power transmission without using the input/output terminal.

This embodiment can be combined with any of the other embodiments in this specification as appropriate.

Embodiment 9

In this embodiment, a configuration of a billing system using the data processing device of one embodiment of the present invention is described. Alternatively, a server system that includes the billing method of one embodiment of the present invention is described.

As shown in the above embodiment, the data processing device of one embodiment of the present invention is more controllable and highly convenient, because a means for input by folding the data processing device during when selecting the second image 122 associated with locational data is added.

Here, a server A can supply a condition to generate the second image 122 and a process associated with the second image 122 to the data processing device of the operator through a means for communication (transmission and reception) that is included in the data processing device. The server A can set a process such as starting up an application, calling a functionality, and the like, as a process associated with the second image 122.

At this time, the server A can set a partial privilege restriction to use the input/output method or the display method of the data processing device, and to make a profit from the operator by this payment, in the case that the operator wishes to remove the privilege restriction (i.e., change the privilege).

A method of the above-described privilege restriction can be set as a time restriction, a function restriction, or the like. The method of the above-described privilege restriction is, for example, a restriction in which the second image 122 does not move to the predetermined location when the data processing device is folded (i.e., a privilege restriction to move), a restriction in which the determination on whether to generate or delete the second image 122 is not terminated even when the data processing device is folded (i.e., a restriction of a privilege to terminate when the data processing device is folded), a restriction in which the above-described predetermined location cannot be set by the operator (i.e., a restriction on setting privilege), a restriction in which the second image 122 does not move to a predetermined location after the data processing device is folded unless a predetermined amount of time passes (i.e., a restriction of a privilege to move immediately after the data processing device is folded), or the like. Another method of the above-described privilege restriction is a restriction that a certain second image 122 does not move to a predetermined location.

The above-described privilege restriction is effective in the case of using software of a game is used on the data processing device. For example, in the above-described software, it is assumed that because the second image 122 appears while the operator is walking for only a short predetermined period of time, the selection and manipulation of the second image 122 is not easy. In addition, it is assumed that additional contents can be obtained by selecting the second image 122.

At this time, the operator can select the second image 122 more efficiently by paying for increased controllability, even when the second image 122 appears for only a short predetermined period of time.

Figure 26A:
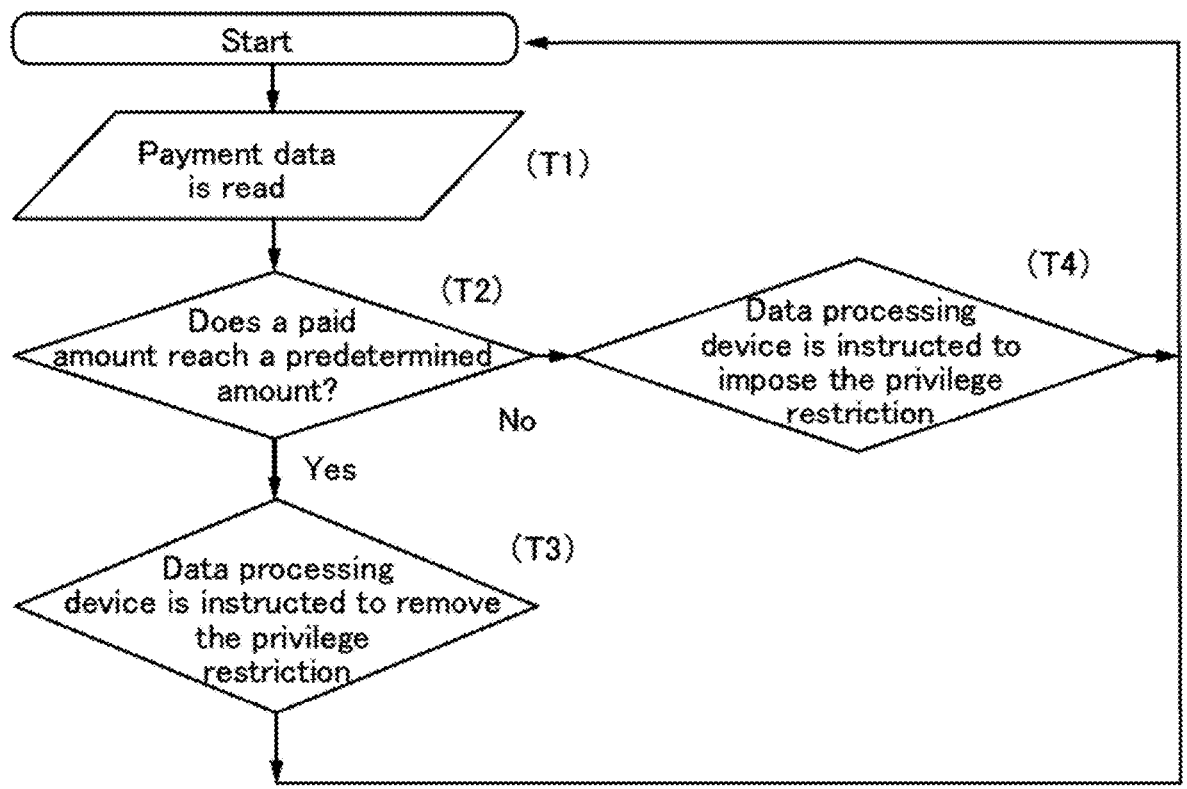
FIGS. 26A and 26B illustrate a server system of one embodiment of the present invention.

As examples of a payment system, a pay-per-use system, a flat-sum system, a combination of the pay-per-use system and the flat-sum system, and a price cap system can be given. In addition, the payment system can be a contents fee system. At this time, the server A can read payment data (see (T1) in FIG. 26A), determine whether a paid amount reaches a predetermined amount (see (T2) in FIG. 26A), instruct the data processing device to remove the privilege restriction (see (T3) in FIG. 26A) if the paid amount reaches the predetermined amount, and instruct the data processing device to impose the privilege restriction (see (T4) in FIG. 26A) if the paid amount does not reach the predetermined amount.

The privilege restriction that is removed by the payment can be set depending on the paid amount. For example, on the data processing device operated by the operator, one or more of the privilege restriction such as an input/output method, an image generation method, an image deletion method, and an image moving method, can be changed (i.e., privileges can be changed). This restriction is set by communication between the data processing device and the server A.

Figure 26B:
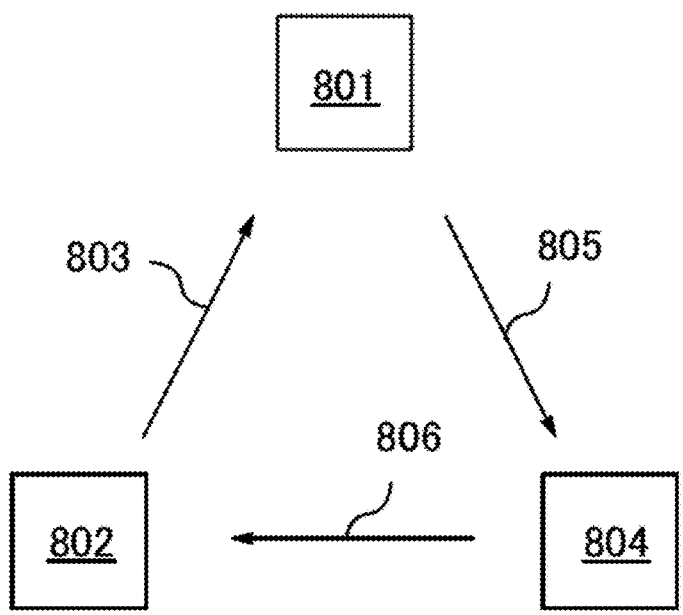

As one payment method for an operator 801 to request a removal 803 of privilege restriction from a server A 802, a payment method in which a payment is made on the internet is given (see FIG. 26B). An example of such a payment method is a payment method in which a server B 804 receives a sender address data and credit card information from the operator 801 (user), and the server B 804 pays a fee 806 to the server A 802 on behalf of the operator 801 when a payment request 805 is sent from the operator 801 to the server B 804. The credit card number, an expiration date, the name of the card owner, a security code, and a secure authentication may be required as the contents input when the operator 801 applies for payment to the server B 804. As another payment method, an automatic withdrawal, internet banking, a payment through a mobile carrier, or electronic money payment (a pre-paid method or a post-pay method) can be used.

This embodiment can be combined with any of the other embodiments in this specification as appropriate.

This application is based on Japanese Patent Application serial No. 2016-165364 filed with Japan Patent Office on Aug. 26, 2016, the entire contents of which are hereby incorporated by reference.

What is claimed is:

1. A data processing device comprising:
a display portion;
an arithmetic device;
an imaging device configured to supply imaging data to the arithmetic device;
a first device configured to supply locational data to the arithmetic device;
a first angular sensor and a second angular sensor;
a first housing, a second housing, and a third housing; and
a first hinge and a second hinge,
wherein the first housing and the second housing are connected to each other through the first hinge,
wherein the second housing and the third housing are connected to each other through the second hinge,
wherein the display portion has flexibility and is attached to the first housing, the second housing, and the third housing,
wherein the arithmetic device is configured to generate first image data based on the imaging data,
wherein the arithmetic device is configured to store a threshold value and predetermined display coordinates,
wherein the first angular sensor is configured to supply first angular data that includes a first folding angle determined by the first housing and the second housing,
wherein the second angular sensor is configured to supply second angular data that includes a second folding angle determined by the second housing and the third housing,
wherein the arithmetic device is configured to generate second image data based on the locational data, the first angular data, and the second angular data,
wherein a first image based on the first image data and a second image based on the second image data are displayed on the display portion,
wherein the second image is moved to the predetermined display coordinates and to overlap with the first image when at least one of the first folding angle and the second folding angle is made larger than the threshold value at the same time as at least one of the first housing, the second housing, and the third housing moves, and
wherein the first image is not changed when at least one of the first folding angle and the second folding angle is changed.

2. The data processing device according to claim 1,
wherein the arithmetic device is configured to determine display coordinates based on the locational data when at least one of the first folding angle and the second folding angle is smaller than the threshold value, and
wherein the display portion displays the second image on the display coordinates.

3. The data processing device according to claim 1,
wherein the display portion includes a pixel,
wherein the pixel includes a first display element and a second display element,
wherein the first display element is configured to display the first image, and
wherein the second display element is configured to display the second image.

4. The data processing device according to claim 3,
wherein the first display element is a reflective display element, and
wherein the second display element is a light-emitting element.

5. The data processing device according to claim 1, further comprising one or more of the following:
a keyboard;
a mouse;
a touch sensor;
a microphone;
a camera;
a photodetector;
an attitude detector;
an acceleration sensor;
a directional sensor;
a circuit for receiving a GPS signal;
a pressure sensor;
a temperature sensor; and
a humidity sensor.

6. A data processing device comprising:
a display portion;
an arithmetic device;
a first device configured to supply locational data to the arithmetic device;
a first angular sensor and a second angular sensor;
a first housing, a second housing, and a third housing; and
a first hinge and a second hinge,
wherein the first housing and the second housing are connected to each other through the first hinge,
wherein the second housing and the third housing are connected to each other through the second hinge,
wherein the display portion has flexibility and is attached to the first housing, the second housing, and the third housing,
wherein the arithmetic device is configured to store a threshold value and predetermined display coordinates,
wherein the arithmetic device is configured to generate first image data based on the locational data,
wherein the first angular sensor is configured to supply first angular data that includes a first folding angle determined by the first housing and the second housing,
wherein the second angular sensor is configured to supply second angular data that includes a second folding angle determined by the second housing and the third housing,
wherein the arithmetic device is configured to generate second image data based on the locational data, the first angular data, and the second angular data,
wherein a first image based on the first image data and a second image based on the second image data are displayed on the display portion,
wherein the second image is moved to the predetermined display coordinates and to overlap with the first image when at least one of the first folding angle and the second folding angle is made larger than the threshold value at the same time as at least one of the first housing, the second housing, and the third housing moves, and wherein the first image is not changed when at least one of the first folding angle and the second folding angle is changed.

7. The data processing device according to claim 6, wherein the arithmetic device is configured to determine display coordinates based on the locational data when at least one of the first folding angle and the second folding angle is smaller than the threshold value, and wherein the display portion displays the second image on the display coordinates.

8. The data processing device according to claim 6, wherein the display portion includes a pixel, wherein the pixel includes a first display element and a second display element, wherein the first display element is configured to display the first image, and wherein the second display element is configured to display the second image.

9. The data processing device according to claim 8, wherein the first display element is a reflective display element, and wherein the second display element is a light-emitting element.

10. The data processing device according to claim 6, further comprising one or more of the following:
a keyboard;
a mouse;
a touch sensor;
a microphone;
a camera;
a photodetector;
an attitude detector;
an acceleration sensor;
a directional sensor;
a circuit for receiving a GPS signal;
a pressure sensor;
a temperature sensor; and
a humidity sensor.

* * * * *